(12) United States Patent
Lindsay et al.

(10) Patent No.: US 6,515,970 B1
(45) Date of Patent: Feb. 4, 2003

(54) COMMUNICATION SYSTEM WITH FAST CONTROL TRAFFIC

(75) Inventors: Charles L. Lindsay; Ryan N. Jensen, both of Monument, CO (US); Gary B. Anderson, Carnelian Bay, CA (US)

(73) Assignee: Xircom Wireless, Inc., Colorado Springs, CO (US)

( * ) Notice: Subject to any disclaimer, the term of this patent is extended or adjusted under 35 U.S.C. 154(b) by 0 days.

(21) Appl. No.: 09/503,981

(22) Filed: Feb. 14, 2000

Related U.S. Application Data

(62) Division of application No. 09/122,565, filed on Jul. 24, 1998.

(51) Int. Cl.[7] .................................................. H04J 3/00
(52) U.S. Cl. ........................ 370/280; 370/346; 370/347; 370/449
(58) Field of Search ................................ 370/328, 346, 370/347, 348, 431, 449, 450, 458, 459, 337, 461, 442, 462, 345, 276, 277, 280, 282, 294, 321, 322, 336

(56) References Cited

U.S. PATENT DOCUMENTS

| | | | | |
|---|---|---|---|---|
| 4,736,371 A | | 4/1988 | Tejima et al. ................ 370/95 |
| 4,809,268 A | * | 2/1989 | Tejima et al. ............... 370/346 |
| 4,940,974 A | * | 7/1990 | Sojka ......................... 370/346 |
| 5,042,082 A | | 8/1991 | Dahlin ........................ 455/33 |
| 5,111,535 A | | 5/1992 | Tokunaga ................... 455/33.2 |
| 5,157,661 A | | 10/1992 | Kanai et al. ................ 370/95.1 |
| 5,159,593 A | | 10/1992 | D'Amico et al. ........... 370/95.3 |
| 5,229,995 A | | 7/1993 | Strawcynski et al. ...... 370/95.3 |
| 5,239,572 A | | 8/1993 | Saegusa et al. ............... 379/61 |
| 5,327,577 A | | 7/1994 | Uddenfeldt ................ 455/33.2 |
| 5,371,738 A | | 12/1994 | Moelard et al. ............ 370/85.1 |
| 5,416,779 A | | 5/1995 | Barnes et al. .............. 370/29.1 |
| 5,454,028 A | | 9/1995 | Hara et al. .................... 379/61 |
| 5,483,676 A | * | 1/1996 | Mahany et al. ............ 455/67.3 |
| 5,497,424 A | | 3/1996 | Vanderpool ................. 380/34 |
| 5,521,925 A | | 5/1996 | Merakos et al. ........... 370/95.3 |
| 5,711,003 A | | 1/1998 | Dupuy ....................... 455/436 |
| 5,864,549 A | * | 1/1999 | Honkasalo et al. ......... 370/335 |
| 5,896,382 A | * | 4/1999 | Davis et al. ................ 370/401 |
| 5,923,649 A | | 7/1999 | Raith ......................... 370/328 |

* cited by examiner

*Primary Examiner*—Ajit Patel
(74) *Attorney, Agent, or Firm*—Blakely, Sokoloff, Taylor & Zafman LLP

(57) ABSTRACT

A method and system for conducting rapid control traffic in a time division multiple access (TDMA) communication system comprises a base station communicating with a plurality of user stations in assigned time slots of a time frame. For bearer traffic, time slots are assigned to particular user stations for an extended duration. In unassigned time slots, the base station transmits a general polling message indicating availability of the time slot. A user station desiring to hand off communication from one base station to another uses multiple available time slots at the target base station for exchanging control traffic messages with the target base station. The next available time slot is indicated by a slot pointer in the header of each general polling message to facilitate rapid exchange of control traffic messages. During handover, the user station may establish a new link with the target base station before relinquishing the existing communication link with the old base station.

16 Claims, 33 Drawing Sheets

N=3 FREQUENCY REUSE USING CDMA

GSM/DSC-1900 BASED NETWORK INTERCONNECTION

SLOT ACQUISITION

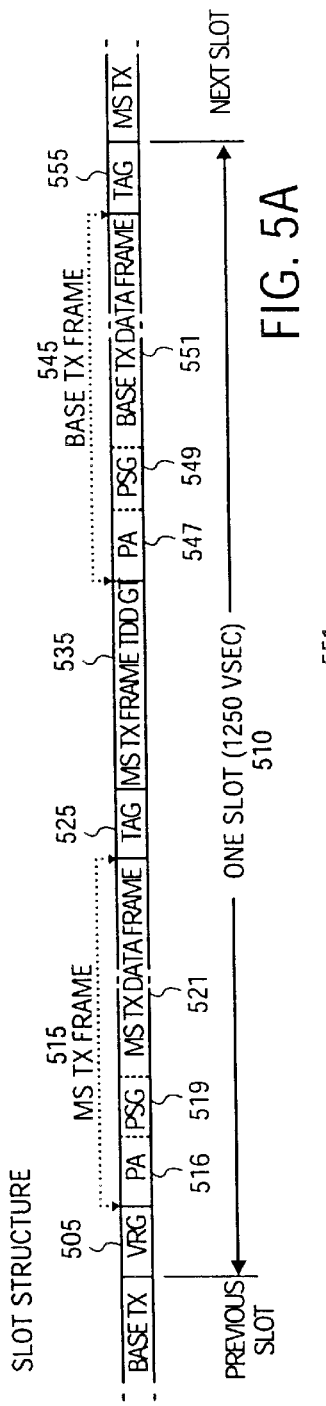
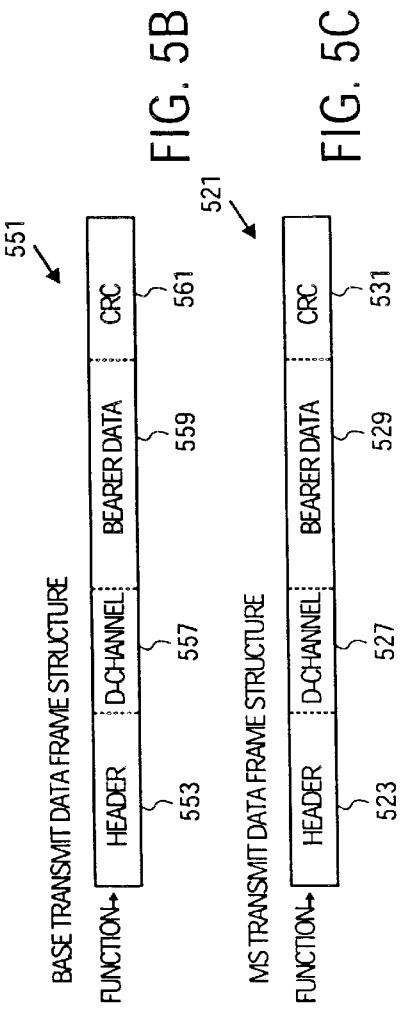
FIG. 5A
FIG. 5B
FIG. 5C
NOTES:
1. MS = MOBILE STATION (HANDSET)
2. TAG = TURN-AROUND GAP
3. TDD = TIME DIVISION DUPLEX
4. GT = GUARD TIME
5. PA = PREAMBLE
6. PSG = PREAMBLE SOUND GAP
7. CHIP PERIOD
8. SYMBOL PERIOD
9. VRG = VARIABLE RADIO DELAY GAP

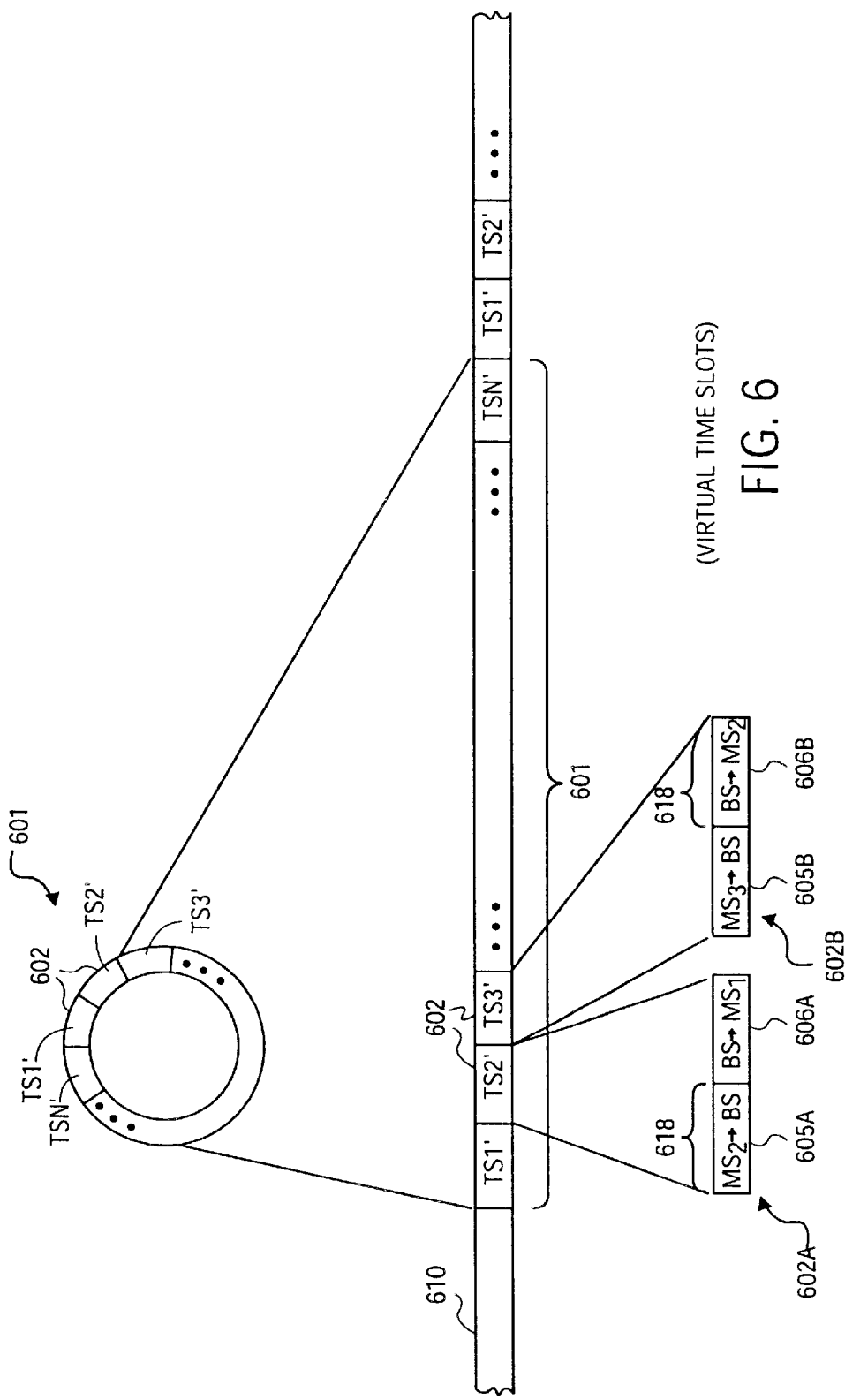

BS GENERAL POLL MESSAGE FORMAT

BS SPECIFIC POLL MESSAGE FORMAT

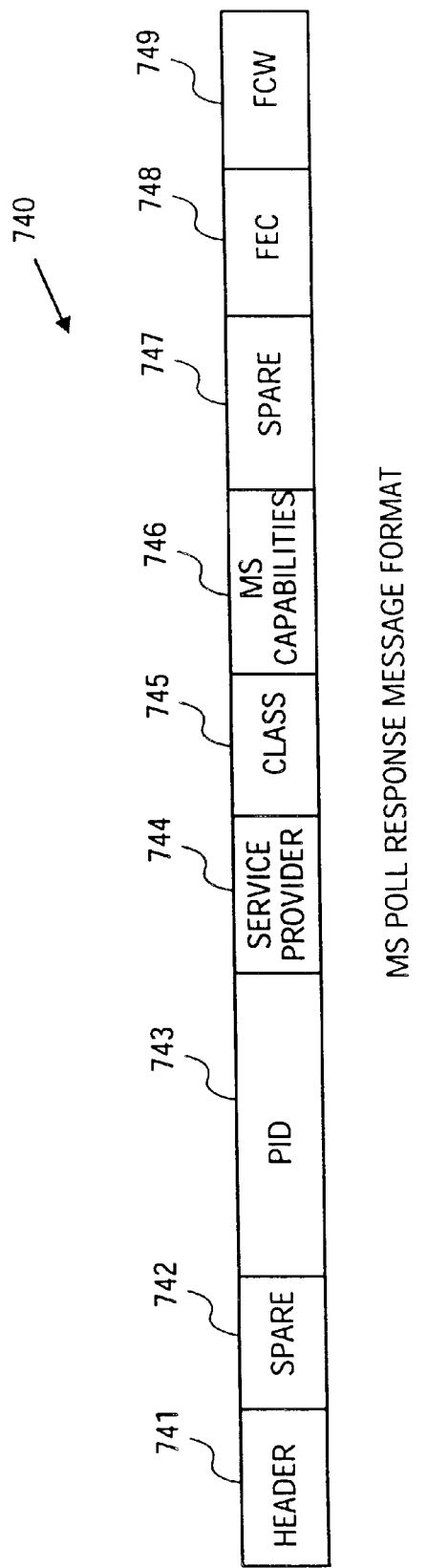
FIG. 7C  MS POLL RESPONSE MESSAGE FORMAT

BS POLLING FRAME HEADER

MS POLLING FRAME HEADER

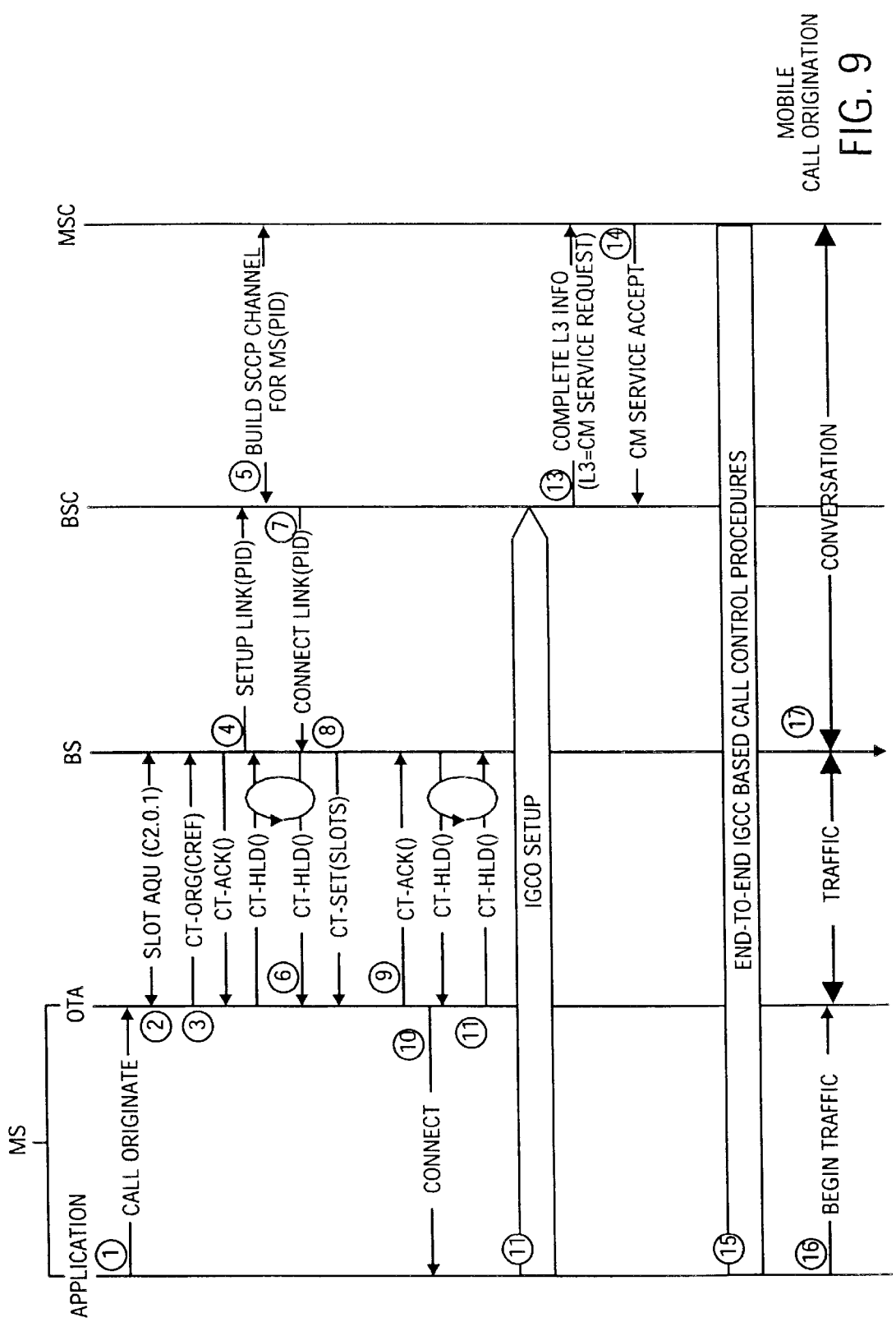
FIG. 9 MOBILE CALL ORIGINATION

INTRA BSC HANDOVER (1 OF 3)

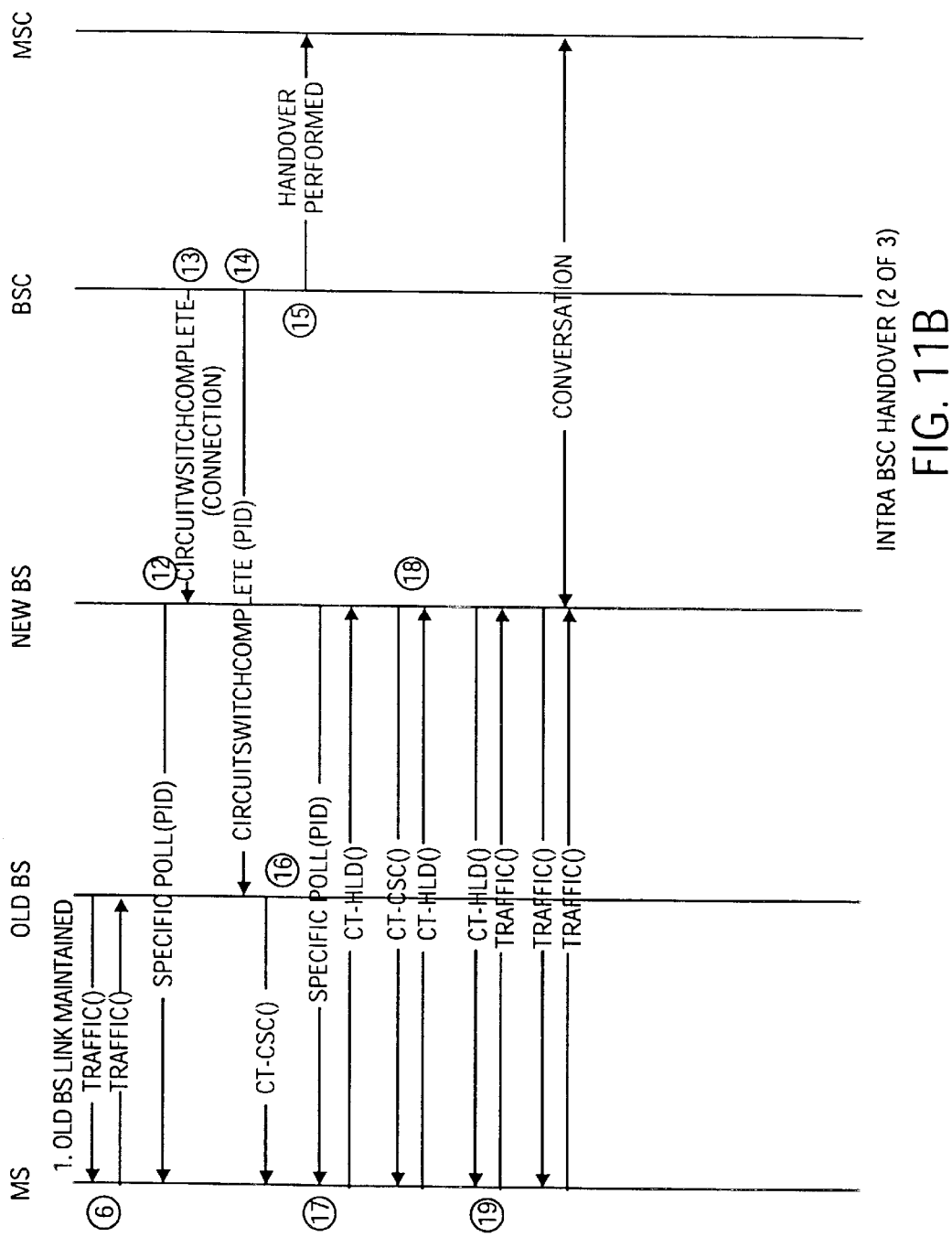

INTRA BSC HANDOVER (3 OF 3)

INTER-BSC HANDOVER (1 OF 2)

INTER-BSC HANDOVER (2 OF 2)

BS PACKET

| | BITS | | | | | | | | OCTETS |
|---|---|---|---|---|---|---|---|---|---|
| | 8 | 7 | 6 | 5 | 4 | 3 | 2 | 1 | |
| BS HEADER (23 BITS) | B/H | E | PACKET TYPE | | PWR | SYMMETRY | | DCS | 1 |
| | VS | | CU | | NEXT SLOT | | | | 2 |
| | ARQ | | | | HCF | | | | 3 |
| D-CHANNEL | D-CHANNEL OR CORRELATIVE ID (1 BYTE) | | | | | | | | 4 |
| B-CHANNEL | BEARER DATA OR SIGNALING DATA (24 BYTES FOR DATA & HIGHER LEVEL FEC) | | | | | | | | 5 ... 28 |
| FCW | FCW (FRAME CHECK WORD) | | | | | | | | 29 30 |

FIG. 13A

MS PACKET

| | BITS | | | | | | | | OCTETS |
|---|---|---|---|---|---|---|---|---|---|
| | 8 | 7 | 6 | 5 | 4 | 3 | 2 | 1 | |
| MS HEADER (23 BITS) | B/H | E | PACKET TYPE | | PWR | SYMMETRY | | DCS | 1 |
| | RESERVED | | ARQ | | | HCF | | | 2 |
| | HCF | | | | | | | | 3 |
| D-CHANNEL | D-CHANNEL OR CORRELATIVE ID (1 BYTE) | | | | | | | | 4 |
| B-CHANNEL | BEARER DATA OR SIGNALING DATA (24 BYTES FOR DATA & HIGHER LEVEL FEC) | | | | | | | | 5 ... 28 |
| FCW | FCW (FRAME CHECK WORD) | | | | | | | | 29 30 |

FIG. 13B 9.6 KB CIRCUIT USING "SLOT 13"

BASE STATION TRANSMISSIONS

BASE STATION TRANSMISSIONS

COMMUNICATION SYSTEM WITH FAST CONTROL TRAFFIC

CROSS-REFERENCE TO RELATED APPLICATIONS

This application is a divisional application of U.S. application Ser. No. 09/122,565, filed on Jul. 24, 1998, hereby incorporated by reference as if set forth fully herein.

BACKGROUND OF THE INVENTION

1. Field of the Invention

The field of the present invention relates to wireless communication and, more particularly, to communication protocols for control traffic in a wireless communication system.

2. Description of Related Art

A mobile communication system may generally comprise a set of "user stations", typically mobile and the endpoints of a communication path, and a set of "base stations", typically stationary and the intermediaries by which a communication path to a user station may be established or maintained. A group of base stations may be connected to a base station controller, or a cluster controller, which can in turn be connected to a local public telephone network through, for example, a mobile switching center.

It is generally desirable in a mobile communication system to achieve the greatest possible user traffic capacity at a base station, so that fewer base stations need to be deployed in order to serve user demands. One technique used to allow a base station to communicate with multiple user stations is use of time division multiple access (TDMA). In a particular TDMA system, for example, a time frame is divided into a plurality of smaller time units, or time slots, and transmissions from the base station and from the user stations are separated in time so as to avoid collisions. In addition to separating transmissions in time, transmissions may also be distinguished by using different assigned frequencies, thereby resulting in a frequency division multiple access (FDMA) system. Furthermore, transmissions may be encoded using spread spectrum techniques, and different cells in a mobile communication system may be assigned different spread spectrum codes, thereby differentiating transmissions through code division multiple access (CDMA).

Generally, in order to carry out communication between a base station and a user station, a communication link must first be established. Establishment of the communication link can be difficult in a spread-spectrum communication system, due to the length of time typically required to synchronize the transmitter and the receiver. Establishment of the communication link and/or handing off can be more difficult in a TDMA system in which spread spectrum is used, due to the amount of time usually necessary to synchronize the transmitter and receiver, especially where the amount of time available for synchronization within a user station's time slot is relatively brief.

Within a mobile communication system, a protocol generally defines how communication is to be initially established between a base station and a user station. The protocol may further define when and how a handoff may be conducted as a user station leaves the service area or "cell" of one base station and enters the service area of another base station. Messages exchanged between a base station and user station for the purposes of establishing or maintaining a connection, or for handing off communication, generally can be referred to as control traffic or signaling traffic. Messages carrying data to be conveyed between the endpoints of a call are generally referred to as bearer traffic messages.

Initial communication between a user station and a base station can be established either when the user station seeks to initiate communication with a base station (for example, attempting to initiate a telephone call), or when the base station attempts to complete a call to the user station (for example, where the user station is paged). In many conventional mobile communication systems, a dedicated control channel is used to assist mobile stations in establishing communication. According to this technique, the mobile station first communicates over the control channel when establishing communication. The base station then assigns to the mobile station a "permanent" communication channel for exchanging bearer traffic messages.

In at least one mobile communication system, however, a user station can establish initial communication using the same channel used for transmitting bearer traffic. For example, a system in which a user station can establish communication by exchanging control traffic messages in a particular communication channel (e.g., a time slot of a time frame), and thereafter use the same channel (time slot) for bearer traffic, is described in U.S. patent application Ser. No. 08/284,053 filed Aug. 1, 1994, which is assigned to the assignee of the present invention, and hereby incorporated by reference as if set forth fully herein.

The exchange of control traffic messages may also occur during a handoff of a user station from one base station to another, usually as the user station moves between service areas. Typically, in the large majority of conventional mobile communication systems, handoffs are carried out under the direction of the base station and/or a mobility control center connected to the base station. When a communication link starts to break down, the base station requests a transfer of an ongoing call to a nearby base station, which becomes the target for handoff. The target base station may be selected according to criteria developed at the base station, the user station, or both. A control channel (which may be the same dedicated control channel as used for establishing communication, where provided) may be used for the purpose of assisting the mobile station with the handoff.

In some mobile communication systems, the user station plays a larger role in handoff. An example of such a system is generally described in U.S. patent application Ser. No. 08/284,053, previously incorporated herein by reference. In at least one embodiment disclosed therein, the user station not only determines when to hand off, but also takes steps to initiate a hand off from its current base station to a different base station.

It is generally desirable in mobile communication systems to allow the rapid establishment of communication links between mobile stations and base stations, and rapid handoff between base stations, without errors and without inadvertently dropping the call or losing a communication link. This type of capability would tend to imply the need for devoting potentially significant resources (i.e., communication channels and processing speed and power) to handle link establishment and handoff. Because the communication environment can be unstable and multiple users may need to be serviced at the same time, a mobile communication system is preferably capable of handling multiple service requests for link establishment or handoff, and doing so quickly and without errors or dropped calls.

At the same time, resources available for handling control traffic messages are usually limited, sometimes severely so, in part because control traffic resources generally must compete against bearer traffic resources. Thus, resources dedicated to control traffic reduce the overall resources available for handling data or bearer traffic, and vice versa. By setting aside resources (such as a dedicated control channel or multiple such channels) for servicing control traffic demands, the base station's user capacity can be adversely impacted. As a result, a greater number of base stations may need to be deployed to service a given number of expected users.

It would therefore be advantageous to provide a communication system having a rapid and reliable means for establishing a communication link between a base station and a user station. It would further be advantageous to provide a communication protocol enabling rapid handoffs and control traffic functions, and which is particularly suited to use in a time division multiple access environment. It would further be advantageous to provide a communication protocol having a fast handoff and control traffic capability well suited to the demands of spread spectrum communication.

SUMMARY OF THE INVENTION

In one aspect of the present invention, a method and system for handing off communication between base stations in a mobile communication system is provided. In a preferred embodiment of the invention, a mobile station communicates with a base station using a time division multiple access (TDMA) and/or time division duplex (TDD) technique. In such an embodiment, a continuous sequence of time frames is generated, with each time frame comprising a plurality of time slots. The base station can communicate with a plurality of user stations (some or all of which may be mobile stations), one in each time slot. A mobile station desiring to hand off exchanges a plurality of control traffic messages with a second base station to establish communication in a different time slot with the second base station. The mobile station then releases the communication channel with the first base station and requests, through the second base station, the transfer of the call to the second base station.

In a preferred embodiment of the present invention, a mobile station transmits and/or receives a plurality of control traffic messages in multiple time slots of one or more time frames with the second (target) base station while in the process of handing off communication to the target base station, or performing other control traffic signaling. The second base station provides an indication to the mobile station of the next available time slot for control traffic, and, if desired, can temporarily assign additional time slots to the mobile station during handoff, or other control traffic signaling.

In another aspect of the present invention, a method and system for establishing communication and handing off communication in a TDMA and/or TDD communication is provided. In one embodiment, the base station transmits a general poll message in each available time slot to indicate availability of the time slot. To establish communication in an available time slot, a user station responds to the general poll message with a general poll response. The base station then follows with a specific poll message. The user station responds with a specific poll response. Normal traffic communication may thereafter be conducted over an established communication link. During normal traffic communication, in one embodiment, each user station transmits information to the base station during an initial portion of an assigned time slot, and each user station receives information from the base station during a latter portion of the same assigned time slot.

Handover between base stations may be carried out by establishing a new communication link with a new base station, while maintaining an old communication link with an original base station until the new communication link is fully established. The new communication link may be established in the same manner as the original link—that is, by using the same handshaking technique involving a general poll, general response, specific poll, and specific response messages.

In another aspect of the invention, a slot pointer information element within a general polling message provides an indication of the location of the next available time slot for communication. The slot pointer may be a numerical value relative to the current time slot. As part of a specific polling message, the slot pointer information element provides an assignment of the time slot channel to be used for future communication by the user station presently in the process of establishing communication. The slot pointer may be used to perform rapid handover by allowing the use of multiple time slots within a time frame for control traffic.

In another embodiment, virtual time slots are defined as part of the timing structure. As used herein, a virtual time slot is generally a time slot assigned to the same user station with two transmission intervals non-adjacent in time. For example, a virtual time slot may be a time slot in which a forward link transmission and a reverse link transmission for a particular user station are separated by transmissions to or from one or more other user stations. In a preferred system in which each physical time slot has a user transmission interval and a base transmission interval, a user station may therefore transmit a user message to the base station during a user transmission interval of a first physical time slot, and receive a base message from the base station during a base transmission interval of a second, subsequent physical time slot. In a particular embodiment, a virtual slot field in the header of the general polling message indicates whether or not virtual time slots are provided, thereby enabling operation in either of two modes, one using virtual time slots and the other not using virtual time slots.

A method and system for establishing and maintaining spread spectrum communication is disclosed with respect to a preferred embodiment wherein data symbols are encoded using an M-ary direct sequence spread spectrum communication technique. Further variations and details of the above embodiments are also described herein and/or depicted in the accompanying figures.

BRIEF DESCRIPTION OF THE DRAWINGS

FIG. 4 is a diagram illustrating a protocol for establishing a communication link between a base station and a user station.

FIG. 5A is a diagram of a preferred time slot structure.

FIGS. 5B and 5C are diagrams of a base station transmit data time frame structure and a user station transmit data time frame structure, respectively.

FIG. 6 is a diagram of a time frame structure in accordance with another embodiment of the invention showing a time frame divided into virtual time slots.

FIGS. 7A–7C are diagrams of polling message formats.

FIG. 9 is a message flow diagram illustrating call origination from a user station.

FIGS. 11A–11C are message flow diagrams illustrating a handover of a mobile call between two base stations within a cluster.

FIGS. 13A and 13B are diagrams of a base station data packet and a user station data packet, respectively.

DETAILED DESCRIPTION OF THE PREFERRED EMBODIMENTS

Figure 1:
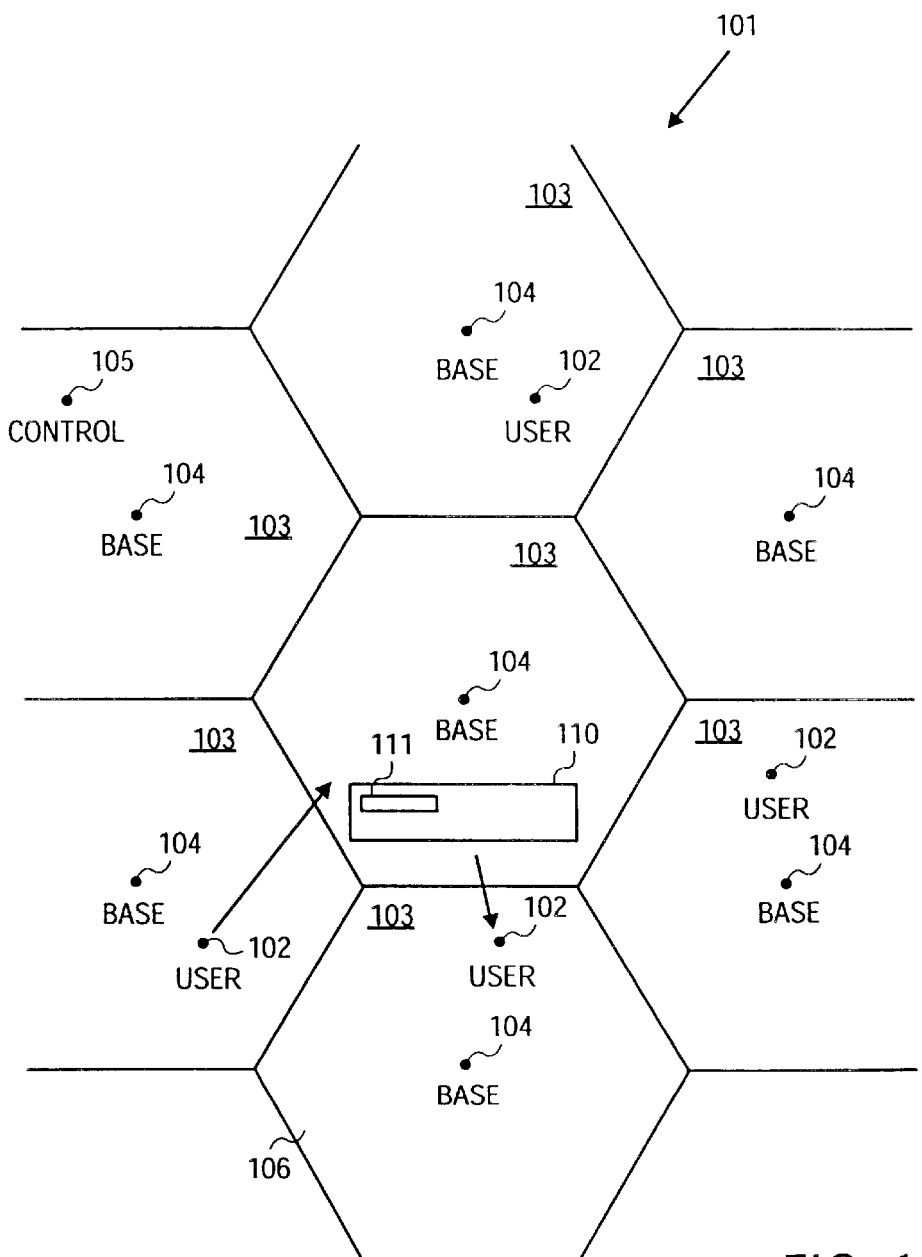
FIG. 1 is a diagrammatic representation of a cellular communication system.

FIG. 1 is a diagram of a pattern of cells for a multiple-access wireless communication system 101. The wireless communication system 101 of FIG. 1 includes a plurality of cells 103, each with a base station 104, typically located at the center of the cell 103. A plurality of user stations 102, some or all of which may be mobile, communicate with the base stations 104 to place and receive calls. Each station (both the base stations 104 and the user stations 102) generally comprises a receiver and a transmitter.

A control station 105 may also be provided (comprising a receiver and a transmitter) to manage the resources of the system 101. The control station 105 (which may comprise a "base station controller" as described later herein) may assign the base station 104 and user stations 102 in each cell 103 a spread-spectrum code or a set of spread spectrum codes for modulating radio signal communication in that cell 103. (Alternatively, a spread spectrum code or set of spread spectrum codes may be pre-assigned to a cell 103.) The resulting spread spectrum signals are generally spread across a bandwidth exceeding the bandwidth necessary to transmit the data, hence referred to by the term "spread spectrum." Accordingly, radio signals used in a cell 103 are preferably spread across a bandwidth sufficiently wide that both base station 104 and user stations 102 in an adjacent cell 103 can distinguish communication which originates in the first cell 103 from communication which originates in the adjacent cell 106.

Figure 2:
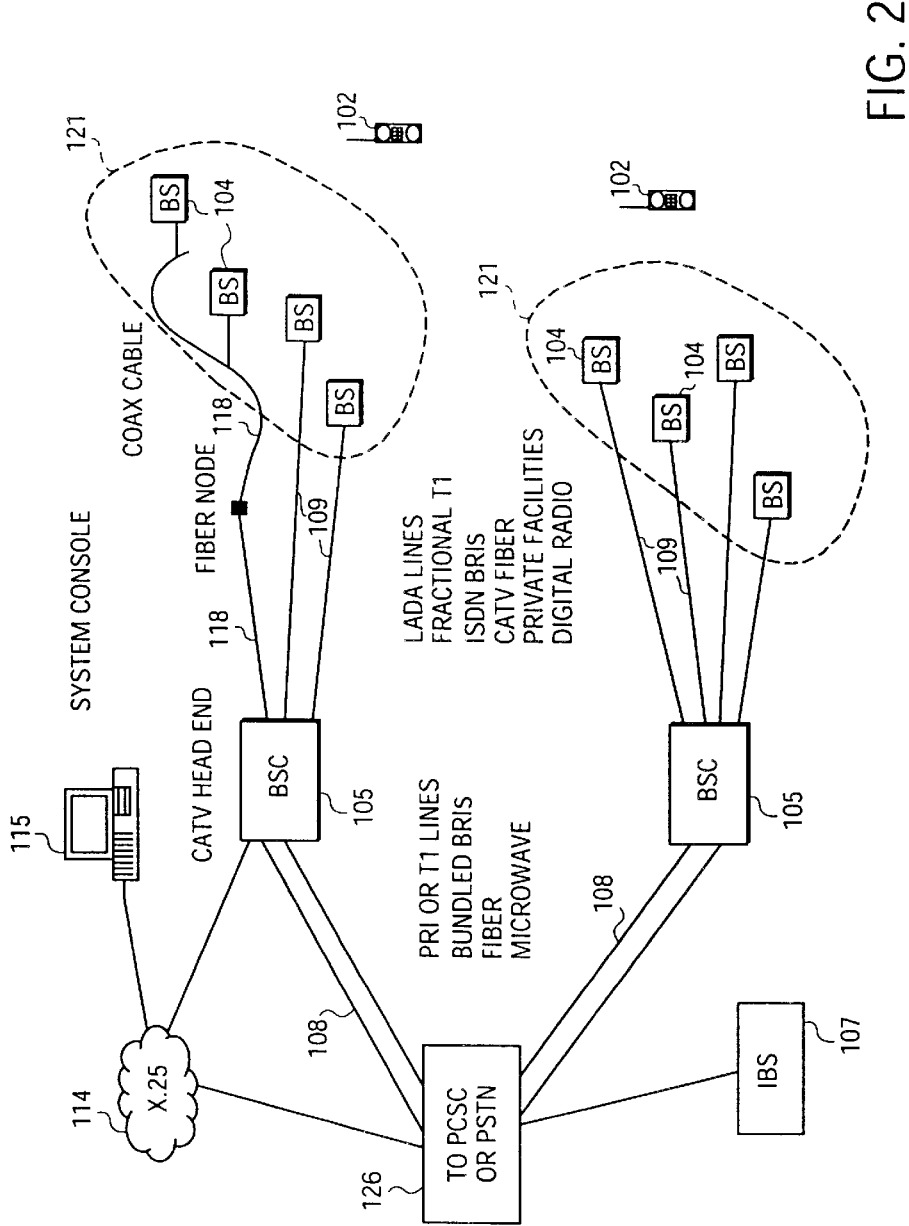
FIG. 2 is a diagram of one embodiment of a communication system.

FIG. 2 is a block diagram of a communication system architecture utilized in a preferred embodiment of the present invention. The FIG. 2 communication system comprises a plurality of base stations 104 for communicating with a plurality of user stations 102. The base stations 104 and user stations 102 may operate in a personal communications system (PCS), such as may be authorized under rules prescribed by the Federal Communications Commission (FCC).

Each base station 104 may be coupled to a base station controller 105 by any of a variety of communication paths 109. The communication paths 109 may each comprise one or more communication links 118. Each communication link 118 may include a coaxial cable, a fiber optic cable, a digital radio link, or a telephone line.

Each base station controller 105 may also be connected to one or more communication networks 126, such as a public switched telephone network (PSTN) or personal communication system switching center (PCSC). Each base station controller 105 is connected to a communication network 126 by means of one or more communication paths 108, each of which may include a coaxial cable, a fiber optic cable, a digital radio link, or a telephone line.

The FIG. 2 communication system also may include one or more "intelligent" base stations 107 which connect directly to a communication network 126 without interfacing through a base station controller 105. The intelligent base stations 107 may therefore bypass the base station controller 105 for local handoffs and switching of user stations 102, and instead perform these functions directly over the network 126.

In operation each base station 104 formats and sends digital information to its respective base station controller 105 (or directly to the network 126 in the case of an intelligent base station 107). The base station controllers 105 receive inputs from multiple base stations 104, assist handoffs between base stations 104, and convert and format channel information and signaling information for delivery to the network 126. The base station controllers 105 may also manage a local cache visitor location register (VLR) database, and may support basic operation, administration and management functions such as billing, monitoring and testing. Each base station controller 105, under control of the network 126, may manage local registration and verification of its associated base stations 104 and may provide updates to the network 126 regarding the status of the base stations 104.

The network 126 connects to the base station controllers 105 for call delivery and outgoing calls. Intelligent base stations 107 may use ISDN messaging for registration, call delivery and handoff over a public telephone switch. The intelligent base station 107 may have all the general capabilities of a base station 104 but further incorporate a basic rate ISDN (BRI) card, additional intelligence and local vocoding.

Figure 2A:
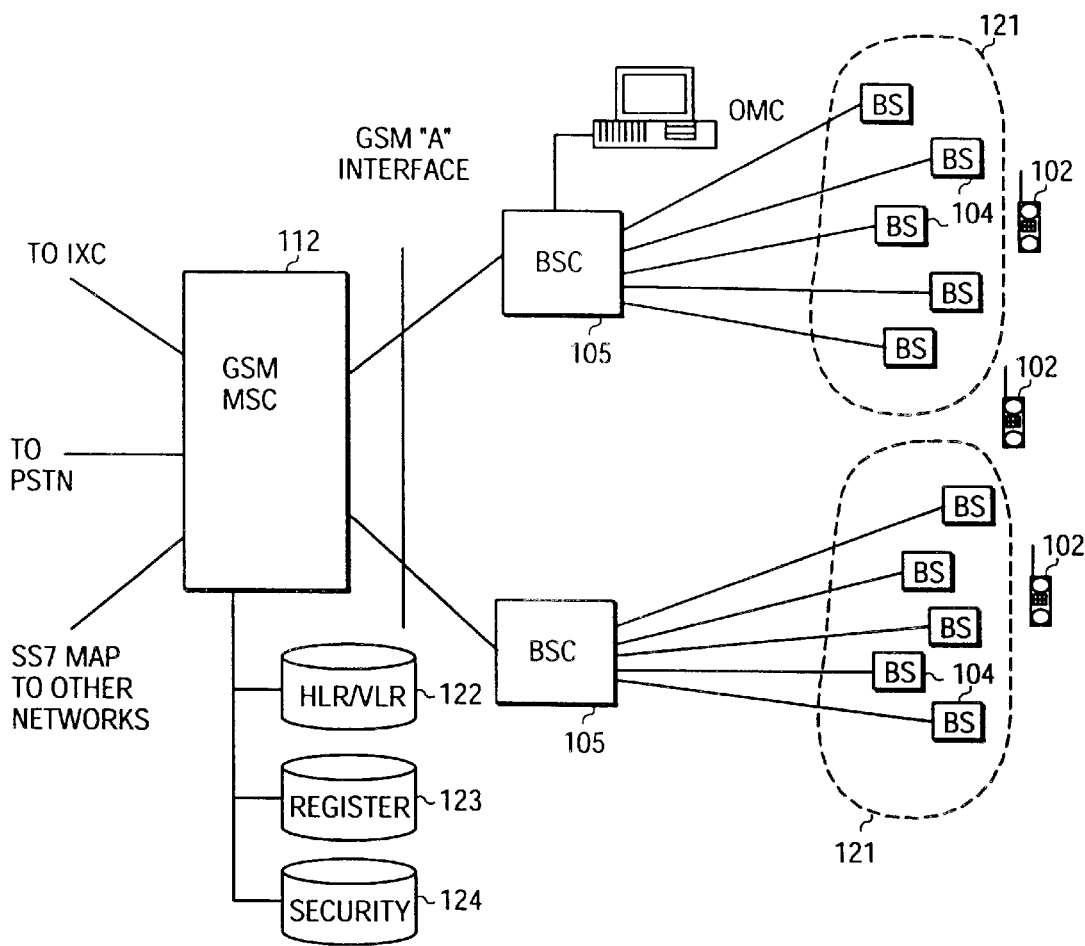
FIG. 2A is a block diagram of another embodiment of a communication system, using a GSM-based network interconnection.

The communication system may also be based on a GSM network interconnection. FIG. 2A is a diagram of a communication system architecture showing such an interconnection. In the communication system shown in FIG. 2A, the base stations 104 may connect to a GSM mobile switching center 112 through a GSM "A" interface. The "A" interface may be incorporated in base station controllers 105 and in intelligent base stations 107. Features and functionality of GSM may be passed to and from the base stations 104 over the "A" interface in a manner that is transparent to the end user (i.e., user stations 102). The GSM mobile switching center 112 may connect to a PSTN or to other networks, as indicated in FIG. 2A.

The system may also interconnect to cable television distribution networks. In such a system, the base stations 104 may be miniaturized so that they can be installed inside standard cable TV amplifier boxes. Interfacing may be carried out using analog remote antenna systems and digital transport mechanisms. For example, T1 and fractional T1 ("FT1") digital multiplexer outputs from the cable TV network may be used for interfacing, and basic rate (BRI) ISDN links may be used to transport digital channels.

Figure 1A:
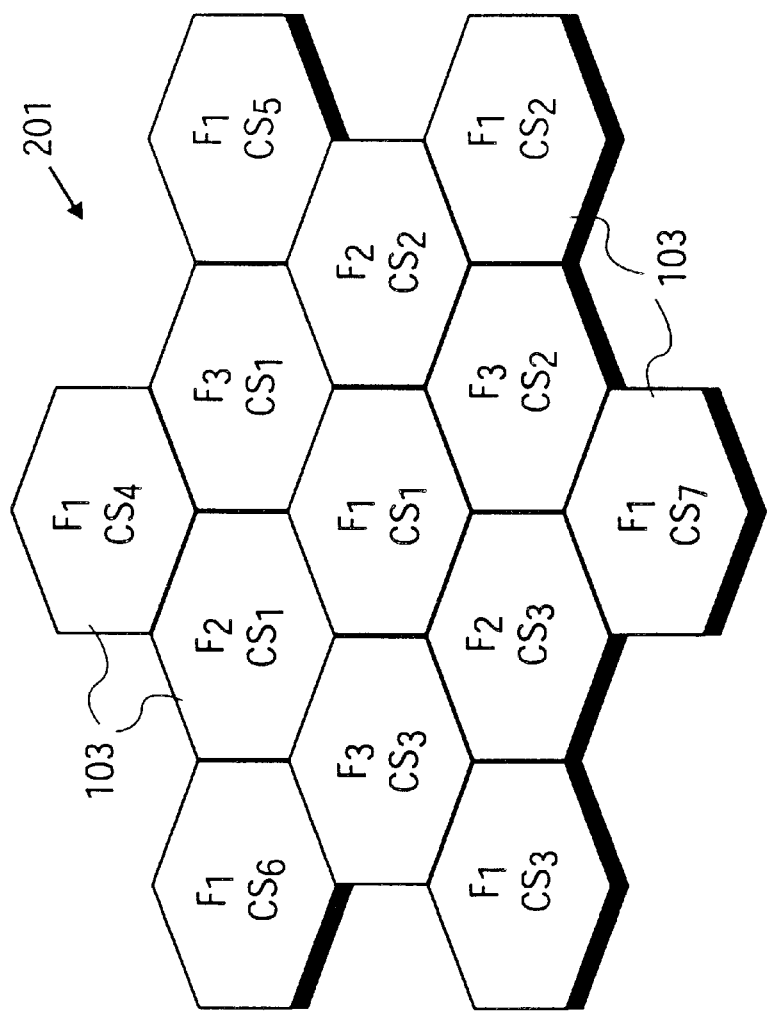
FIG. 1A is a diagram of an arrangement of cells in a wireless communication system showing an exemplary code and frequency reuse pattern.

FIG. 1A is a diagram of a preferred cellular environment in which the invention may operate. According to FIG. 1A, a geographical region 201 is divided into a plurality of cells 103. Associated with each cell 103 is an assigned frequency and an assigned spread spectrum code. Preferably, three different frequencies (or frequency groups) F1, F2 and F3 are assigned in such a manner that no two adjacent cells have the same assigned frequency (or frequency group) F1, F2 or F3, thereby minimizing RF interference between adjacent cells. The frequencies may be assigned on a "permanent" basis, or else dynamically through the network.

To further reduce the possibility of intercell RF interference, different near-orthogonal spread spectrum codes C1 through C7 are assigned as shown in a repeating pattern overlapping the frequency reuse pattern. Although a repeating pattern of seven spread spectrum codes C1 through C7 is preferred, a pattern involving other numbers of spread spectrum codes may be suitable depending upon the particular application. As with frequencies used in the cells 103, spread spectrum codes may be assigned on a "permanent" basis or else dynamically through the network. Further information regarding a suitable cellular environment for operation of the invention may be found in U.S. Pat. No. 5,402,413, assigned to the assignee of the present invention, and hereby incorporated by reference as if fully set forth herein.

The use of spread spectrum for carrier modulation permits a frequency reuse factor of N=3 for allocating different carrier frequencies F1, F2 and F3 to adjacent cells 103. Interference between cells 103 using the same carrier frequency F1, F2 or F3 is reduced by the propagation loss due to the distance separating the cells 103 (i.e., any two cells 103 using the same frequency F1, F2 or F3 are separated by at least one intervening cell 103, as shown in FIG. 1A), and also by the spread spectrum processing gain obtained by the use of near-orthogonal spreading codes.

Further details regarding an exemplary cellular pattern are described in, e.g., U.S. Pat. No. 5,402,413 referred to above.

Figure 3:
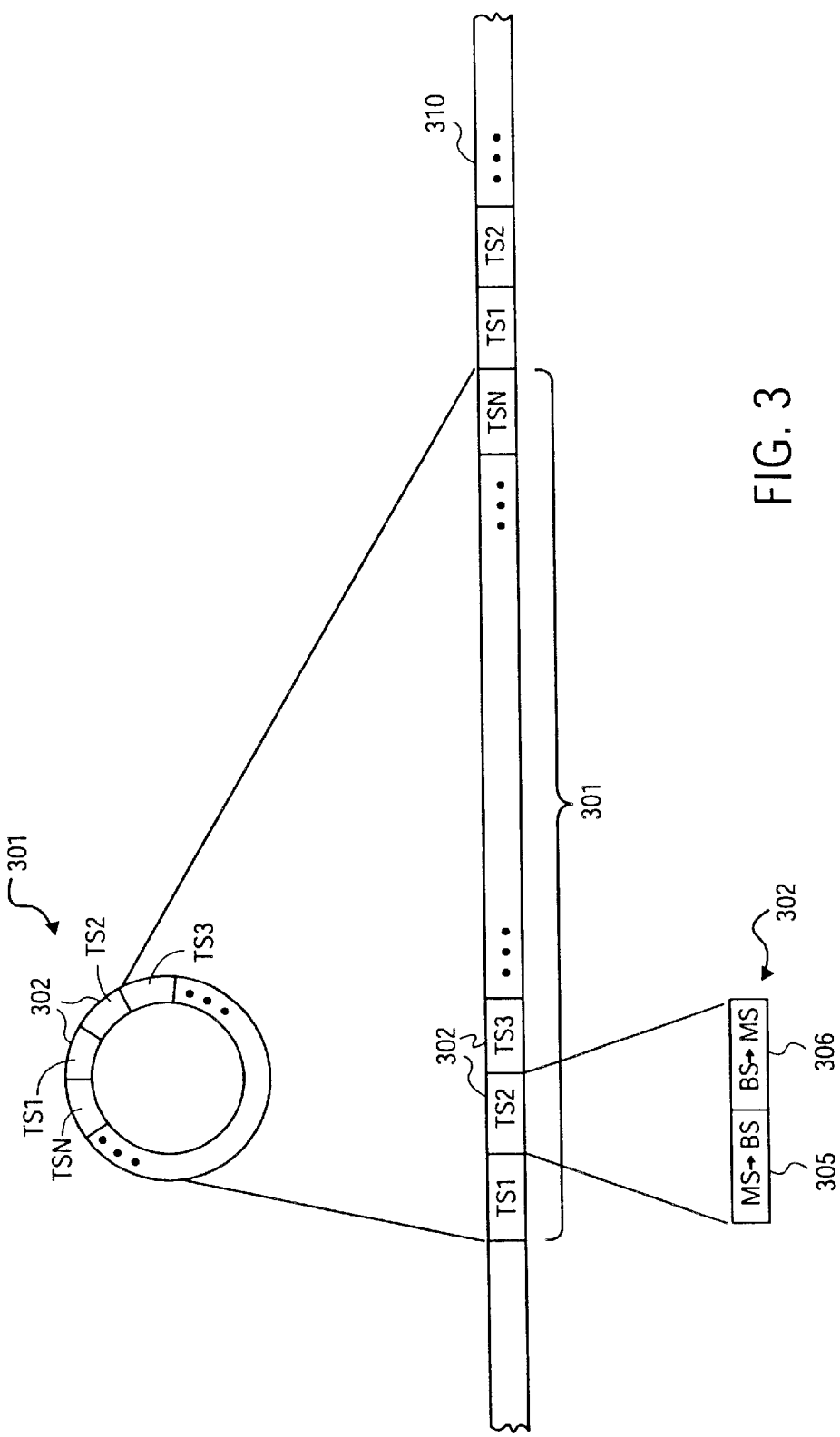
FIG. 3 is a diagram of a time frame divided into time slots.

A preferred embodiment of the invention achieves multiple access communication by using a time frame divided into multiple time slots, i.e., time division multiple access (TDMA). FIG. 3 is a diagram showing a timing structure for a particular TDMA system. According to the timing structure of FIG. 3, communication over time is broken into a continuous series of time frames 301. A single complete time frame 301 is shown along a timeline 310 in FIG. 3; similar time frames are assumed to precede and follow time frame 301 in a continuous pattern along the timeline 310.

Time frame 301 is divided into a plurality of time slots 302 numbered consecutively TS1, TS2 . . . TSN, each of which may support duplex communication with a user station 102. Time frame 301 may be thought of as a "polling loop" or a time loop, as depicted in FIG. 3, whereby user stations 102 are communicated with sequentially over the time frame 301 in a manner analogous to polling, each user station 102 transmitting and receiving messages in its designated time slot 302. In the FIG. 3 embodiment, each time slot 302 comprises a user transmission interval 305, wherein a user station 102 transmits a user-to-base message to the base station 104, and a base transmission interval 306, wherein the base station 104 transmits a base-to-user message to the user station 102. Communication in time slots 302 may be interleaved, such that user stations 102 transmit in one physical time slot 302 but receive in a different physical time slot 302.

In an exemplary TDMA communication system, time frames 301 are each in the neighborhood of 20 milliseconds in duration, and each time frame 301 comprises sixteen time slots 302 or, alternatively, eight time slots 302 to support extended range through increased guard times.

In some embodiments, a user station 102 may communicate in more than one time slot 302 in each time frame 301, so as to support an increased data rate. Similarly, in some embodiments, a user station 102 may periodically skip time frames 301 and communicate in some subset of all time frames 301 (e.g., every other time frame 301, or every fourth time frame 301), so as to support a reduced data rate where a full speed communication link is not necessary. Further information about an exemplary TDMA system supporting variable data rates as described above may be found in copending U.S. patent application Ser. No. 08/284,053 filed Aug. 1, 1994, previously incorporated herein by reference.

FIG. 6 is a diagram of a timing structure employing virtual time slots, each of which generally comprises a duplex pair (i.e., one forward link and one reverse link).

In FIG. 6, similar to FIG. 3, communication over time is broken into a continuous series of time frames 601. A single complete time frame 601 is shown along a timeline 610 in FIG. 6; similar time frames are assumed to precede and follow time frame 601 in a continuous pattern along the timeline 610.

Time frame 601 is divided into a plurality of physical time slots 602 numbered consecutively TS1', TS2' . . . TSN'. Each physical time slot 602 comprises a user transmission interval 605 wherein a user station 102 transmits a user-to-base message to the base station 104, and a base transmission interval 606 wherein the base station 104 transmits a base-to-user message to a user station 102, which could be a different user station 102 than transmitted to the base station 104 in the same physical time slot 602. Using virtual time slots, communication in physical time slots 602 may be interleaved, such that a user station 102 transmits in one physical time slot 602 but receives in a different physical time slot 602. The user transmission interval 605 and base transmission interval 606 which define the forward link and reverse link transmissions for a given user station 102 (and which are generally located in different physical time slots 602, as depicted in FIG. 6) are collectively referred to as a "virtual time slot."

An exemplary virtual time slot 618 is shown in FIG. 6, associated with a particular user station 102 (e.g., user station MS2). The virtual time slot 618 comprises two message transmission intervals, one in each of two physical time slots 602a and 602b. Virtual time slot 618 has a user transmission interval 605a in the first physical time slot 602a, and a base transmission interval 606b in the second physical time slot 602b. Between the user transmission interval 605a and the base transmission interval 606b of the virtual time slot 618, the base station 104 transmits in a base transmission interval 606a of the first physical time slot 602a (e.g., to a second user station 102, such as user station MS1), and another user station 102 (e.g., a third user station 102, such as user station MS3) transmits in a user transmission interval 605b to the base station 104. In this manner, transmissions to and from the base station 104 are interleaved.

Time frame 601 may be thought of as a "polling loop" or a time loop, similar to time frame 301 of the FIG. 3 embodiment, whereby user stations 102 are communicated with sequentially over the time frame 601 in a manner analogous to polling, each user station 102 transmitting and receiving messages in its designated virtual time slot 618. The virtual time slots 618 of FIG. 6, however, are not necessarily identical to the physical time slots 602. An advantage of the FIG. 6 timing structure is that it may allow extended time for the base station 104 to process channel characterization data as received from the user station 102.

In an exemplary TDMA communication system, time frames 601 are each 20 milliseconds in duration, and each time frame 601 comprises sixteen time slots 602 or, alternatively, eight time slots 602 to support extended range through increased guard times.

Further details regarding time frame structures (including virtual time slots) may be found in copending U.S. patent application Ser. No. 08/668,483 filed Jun. 21, 1996, hereby incorporated by reference as if set forth fully herein.

In some embodiments, a user station 102 may communicate in more than one virtual time slot 618 in each time frame 601, so as to support an increased data rate. Similarly, in some embodiments, a user station 102 may periodically skip time frames 601 and communicate in some subset of all time frames 601 (e.g., every other time frame 601, or every fourth time frame 601), so as to support a reduced data rate where a full speed communication link is not necessary.

Communication between a user station 102 and a base station 104 is established in one embodiment by a response from a user station 102 to a general polling message sent from the base station 104 during an available time slot 302. This process is described in more detail with reference to FIG. 4, which illustrates a protocol for establishment of a spread spectrum communication link in, e.g., the FIG. 3 communication system. A communication link may be established in an analogous manner for the FIG. 6 embodiment.

Figure 4A:
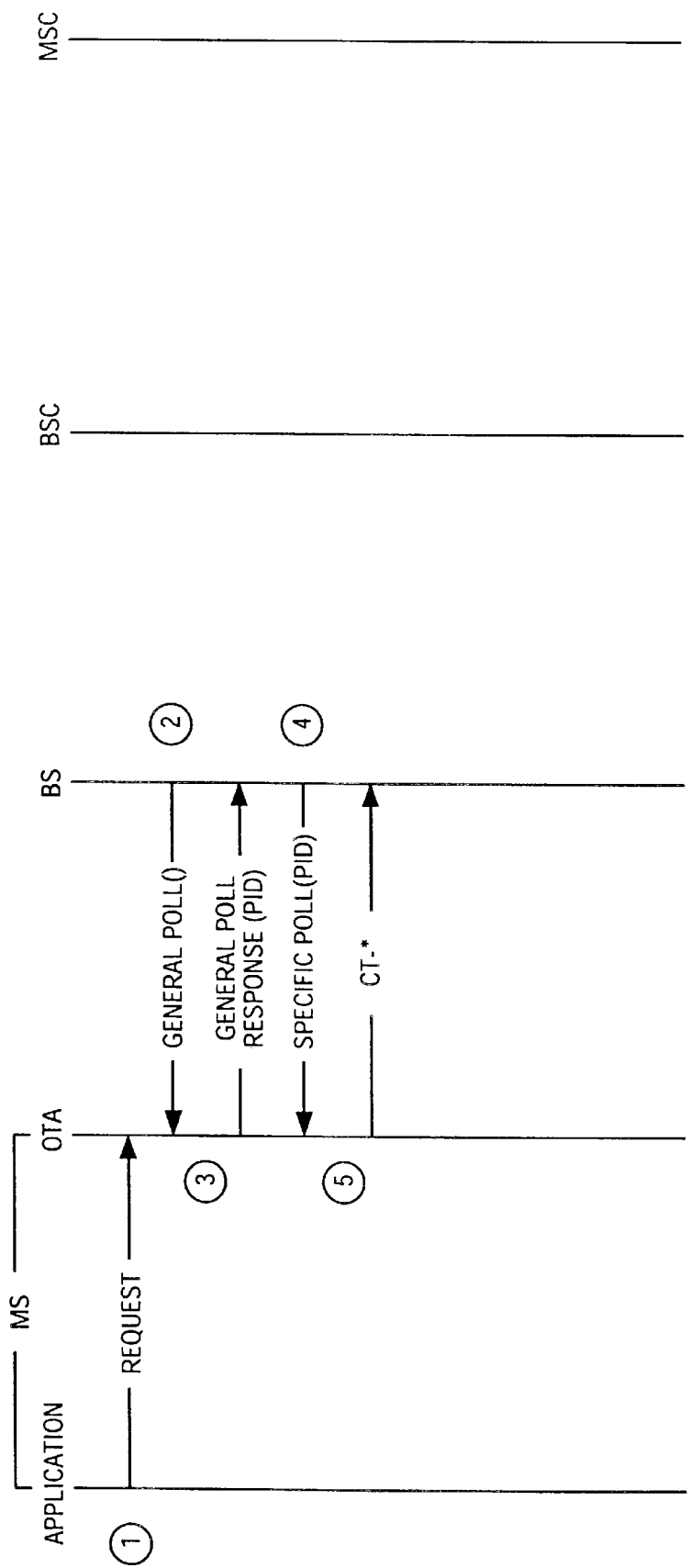
FIG. 4A is a message flow diagram corresponding to a protocol for establishing a communication link between a base station and a user station such as shown in FIGS. 4B and 4C.
Figure 4C:
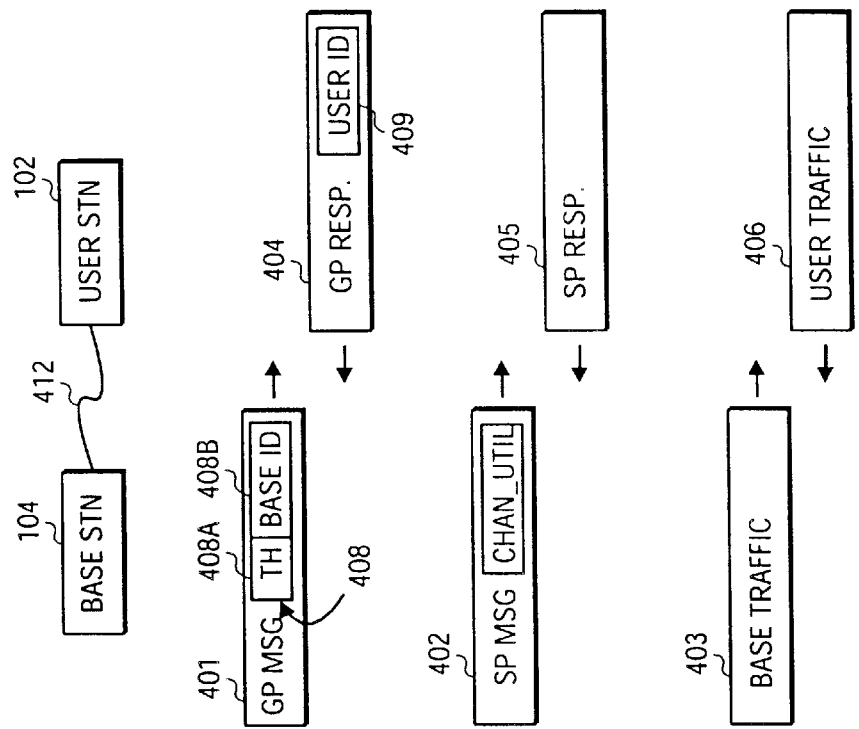
FIGS. 4B and 4C are diagrams illustrating a protocol for establishing a communication link between a base station and a user station.
Figure 4B:
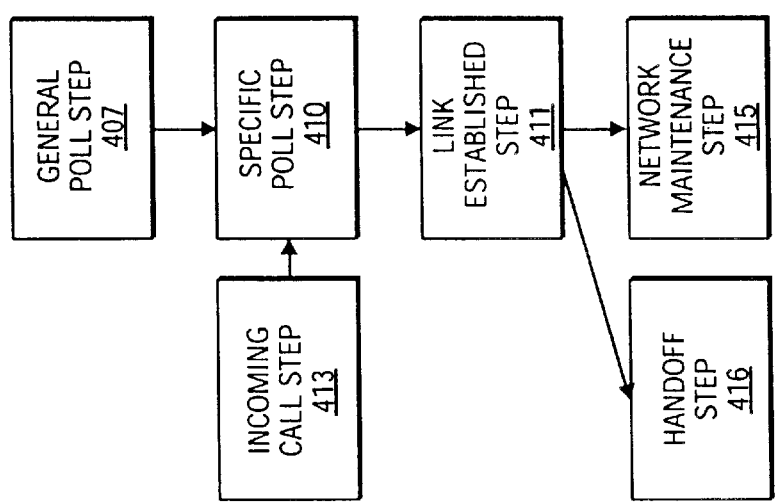

In the protocol shown in FIGS. 4B and 4C, a general poll message 401 is transmitted by the base station 104 in some or all of the time slots 302 which are available for communication. A user station 102 may monitor transmissions from a base station 104 and ascertain available time slots 302 by receiving general poll messages 401 in those time slots 302.

A user station 102 may "acquire" a base station 104 by a sequence of handshaking steps. At a general poll step 407, the base station 104 transmits its general poll message 401 during an unoccupied time slot 302. The user station 102 receives the general poll message 401 and, if it was received without error, transmits a general poll response 404 to the base station 104 in the same time slot 302 of the following time frame 301 (or in a different time slot, as explained hereafter). The general poll message 401 preferably comprises a field for a base ID 408b, which may be 32 bits long (for example), and which may be stored or otherwise recorded by the user station 102. Similarly, the general poll response 404 preferably comprises a field for a user ID 409, which may be 32 bits long (for example), and which may be stored or otherwise recorded by the base station 104.

Upon receiving a general poll response 404, at a specific poll step 410 the base station 104 transmits a specific poll message 402 comprising (among other things) the user ID 409 which had been previously received by the base station 104 as part of the general poll response 404. The user station 102 receives the specific poll message 402 and, if it was received without error and with the same user ID 409, transmits its specific poll response 405 to the base station 104 in the same time slot 302 of the following time frame 301 (or in a different time slot, as explained further herein). The specific poll response 405 comprises the same user ID 409 as the general poll response 404.

In a particular embodiment, the specific poll response 405 may be eliminated as redundant. The user station 102 may, in such a case, follow the specific poll message 402 with a user traffic message 406.

Upon receiving a specific poll response 405 comprising a user ID 409 which matches that of the general poll response 404, at a link-established step 411 the base station 104 may transmit a traffic message 403. At this point, the base station 104 and user station 102 have established a communication link 412. The base station 104 may connect a call through the communication channel, and the user station 102 may begin normal operation on a telephone network (e.g., the user station 102 may receive a dial tone, dial a number, make a telephone connection, and perform other telephone operations). The base station 104 and user station 102 may exchange traffic messages 403 and 406, until the communication link 412 is voluntarily terminated, until faulty communication prompts the user station 102 to re-acquire the base station 104, or until handoff of the user station 102 to another base station 104.

FIG. 4A illustrates a similar exchange of messages in a message flow diagram format, whereby a user station 102 establishes communication with a base station 104.

Should more than one user station 102 respond to the same general poll message 401, the base station 104 may intentionally fail to respond with a specific poll message 402. The lack of response from the base station 104 signals the involved user stations 102 to back off for a calculated time interval before attempting to acquire the same base station 104 using the general poll message 401 and general poll response 404 protocol. The back-off time may be based upon the user ID 409, and therefore each user station 102 will back off for a different length of time to prevent future collisions, in a manner similar to that specified by IEEE Standard 802.3.

When an incoming telephone call is received at a base station 104 at an incoming-call step 413, the base station 104 skips the general poll message 401 and general poll response 404 and moves directly to the specific poll step 410. The base station 104 transmits a specific poll message 402 with the user ID 409 of the indicated recipient user station 102 on an available time slot 302. As further described herein, each user station 102 listens regularly for the specific poll message 402 so as to receive the specific poll message 402 within a predetermined time after it is transmitted. When the specific poll message 402 is received, the user station 102 compares the user ID 409 in the message with its own user ID, and if they match, continues with the link-established step 411. The base station 104 may thereby establish a communication link 412 with any user station 102 within communication range.

Further details regarding means for establishing communication (particularly spread spectrum communication) in a TDMA system may be found in copending U.S. Pat. No. 5,455,822 and in copending U.S. patent application Ser. No. 08/284,053 filed Aug. 1, 1994, both of which are hereby incorporated by reference as if fully set forth herein.

Figure 8A:
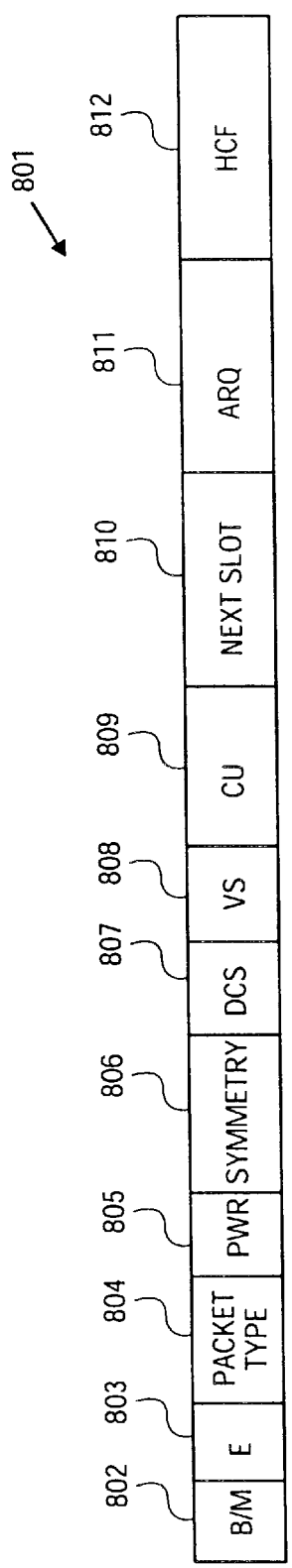
FIGS. 8A and 8B are diagrams of message header formats.

In a preferred embodiment, the general poll message 401 comprises a next slot pointer (contained in a next slot pointer field 810 shown in and described with respect to FIG. 8A) which indicates the next time slot 302 (or virtual time slot 618) during which a general poll message 401 will be transmitted by the base station 104. In such an embodiment, a user station 102 seeking to establish communication responds to the general poll message 401 in the user transmission interval 305 (or 605) of the time slot 302 (or 618) indicated by the next slot pointer, and not necessarily in the same time slot of the next time frame 301 (or 601). Upon receiving a general response message 404 from the user station 102 in the time slot indicated by the next slot pointer, the base station 102 responds with a specific poll message 402. Should more than one user station 102 respond to a general poll message 401, the appearance of a general poll message 401 (rather than a specific poll message 402) in the time slot indicated by the next slot pointer will cause each user station 102 involved to back off for a variable period of time depending on the user station ID.

The specific poll message 402 comprises a temporary shorthand identifier (nickname) specific to the user station 102 and referred to herein as a "correlative ID." The correlative ID appears in subsequent signaling messages (in both directions) until the established link is dropped. In response to the specific poll message 402, the user station 102 responds with a traffic message in a time slot 302 (or 618) assigned by a next slot pointer in the header of the specific poll message 402.

Further details of how the next slot pointer (sometimes referred to simply as the slot pointer) is used within preferred embodiments are described below, after a brief description of various time intervals within a time slot and basic message structures and formats. The particular time intervals, messages structures and formats are meant to be illustrative and to represent various preferred embodiments for demonstrating the workings of the invention, and are not meant to limit the invention to any particular type of message structure or format, or any particular type of time slot structure.

FIG. 5A is a diagram of a preferred slot structure, and FIGS. 5B and 5C are diagrams of a base station transmit data frame structure and a user station transmit date frame structure, respectively. In FIG. 5A, a time slot 510 comprises a variable radio delay gap 505, a user station transmit frame 515, a base processor gap 525, a guard time 535, a base station transmit frame 545, and a radar gap 555. Each user station transmit frame 515 comprises a user preamble 516, a user preamble sounding gap 519, and a user station transmit data frame 521. Similarly, each base station transmit frame 545 comprises a base preamble 547, a base preamble sounding gap 549, and a base transmit data frame 551.

FIG. 5B illustrates a preferred message structure for the base station transmit data frame 551. The message structure of FIG. 5B comprises a base header field 553, a base D-channel field 557, a base data field 559, and a base cyclical redundancy check (CRC) field 561. In a preferred embodiment, the base header field 553 is 23 bits, the base D-channel field 557 is 8 bits, the base data field 559 is 192 bits, and the base CRC field 561 is 16 bits.

FIG. 5C illustrates a preferred message structure for the user station transmit data frame 521. The message structure of FIG. 5C comprises a user header field 523, a user D-channel field 527, a user data field 529, and a user CRC field 531. In a preferred embodiment, the user header field 523 is 17 bits, the user D-channel field 527 is 8 bits, the user data field 529 is 192 bits, and the user CRC field 531 is 16 bits.

Figure 7A:
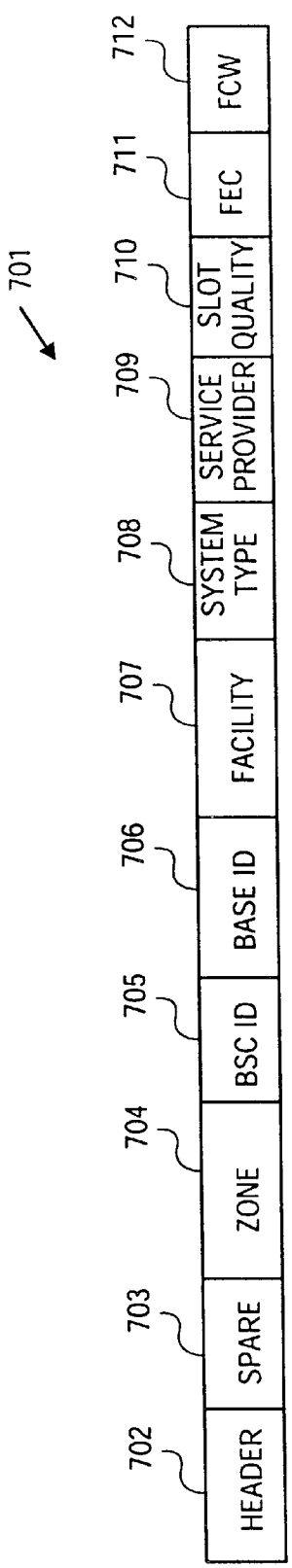
Figure 7B:
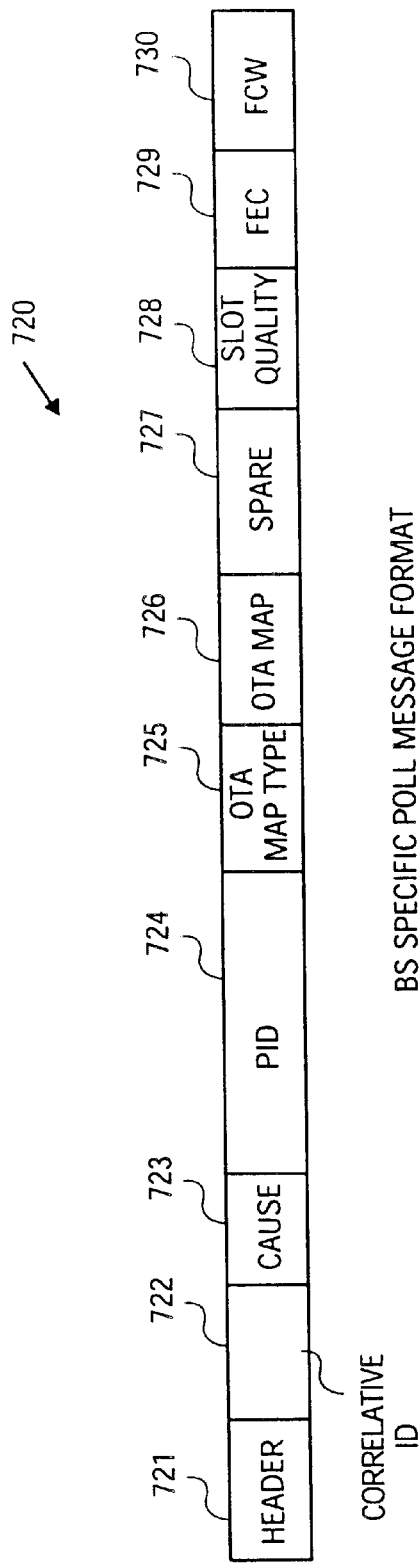

FIGS. 7A–7C are diagrams of preferred polling message formats. FIG. 7A is a diagram of a general poll message format, such as may be employed, for example, with general poll message 401 of FIG. 4. As shown in FIG. 7A, a general poll message 701 preferably comprises, in the following sequence, a header field 702, a spare field 703, a zone field 704, a base station controller (BSC) ID field 705, a base ID field 706, a facility field 707, a system type field 708, a service provider field 709, a slot quality field 710, a forward error correction (FEC) field 711, and a frame control word (FCW) field 712. In a preferred embodiment, the header field 702 is 24 bits long, the spare field 703 is 16 bits long, the zone field 704 is 40 bits long, the BSC ID field 705 is 16 bits long, the base ID field 706 is 32 bits long, the facility field 707 is 32 bits long, the system type field 708 is 8 bits long, the service provider field 709 is 16 bits long, the slot quality field 710 is 8 bits long, the FEC field 711 is 32 bits long, and the frame control word field 712 is 16 bits long, for a total of 240 bits.

The header field 702 identifies the message type and is described more fully with respect to FIG. 8A. The zone field 704 identifies the paging zone of the specific base station 104. A user station 102 may move from one base station 104 service area to another in the same zone without requiring immediate re-registration. The BSC ID field 705 is a sequence uniquely identifying the base station controller 105. The base ID field 706 is a sequence uniquely identifying the base station 104. The facility field 707 describes the services offered by the base station 104 (e.g., internet access, aggregate data capability, enhanced voice, etc.). The facility field 707 may include a sub-field indicating what user stations may have access to the channel (e.g., 911 calls only, or user stations 102 with specific access codes). The system type field 708 identifies the type of system associated with the base station 104. The service provider field 709 identifies the PCS service provider that operates the base station 104 (or, if more than one service provider is available at the base station 104, the service provider that currently operates the particular time slot). The slot quality field 710 indicates the relative quality of the time slot in terms of interference. Generally, the lower the number, the better the slot quality. The FEC field 711 is used for forward error correction. The FCW field 712 is used for error detection, and in one embodiment comprises a sequence of bits and/or phase shifts determined according to following algorithm:

1. Calculate remainder R1 of a seed polynomial SDP modulo-2 divided by a generator polynomial GRP;
2. Calculate product P of $x^{16}$ and content of the message 701 preceding FCW field 710;
3. Calculate remainder R2 of the generator polynomial GNP modulo-2 divided by the product P derived in Step 2;
4. Calculate modulo-2 sum S of remainder R1 and remainder R2; and
5. Calculate the ones-complement of sum S the result of which is transmitted in the FCW field 710.

In a preferred embodiment, the seed polynomial SDP is:

$$x^k(x^{15}+x^{14}+x^{13}+x^{12}+x^{11}+x^{10}x^9+x^8+x^7+x^6+x^5+x^4+x^3+x^2+x^1+1)$$

and the generator polynomial GRP is:

$$x^{16}+x^{12}+x^5+1$$

FIG. 7B is a diagram of a specific poll message format (such as may be employed, for example, with specific poll message 402 of FIG. 4). As shown in FIG. 7B, a specific poll message 720 preferably comprises, in the following sequence, a header field 721, a correlative ID field 722, a cause field 723, a personal identifier (PID) field 724, an over-the-air (OTA) map type field 725, an OTA map field 726, a spare field 727, a slot quality field 728, a forward error correction field 729, and an FCW field 730. In a preferred embodiment, the header field 721 is 24 bits long, the correlative ID field 722 is 8 bits long, the cause field 723 is 8 bits long, the PID field 724 is 72 bits long, the OTA map type field 725 is 8 bits long, the OTA map field 726 is 32 bits long, the spare field 727 is 32 bits long, the slot quality field 728 is 8 bits long, the FEC field 729 is 32 bits long, and the FCW field 729 is 16 bits long, for a total of 240 bits.

The header field 721, slot quality field 728, FEC field 729, and FCW field 730 are similar to the analogous fields described for FIG. 7A. The correlative ID field 722 is used to temporarily identify one or more channels (i.e., time slots) as being allocated to a specific user station 102. A correlative ID number is assigned for the duration of a call connection and is released for reuse by another user station 102 at the termination of a connection; the correlative ID number may also be changed during a connection. A specific correlative ID number may be reserved by the base station 104 for broadcast use. The cause field 723 indicates the cause of an error occurring during execution of a previous signaling traffic operation for the particular user station 102. Interpretation of the cause field 723 message may therefore depend upon the type of signal traffic involved. Possible cause messages include, for example, those indicating that the user station 102 is unregistered or will not be accepted for registration, or that the call has not been connected or cannot be completed. The PID field 724 comprises a personal identification number which uniquely identifies the subscriber (e.g., user station 102). The OTA map type field 725 defines the type of map (e.g., superframe, subframe, etc., as defined later herein) that follows in the OTA map field 726. The OTA map field 726 describes the mapping of time slots relative to a particular user station 102. The format of the OTA map field 726 depends on the map type.

FIG. 7C is a diagram of a poll response message format (such as may be employed, for example, with general poll response 404 or specific poll response 405 of FIG. 4). As shown in FIG. 7C, a poll response message 740 preferably comprises, in the following sequence, a header field 741, a first spare field 742, a PID field 743, a service provider field 744, a class field 745, a user capabilities field 746, a second spare field 747, an FEC field 748, and an FCW field 749. In a preferred embodiment, the header field 741 is 17 bits long, the first spare field 742 is 16 bits long, the PID field 743 is 72 bits long, the service provider field 744 is 16 bits long, the class field 745 is 16 bits long, the user capabilities field 746 is 16 bits long, the second spare field 747 is 32 bits long, the FEC field 748 is 32 bits long, and the FCW field 749 is 16 bits long, for a total of 233 bits.

Figure 8B:
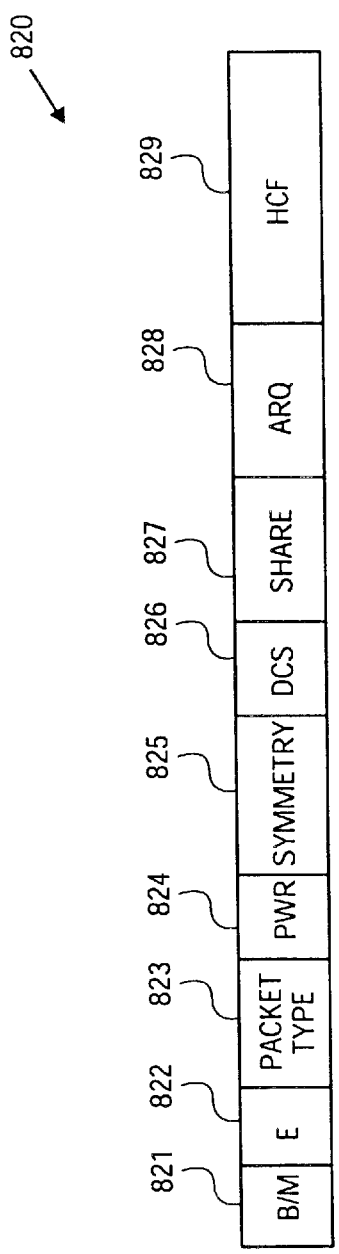

The header field 741 identifies the message type and is more fully described in FIG. 8B. The PID field 743, FEC field 748, and FCW field 746 are similar to the PID field 724, FEC field 729, and FCW field 730, respectively, described with respect to FIG. 7B. The service provider field 744 identifies the PCS service provider that the user station 102 wishes to use. The class field 745 specifies some of the operational parameters being used by the particular user station 102. The class field 745 may comprise a class type sub-field and a class information sub-field. The class type sub-field indicates the user station class type (e.g., DCS1900 class type, or IS-41 class type, etc.), and may also provide an indication of the power level capability of the user station 102. The class information sub-field provides operational information including, for example, revision level, available encryption algorithms, short message capability, ellipsis notation and phase-2 error handling capability, power class, continuous/discontinuous transmission, bandwidth (e.g., 20 MHz or 25 MHz), and nominal power levels. The class type sub-field may, for a GSM-oriented system, indicate the power level capability of the user station 102. The user capabilities field 746 identifies the features present in the user station 102 (e.g., whether the user station 102 can receive a fax or data connection, whether the user station 102 is capable of ciphering, etc.).

FIGS. 8A and 8B are diagrams of preferred polling message header formats. FIG. 8A is a diagram of a polling message header format for a base polling message (such as general poll message 401 or specific poll message 402 of FIG. 4). The polling message header 801 comprises a base/mobile indicator (B/M) flag 802, an extended protocol (E) flag 803, a packet type field 804, a power adjustment (PWR) field 805, a symmetry field 806, a D-channel suppression (DCS) flag 807, a virtual slot (VS) flag 808, a slot or channel utilization (CU) field 809, a slot pointer field 810, a error check and correct (ARQ) field 811, and a header frame control word (HCF) field 812. In a preferred embodiment, the B/M indicator flag 802, E flag 803, PWR field 805, DCS flag 807, and the VS flag 808 are each 1 bit long, the packet type field 804 and symmetry field are each 2 bits long, the CU field 809 and ARQ field are each 3 bits long, and the slot pointer field 810 and header HCF field 812 are each 4 bits long, for a total of 23 bits. A twenty-fourth bit of the header 801 is used for the purpose of assisting establishment of the RF link.

The B/M indicator flag 802 indicates whether the originator of the message is a user station 102 or the base station 104. The E flag 803 is used to indicate whether or not an extended protocol is in use. The packet type field 804 specifies which of four packet types is being used, according to Table 8-1A below.

TABLE 8-1A

| Packet Field | Packet Type |
| --- | --- |
| 00 | Normal traffic |
| 01 | Specific poll |
| 10 | Control (signaling) traffic |
| 11 | General poll, or general response |

The packet type field 804 also provides an indication of the usage of the D-field 557, according to Table 8-1B below.

TABLE 8-1B

| Packet Field | D-Field Usage |
| --- | --- |
| 00 | D-Channel |
| 01 | Correlative ID |
| 10 | Correlative ID |
| 11 | Reserved |

The PWR field 805 is a serialized bit stream from the base station 104 to the user station 102 allowing control of the power level of the user station 102 transmitter. As each base-to-user message is received at the user station 102, the PWR bit from the last message is analyzed along with the current PWR bit to determine if the power level of the user station 102 transmitter should be raised, lowered or remain unchanged. Power control action therefore requires that at least two consecutive base-to-user messages be received by the user station 102 before any action is taken. The action taken is dictated according to Table 8-2 appearing below.

TABLE 8-2

| Last Bit | Current Bit | Action |
| --- | --- | --- |
| 0 | 0 | Decrease transmitter power |
| 1 | 1 | Increase transmitter power |
| 0 | 1 | Leave power unchanged |
| 1 | 0 | Leave power unchanged |
| missing | any | Leave power unchanged |
| any | missing | Leave power unchanged |

The amount of power increase or decrease carried out in response to receiving commands in the PWR field 805 may be a fixed or preset amount—e.g., 1 dB for each time frame 301 (or more frequently if the user station 102 is transmitting in multiple time slots 302 per time frame 301). Using only a single bit for the PWR field 805 saves space in the header 553 of the base-to-user message. The quality metrics generally provide sufficient feedback to allow small power adjustment steps over time, but not sufficient feedback to have confidence in making substantial power adjustment steps. However, because user station transmissions are separated by time within the general geographic region of a particular base station 104, strict power control of the user stations 102 is not required to avoid intracell or intercell interference as it typically is with CDMA systems not employing time division techniques.

The symmetry field 806 is used by the base station 104 to grant bandwidth to the user station 102. The bandwidth grant applies to the next time slot 302 (or 618) in the channel. The symmetry field 806 contents may be interpreted according to Table 8-3 below.

TABLE 8-3

| Symmetry Bits | Meaning |
| --- | --- |
| 00 | Symmetric bandwidth grant. Each direction has been granted one half of the bandwidth. |
| 01 | The maximum bandwidth has been granted to the user station 102, and the minimum bandwidth has been granted to the base station 104. |
| 10 | The maximum bandwidth has been granted to the base station 104, and the minimum bandwidth has been granted to the user station 102. |
| 11 | Broadcast mode. The entire bandwidth has been granted to the base station 104. There is no user station 102 packet. |

The DCS flag 807 indicates the usage of the D-channel for the current message. The DCS flag 807 is set to one value to indicate that the D-channel is disabled to reserve it for use by the application using the bearer channel (B-channel), and is set to another value to indicate that the D-channel is enabled for other usage. The VS flag 808 indicates whether the base station 104 is using a virtual slot mode. If the virtual slot mode is active (e.g., the time slot structure of FIG. 6 is used), then all user station 102 transmissions occur one time slot earlier than if the VS mode is inactive.

The CU field 809 indicates the relative slot utilization for the base station 104. In a preferred embodiment, the CU field contents are defined according to Table 8-4 below.

TABLE 8-4

| CU Field Contents | Utilization |
| --- | --- |
| 000 | No channels available: Find another base station |
| 001 | One channel available: 911 calls only |
| 010 | Two channels available: 911 calls or handover only |
| 011 | Few channels available: Class control is in effect for registrations and originations |
| 100 | Nearly full: Access Unrestricted |
| 101 | Moderately full: Access Unrestricted |
| 110 | Partially full: Access Unrestricted |
| 111 | All slots available: Access Unrestricted |

Where class control is in effect for registrations and call originations, access leveling and load leveling classes may be identified in the facility field 707 of the general poll message (see FIG. 7A).

The slot pointer field 810 contains an index which identifies the next time slot to be used in the current base/user packet exchange. The user station 102 transmits in the time slot indicated by the slot pointer to continue the exchange. In a particular embodiment, the contents of the slot pointer field 810 may take on any of sixteen different values (e.g., binary 0 to 15), with each value indicating a different relative number of time slots from the present time slot in which the user station 102 is to transmit. For example, a value of zero means that the user station 102 is to transmit in the same slot (in the next frame if at a regular bandwidth rate, or several frames in the future if using a sub-frame rate). A value of one means that the user station 102 is to transmit in the next time slot of the present time frame. A value of two means that the user station 102 is to transmit in the time slot two places ahead in the present time frame, and so on. Examples of operation using slot pointers are described further below.

The ARQ field 811 allows the receiving entity (either base station 104 or user station 102) to correct a message error. The ARQ field 811 comprises three subfields of one bit each: (1) an "ARQ required" sub-field that indicates whether or not ARQ is required for the message sent; (2) an "ACK" sub-field indicating whether or not the sender of the message received correctly the last message sent; and (3) a "message number" sub-field, which indicates the message number (zero or one) of the current message. The ACK sub-field and message number sub-field are always used regardless of whether the ARQ required bit is set.

If ARQ is required (as determined by the value of the ARQ required bit), then the receiving entity performs the following steps:

(1) Compares the message number sub-field of the received message with the message-number sub-field of the previously received message; if they are the same, the new message is ignored.

(2) Checks the ACK sub-field of the received message. If the value is NAK (indicating that the sender of the message did not receive the last message correctly), then the receiving entity resends the old data message; otherwise, it sends a new data message.

(3) Complements the message number sub-field bit each time a new data message is sent.

(4) If a message is received with a FCW error (as explained with respect to FIG. 7A), or did not receive a message at all, then the receiving entity sends its data message with the ACK sub-field set to NAK.

The header HCF field 812 is used for a cyclic redundancy check calculated over the preceding bits of the message header.

FIG. 8B is a diagram of a polling message header format for a poll response message (such as general poll response 404 or specific poll response 405 of FIG. 4). The polling response header 820 comprises a base/mobile indicator (B/M) flag 821, an extended protocol (E) flag 822, a packet type field 823, a PWR field 824, a symmetry field 825, a DCS flag 826, a spare field 827, an ARQ field 828, and a header frame control word (HCF) field 829. In a preferred embodiment, the B/M indicator flag 821, E flag 822, and DCS flag 826 are each 1 bit long, the packet type field 823, symmetry field 825, and spare field 827 are each 2 bits long, the ARQ field 828 is 3 bits long, and the HCF field 829 is 4 bits long, for a total of 17 bits.

The B/M indicator flag 821, E flag 822, packet type field 823, PWR field 824, DCS flag 826, ARQ field 828 and HCF field 829 are used for the same purposes as their counterpart fields in the base station header shown in FIG. 8A. The contents of the symmetry field 825 in the user station 102 header may be interpreted according to Table 8-5 below.

TABLE 8-5

| Symmetry Field | Meaning |
| --- | --- |
| 00 | Symmetric bandwidth is requested for the next time slot |
| 01 | Maximum bandwidth is requested for the next time slot |
| 10, 11 | (Not presently used) |

In one embodiment in accordance with the header formats of FIGS. 8A and 8B, the message headers shown in Table 8-6 correspond to the message types shown (where "1" and "0" are bit values, and "X" is a bit value that is irrelevant or depends upon the application and/or system status).

TABLE 8-6

| Message Type | Header Contents |
| --- | --- |
| BS General Poll | 1X11 XXXX XXXX XXXX XXXX XXX |
| BS Specific Poll | 1X01 XXXX XXXX XXXX XXXX XXX |
| BS Control Traffic | 1X10 XXXX XXXX XXXX XXXX XXX |
| BS Traffic Message | 1X00 XXXX XXXX XXXX XXXX XXX |
| MS General Response | 0X11 XXXX XXXX XXXX X |
| MS Specific Response | 0X01 XXXX XXXX XXXX X |
| MS Control Traffic | 0X10 XXXX XXXX XXXX X |
| MS Traffic Message | 0X00 XXXX XXXX XXXX X |

FIG. 13A is a diagram of a base station information packet showing in octet format fields generally depicted in FIGS. 5B and 8A. FIG. 13B is a diagram of a user station information packet showing in octet format fields generally depicted in FIGS. 5C and 8B.

Data may be transmitted between the base station 104 and user stations 102 using an M-ary spread spectrum technique. Suitable M-ary spread spectrum transmission and reception techniques are described in, e.g., U.S. Pat. No. 5,022,047 and in U.S. Pat. No. 5,692,007, both of which are assigned to the assignee of the present invention, and both of which are hereby incorporated by reference as if set forth fully herein. In a preferred embodiment, the base station 104 and user stations 102 each transmit M-ary direct sequence spread spectrum signals using spread spectrum codes (called "symbol codes") of 32 chips. Preferably, N data bits are transmitted per symbol code, with M different symbol codes are used to represent up to M different data symbols, where $M = \log_2 N$. In a preferred embodiment, thirty-two different symbol codes are used to represent thirty-two different data symbols, each comprising five bits of data, and differential phase encoding is used to allow transmission of a 6th bit of data for each symbol code. Techniques of phase encoding for transmission of an additional bit of information per symbol code are described in, e.g., U.S. Pat. No. 5,692,007 referred to above.

Because the base header field 553 is positioned first in the base transmit data frame 551, it "loses" the first bit from the first transmitted data symbol (which is transmitted using a differential encoding technique) because it is used as a phase reference bit. Thus the base header field 553, which comprises four data symbols, is 23 bits in length. The first data symbol comprises five data bits, and the latter three data symbols each comprises six data bits. Likewise, because the user header field 523 is positioned first in the user transmit data frame 521, it "loses" the first bit from the first transmitted data symbol because it is used as a phase reference bit. Thus the user header field 523, which comprises three symbols, is 17 bits in length. The first data symbol comprises five data bits, and the latter two data symbols each comprises six data bits.

Signaling messages (i.e., messages used for control traffic) may be used to assist in acquisition and maintenance of a channel from the network. Over-the-air signaling messages may commence with a "message type" data element located in a message type field. The message type data element defines the format of the rest of the message, and acts as an operation code to the destination unit (either user station 102 or base station 104). Exemplary message types for over-the-air signaling (i.e., control traffic) messages appear in Table 9-1 below.

TABLE 9-1

| | |
|---|---|
| ACK | Acknowledge |
| ANS | Answer Incoming Call |
| AUT | Authentication Request |
| AUR | Authentication Response |
| BAI | Base Assist Information |
| CIP | Set Cipher Mode |
| CNC | Call Connected |
| CSC | Circuit Switch Complete |
| DRG | De-registration Request |
| DRP | Drop Incoming Connection |
| HLD | Hold |
| ORH | Originating Handover Request |
| ORG | Originate Call |
| RCP | Registration Complete |
| RRQ | Registration Request |
| SET | Set Services |
| SPR | Specific Response |
| SYN | Synchronize |
| THR | Target handover Request |
| TRA | Transport Message |

The number of bits of the message type data element used to identify the type of message depends mainly upon the number of control traffic message supported by the system. In a preferred embodiment, the message type is 8 bits in length. Additional information needed to process or act upon the message may be contained in other fields in the signaling message.

Messages exchanged between the base station 104 and base station controller 105 or other network entities can be mapped to a local or internal format referred to as "Notes". Some of these Notes may resemble the over-the-air signaling messages exchanged between the base station 104 and the user station 102, in order to expedite processing of the control traffic messages. The base station controller 105 may act as a protocol interface whereby signaling messages are translated to a form compatible with the mobile switching center 112 and/or network.

The general content of certain over-the-air signaling messages that play a role in handover and related functions are set forth in the tables appearing below. The message content may be viewed as an aspect of "layer three" protocol architecture.

TABLE 10-1

Hold (CT-HLD)

| Information Element | Length in Bits |
|---|---|
| Message Type | 8 |
| Reserved | 152 |

Hold (CT-HLD) control traffic messages can be transmitted either by the base station 104 or the user station 102. They are generally part of a larger signaling traffic exchange. The user station 102 sends a CT-HLD control traffic message to the base station 104 when the user station 102 requires more time to process data and return a result to the base station 104, or when responding to a CT-HLD control traffic message from the base station 104.

TABLE 10-2

Acknowledge (CT-ACK)

| Information Element | Length in Bits |
|---|---|
| Message Type | 8 |
| ACK Response | 8 |
| Ack'd Command | 8 |
| Ack State | 8 |
| Reserved | 128 |

Acknowledge (CT-ACK) control traffic messages can be transmitted by either the base station 104 or the user station 102. It is not necessary the every exchange of control traffic messages end with a CT-ACK message.

The Ack Response information element of the CT-ACK message contains an acknowledgment response indicator. One of two binary values (i.e., a "0" bit) indicates success, while the other of the two binary values (i.e., a "1" bit) indicates failure. The Ack'd Command information element contains the Message Type of the specific command being acknowledged. The Ack State information element contains the current state of the system element (i.e., the base station 104 or user station 102) which is transmitting the acknowledge.

TABLE 10-3

Set Cipher Mode (CT-CIP)

| Information Element | Length in Bits |
|---|---|
| Message Type | 8 |
| Cipher Type | 8 |
| Cipher Mode | 8 |
| Initialization Vector | 64 |
| Cause Type | 8 |
| Cause | 8 |
| Reserved | 56 |

A Set Cipher Mode (CT-CIP) control traffic message is transmitted from the base station 104 to the user station 102 to pass pertinent ciphering information to the user station 102 and to instruct the user station 102 to go into or out of ciphering mode. When the user station 102 receives the CT-CIP message, the user station 102 uses the cipher mode parameters to set its ciphering equipment and then switches into or out of ciphering mode. All traffic after the switch to cipher mode will be ciphered.

The Cipher Type information element of the CT-CIP message indicates the type of encryption to be used by the system (e.g., either DCS-1900 or Bellcore "C", for example). The Cipher Mode information element indicates the encryption mode being requested by the system. The Initialization Vector information element contains a value to be used in conjunction with other keying information to initialize the encryption equipment. The Cause information element consists of eight bits of an encoded parameter indicative of what the cause is of an action, and is specific to a particular control traffic message. For the CT-CIP message, the Cause information field can be set to contain a code indicating such things as set/change cipher or synchronize cipher. The Cause Type information element defines the cause code set to be returned when either the base station 104 or the user station 102 drops a connection. The Cause Type is stored as an encoded value that identifies the code set of the supporting infrastructure. For example, the Cause Type information field can be set to contain a value indi cating the use of DCS 1900 cause codes or a value indicating the use of Bellcore Generic "C" cause codes.

TABLE 10-4

Call Origination (CT-ORG)

| Information Element | Length in Bits |
|---|---|
| Message Type | 8 |
| Service Request | 32 |
| Key Sequence Number | 8 |
| Class | 16 |
| CREF | 8 |
| Reserved | 88 |

The user station 102 sends a Call Originate (CT-ORG) control traffic message to the base station 104 to request the placement of an outgoing call.

The Service Request information element of the CT-ORG message indicates such things as data versus voice service, use of CRC and ARQ, symmetry or asymmetry of the channel, whether service resources are being requested, and frame rate, for example. The Key Sequence Number information element is used to generate a communication key in both the base station 104 and the user station 102 without having to explicitly pass the key over the air. The Class information element specifies some of the operational parameters of the particular type of user station 102. The Class information element can be broken down into subfields of Class Type and Class Information. The Class Type sub-field may indicate the general class of the user station 102 (e.g., DCS1900 or IS-41), while the Class Information sub-field may indicate such things as protocol or revision level, encryption algorithm, RF power rating, power class, continuous or discontinuous transmission, and licensed or unlicensed bandwidth. The Call Reference ("CREF") information element specifies the circuit to which data in a transport message belongs. The CREF field corresponds to the ISDN Call Reference information element. The CREF information element may contain a value indicating whether the circuit is, for example, ISDN, DCS1900 or DECT.

TABLE 10-5

Call Connect (CT-CNC)

| Information Element | Length in Bits |
|---|---|
| Message Type | 8 |
| Connection Number | 40 |
| Map Type | 8 |
| Map | 32 |
| Cause Type | 8 |
| Cause | 8 |
| CREF | 8 |
| Reserved | 48 |

The Call Connect (CT-CNC) control traffic message may be sent from the base station 104 to the user station 102 when a call, either incoming or outgoing, is completed or when an outgoing call from the user station 102 is rejected.

The Connection Number information element of the Call Connect message specifies the specific network connection which was allocated to carry the bearer channel of the particular user station 102 from the base station 104 to the network. Unused nibbles and octets of this information element are filled with "F" hex. The Map information element describes the mapping of time slots to a particular user station 102. The format of the Map element is dependent upon the Map Type information element in the same frame. The Map Type information element indicates if the frame is a "superframe" (aggregated time slots) or "subframe" (single time slot occurring every N time frames). If a superframe map type, then each bit in the Map information element corresponds to a channel relative to the current channel. If a subframe map type, the Map information element indicates such things as the submultiplex rate (i.e., the number of frames skipped between transmissions), the frame phase (i.e., the number of frames skipped before the first transmission), and the channel phase (i.e., the number of time slots or channels skipped before the first transmission). The Cause and Cause Type information elements are as described with respect to the CT-CIP message. However, for the CT-CNC message, the Cause information element indicates whether or not the requested connection has been connected. The CREF information element is the same as described with respect to the CT-ORG message.

TABLE 10-6

Target Handover Request (CT-THR)

| Information Element | Length in Bits |
|---|---|
| Message Type | 8 |
| Old Connection Number | 40 |
| Service Request | 32 |
| Key sequence Number | 8 |
| Class | 16 |
| Old Base Station ID | 32 |
| Old Mobility Country Code (MCC) | 16 |
| Old Mobility Network Code (MNC) | 8 |

The Target Handover Request (CT-THR) control traffic message is sent from the user station 102 to the target base station 104 to initiate a terminating handover procedure.

The Old Connection Number information element of the CT-THR message specifies the specific network connection which was allocated to carry the bearer channel of the user station 102 from the old base station 104 to the network. Unused nibbles and octets of this information element are filled with "F" hex. The Service Request, Key Sequence Number and Class information elements are as described with respect to the CT-ORG message. The Old Base Station ID information element identifies the originating base station 104 in a handover. The Old MCC information element indicates the mobility country code of the originating base station in a handover, and the Old MNC information element indicates the mobility network code of the originating base station in the handover.

TABLE 10-7

Originating Handover Request (CT-OHR)

| Information Element | Length in Bits |
|---|---|
| Message Type | 8 |
| Base ID | 32 |
| Mobility Country Code (MCC) | 16 |
| Mobility Network Code (MNC) | 8 |
| Reserved | 56 |

The Originating Handover Request (CT-OHR) control traffic message is sent from the user station 102 to the current base station 104 to initiate an originating handover procedure.

The Base ID information element uniquely identifies the target base station 104. The MCC and MNC information elements indicate the mobility country code and the mobility network code, respectively, of the target base station 104.

TABLE 10-8

Circuit Switch Complete (CT-CSC)

| Information Element | Length in Bits |
| --- | --- |
| Message Type | 8 |
| Handover Reference | 48 |
| Map Type | 8 |
| Map | 32 |
| Reserved | 56 |

The Circuit Switch Complete (CT-CSC) control traffic message is sent from the old base station 104 to the user station 102 to signal that the network connection is available at the target base station 104. When sent from the old base station 104, the Map information element will be all zeroes to indicate that there are no longer any slots on the old base station 104 for the user station 102 to utilize.

The Handover Reference information element is used to identify a specific handover process that has already been initiated by an originating handover request sequence. In a DCS1900 infrastructure system, the handover reference number is assigned by the terminated base station controller 105. The Map Type and Map information elements are as described with respect to the CT-CNC message.

TABLE 10-9

Terminating Handover Complete (CT-THC)

| Information Element | Length in Bits |
| --- | --- |
| Message Type | 8 |
| Service Request | 32 |
| Key Sequence Number | 8 |
| Class | 16 |
| Handover Reference Number | 48 |
| Reserved | 48 |

A Terminating Handover Complete (CT-THC) control traffic message is sent by the user station 102 to the target base station 104 to initiate a terminating handover procedure.

The Service Request, Key Sequence Number, and Class information elements are as described for the CT-ORG message. The Handover Reference Number information element is as described for the CT-CSC message.

TABLE 10-10

Specific Response (CT-SPR)

| Information Element | Length in Bits |
| --- | --- |
| Message Type | 8 |
| Cipher Type | 8 |
| Cipher Mode | 8 |
| Key Info | 64 |
| Class | 16 |
| Reserved | 56 |

The Specific Response (CT-SPR) control traffic message is sent from the user station 102 to the base station 104 when the user station 102 is listening for a page and receives a Specific Poll control traffic message which contains the user station's PID and which is marked as a "paging" Specific Poll message.

The Cipher Type and Cipher Mode information elements are as described for the CT-CIP message. The Key Info information element contains a value to be used in conjunction with other keying information to initialize the encryption equipment, and the contents of this field depend upon the specific type of supporting infrastructure (e.g., DCS1900). The Class information element is as described for the CT-ORG message.

TABLE 10-11

Set Service (CT-SET) (user to base)

| Information Element | Length in Bits |
| --- | --- |
| Message Type | 8 |
| Reserved | 80 |
| Map Type | 8 |
| Map | 32 |
| Service Request | 32 |

The user station 102 sends a Set Service (CT-SET) control traffic message to the base station 104 when the user station 102 desires to change the characteristics of the over-the-air service.

The Map Type and Map information elements are as described for the CT-CNC message. The Service Request information element is as described with respect to the CT-ORG message.

TABLE 10-12

Set Service (CT-SET) (base to user)

| Information Element | Length in Bits |
| --- | --- |
| Message Type | 8 |
| Cause Type | 8 |
| Cause | 8 |
| Connect Number | 40 |
| Reserved | 24 |
| Map Type | 8 |
| Map | 32 |
| Service Request | 32 |

The base station 104 sends a Set Service (CT-SET) control traffic message to the user station 102 when the base station 104 wishes to change the characteristics of over-the-air service.

The Connection Number, Map Type and Map information elements of the CT-SET message are as described for the CT-CNC message. The Cause Type and Cause information elements are as described for the CT-CIP message. However, the cause information element for the CT-SET message indicates whether the link was successfully established or else failed.

TABLE 10-13

Release (CT-REL)

| Information Element | Length in Bits |
| --- | --- |
| Message Type | 8 |
| Cause Type | 8 |
| Cause | 8 |
| Reserved | 136 |

The Release (CT-REL) control traffic message is sent by the base stat-on 104 to the user station 102 when the network releases the connection in progress or during link setup. The Cause Type and Cause information elements are as described for the CT-CIP message. However, the Cause information element for the CT-REL message indicates whether the release was initiated by the network, or whether an authentication rejection occurred.

TABLE 10-14

Base Assist (CT-BAM)

| Information Element | Length in Bits |
| --- | --- |
| Message Type | 8 |
| Base Assist Information | 152 |

The Base Assist (CT-BAM) control traffic message is sent by the base station 104 to the user station 102 whenever the base station 104 desires to pass information to the user station 102 which will help the user station 102 in making well informed decisions. The contents of the Base Assist information element vary depending upon the circumstances.

TABLE 10-15

Transport (CT-TRA)

| Information Element | Length in Bits |
| --- | --- |
| Message Type | 8 |
| Transport Data | 56 |

The Transport (CT-TPA) control traffic message is used for transporting data between the base station 104 and the user station 102 on the circuit specified by the Call Reference Number (CREF). The contents of the Transport Data information element varies depending upon the application, and generally constitutes application level data.

Transport control traffic messages differ from other control traffic messages in that the Message Type information element contains additional information. The format of the Message Type field for Transport messages is as follows:

TABLE 10-15A

Message Type Header for Transport

| Header Element | Bit Position(s) |
| --- | --- |
| Transport Bit | 8 |
| ACK/NAK | 7 |
| Message Number | 6 |
| CREF | 1–5 |

The Transport Bit indicates whether or not the message is a Transport message. The ACK/NAK bit indicates whether or not the sender received the last message without error. The Message Number bit indicates the message number (0 or 1) of the current message, and should alternate for each message sent by the same entity. The Call Reference identifies the call.

The values passed as part of Message Type information element allow the receiving entity (base station 104 or user station 102) to correct a message error. In one embodiment, the following steps are undertaken to attempt to correct a message:

1) The receiving entity compares the Message Number of the received message with the Message Number of the previously received message. If they are the same, the receiving entity ignores the new message.
2) The receiving entity checks the ACK/NAK field of the received message. If the value is NAK, it resends the old packet, and if the value is ACK, it sends the new packet.
3) Each sender complements the message number each time a new packet is sent.
4) If the receiving entity receives a message with a FCW error, or if it does not receive a message at all, it resends the old packet with the NAK bit set.

In addition to the above messages, various signaling messages may be used between the base station and the network to convey information at the call control entity level. Exemplary call control messages include those appearing in Table 9-2 below.

TABLE 9-2

| | Direction |
| --- | --- |
| Call Establishment Messages | |
| CC-SETUP | Both |
| CC-INFOrmation | Both |
| CC-CALL-PROceeding | Network -> User |
| CC-ALERTING | Both |
| CC-PROGress | Network -> User |
| CC-CONNECT | Both |
| CC-CONNECT-ACKnowledge | Both |
| CC-EMERGENCY-SETUP | User -> Network |
| CC-CALL-CONFIRMED | User -> Network |
| Call Release Messages | |
| CC-DISConnect | Both |
| CC-RELEASE | Both |
| CC-RELEASE-COMplete | Both |
| Call Related Supplementary Services | |
| HOLD | User -> Network |
| HOLD-ACKnowledge | Network -> User |
| HOLD-REJECT | Network -> User |
| RETRIEVE | User -> Network |
| RETRIEVE-ACKnowledge | Network -> User |
| RETRIEVE-REJECT | Network -> User |
| DTMF Interaction | |
| Start-DTMF | User -> Network |
| Stop-DTMF | User -> Network |
| Start-DTMF-ACK | Network -> User |
| Stop-DTMF-Ack | Network -> User |
| Start-DTMF-Reject | Network -> User |

Figure 21:
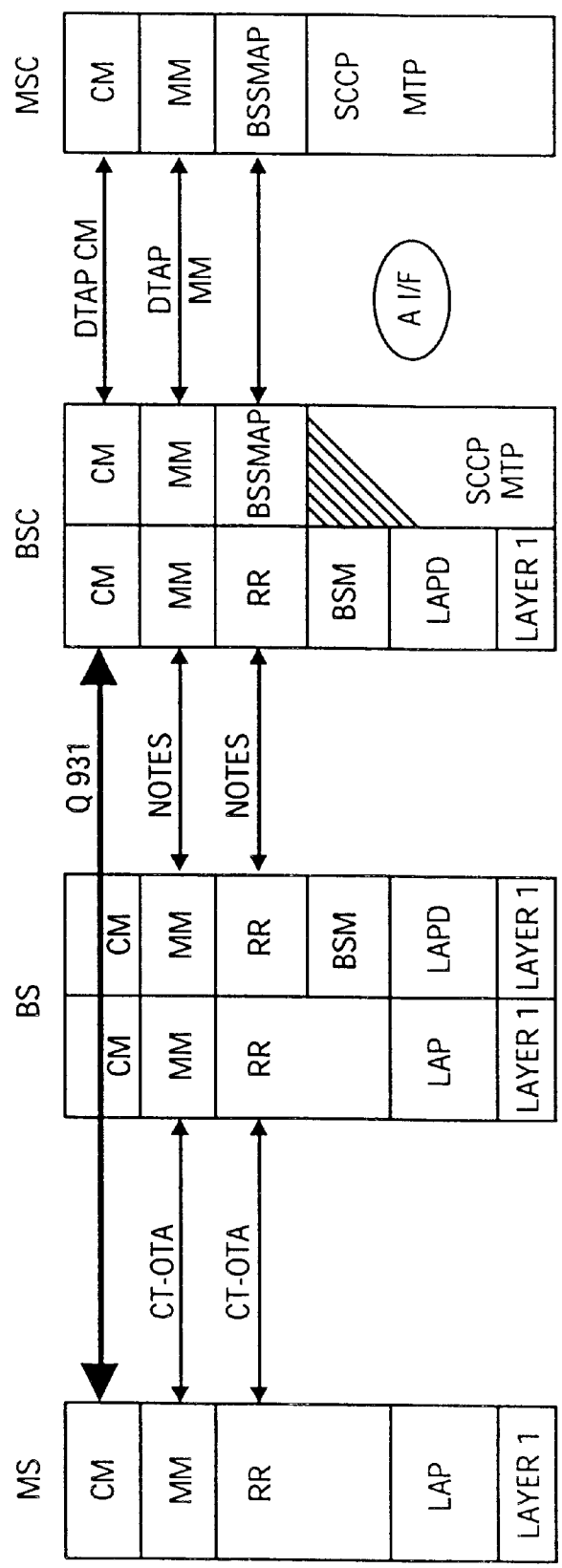
FIG. 21 is a diagram illustrating a preferred system protocol architecture.
Figure 22:
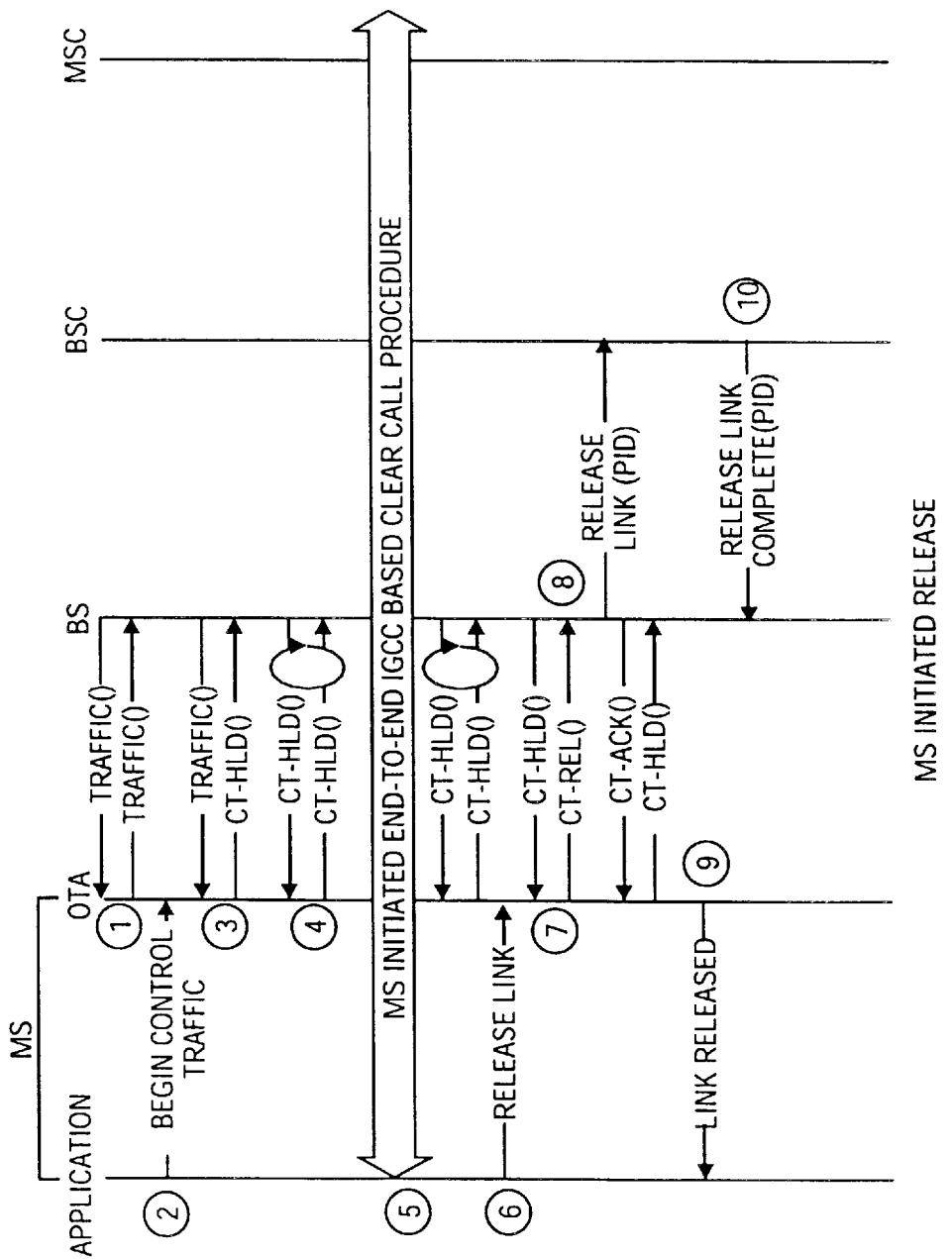
FIG. 22 is a call flow diagram of a call release initiated by a user station.
Figure 23:
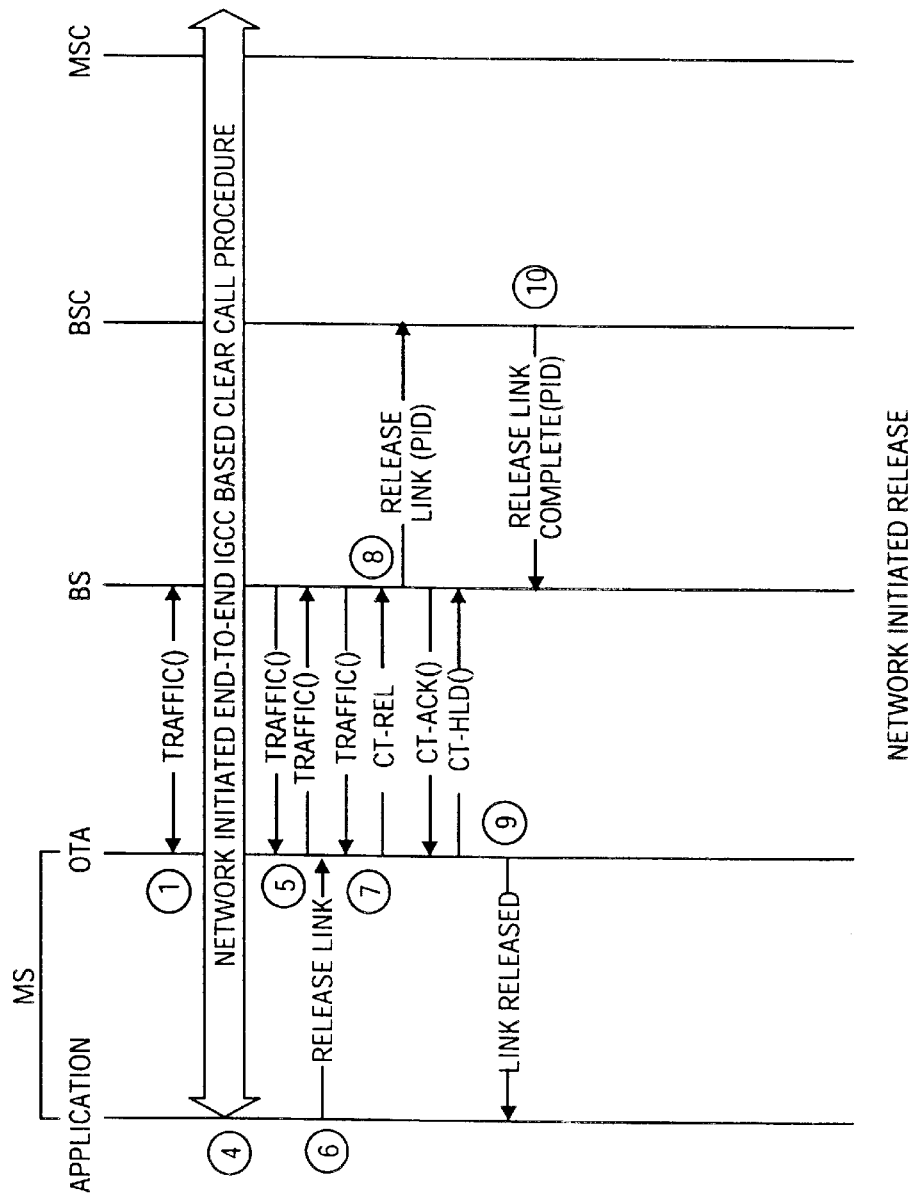
FIG. 23 is a call flow diagram of a call release initiated by the network.

The interplay among the various entities involved in the transfer of signaling messages and other information may be better understood by reference to FIG. 21, which depicts a preferred system protocol architecture. As illustrated in FIG. 21, a preferred user station 102 (designated "MS" in FIG. 21) includes a Communication Management ("CM") entity, a Mobility Management ("MM") entity, and a Radio Resources ("RR") entity, among others. The CM and MM entities of the user station 102 communicate with their counterparts at a mobile switching center 112 (designated "MSC" in FIG. 21), via links connected across a base station 104 (designated "BS" in FIG. 21) and base station controller 105 (designated "BSC" in FIG. 21). The various types of signaling interfaces of a preferred embodiment are shown in FIG. 21 by the arrows connecting like entities.

The "Layer 3" protocol exchange between the mobile switching center 112 and the base station controller 105 is characterized by the BSSMAP protocol. The "Layer 3" protocol exchange between the mobile switching center 112 and the user station 102 is characterized by the Direct Transfer Application Part (DTAP). DTAP is further divided into two logical sublayers, defined by the CM and MM entities described above. The CM includes call control and supplementary services management, including short message service.

Most DTAP messages are not interpreted by the base station controller 105 or the base station 104. Rather, they are transferred to the network by the mobile switching center 112 over a network interface (such as the GSM A-interface).

Most radio resource (RR) messages are mapped to BSSMAP messages at the base station controller 112. However, some of these messages are interpreted by the base station 104 (e.g., paging messages). The control management (CM) part of the protocol is addressed by an ISDN based CM message set, referred to as IGCC (ISDN Generic Call Control). Control management messages from the user station 102 are directly transferred to the network over the interface at the mobile switching center 112. Interface adapters at the user station 102 and the base station controller 105 segment control management (i.e., IGCC) messages into packets, which are individually transported between the user station 102 and the base station 104 via CT-TRA Control Traffic messages and between the base station 104 and base station controller 105 via Transport Notes. Notes are transmitted over a CCITT ISDN data link (Q.920/Q.921) The interface adapters at the user station 102 and base station controller 105 are responsible for ensuring that the packets are sequenced properly and the entire IGCC message is error free.

Radio resource (RR) messages and mobility management (MM) messages take the form of internal Notes between the base station controller 105 and base station 104, and are mapped at the base station to over-the-air messages when sent to the user station 102.

Exemplary message flow diagrams for various calling functions are shown in FIGS. 9, 10, 11A–11C and 12A–12B. While generally described with respect to features referenced in the FIG. 3 embodiment, they have equal applicability to the FIG. 6 embodiment.

An exemplary message flow diagram for call origination from a user station 102 is shown in FIG. 9. In FIG. 9 messages are designated by arrows (1) between a user station 102 (abbreviated "MS") and a base station 104 (abbreviated "BS"), (2) between the base station 104 and a base station controller 105 (abbreviated "BSC"), and (3) between the base station controller 105 and a mobile switching center 112 (abbreviated "MSC"). The MSC 112 generally acts a switch controlling access to the network 106 (as shown, e.g., in FIG. 2). Control traffic messages between the user station 102 and the base station 104 are typically preceded by the initials "CT" in FIG. 9. The steps numbered 1 through 17 associated with the arrows appearing in FIG. 9 are explained below:

1. A user station application sends a call originate request to the user station 102 over-the-air controller.
2. The user station 102 seizes an available time slot (such as, for example, time slot 302 in FIG. 3 or virtual time slot 618 in FIG. 6) in accordance with the protocol shown in FIG. 4 and/or 4A. If no time slot is acquired, the user station 102 times out and attempts to register and then acquire a time slot on another base station 104.
3. Upon successful time slot acquisition, the user station 102 responds to the specific poll message 402 with an ORIGINATE control traffic (CT-ORG) message. The CT-ORG message includes circuit reference (CREF) information.
4. The base station 104 responds to the CT-ORG message by sending a control traffic acknowledgment (CT-ACK) message back to the user station 102. (If no CT-ACK message is received from the base station 104, the link is dropped and the user station 102 attempts to originate a call on another base station 104.) The base station 104 assigns time slots and terrestrial bearer channels to support the service request (if possible) and then sends a Setup Link NOTE containing the terrestrial bearer information to the base station controller 112. If, however, the base station 104 is unable to assign time slots or bearer channels, it returns a control traffic setup (CT-SET) message indicating a failure status to the user station 102, and no Setup Link NOTE is sent to the base station controller 105. The user station 102 then attempts to originate a call using another base station 104.
5. When the base station controller 105 receives the Setup Link NOTE, it builds a signaling connection control part (SCCP) channel for the user station 102 based on the PID of the user station 102. The base station controller 105 also retains the Setup Link NOTE parameters for use in a later step. If construction of the SCCP channel fails, a Connect Link NOTE is sent to the base station 104 indicating a failure status. The base station 104 then responds by sending a control traffic Set Service (CT-SET) message to the user station 102 indicating the link failure (see Step 7 below). The link failure is communicated to the user station application via a Connect message (see Step 10 below).
6. After the CT-ACK message is received at the user station 102, the user station 102 and the base station 104 enter a HOLD sequence while waiting for a link to be established between the base station 104 and the base station controller 105. During this sequence, the user station 102 and base station 104 periodically exchange control traffic HOLD (CT-HLD) messages. If the base station 104 and/or user station 102 unexpectedly stops receiving CT-HLD messages or the user station 102 does not subsequently receive a CT-SET message from the base station 104 after the CT-ORG message has been sent, then the base station 104 disconnects the link from the base station controller 105 using call clearing procedures, and the user station 102 and base station 104 attempt lost link recovery. If the lost link recovery procedure is successful, then call origination from the user station 102 is re-initiated.
7. When the SCCP channel is constructed, the base station controller 105 sends a Connect Link NOTE to the base station 104. The Connect Link NOTE includes status information from the base station controller 105.
8. The base station 104 then sends a control traffic SET SERVICE (CT-SET) message to the user station 102. This message defines the slot structure (i.e., mapping) to be used by the user station 102. The CT-SET message includes the status information contained in the Connect Link message received from the base station controller 105.
9. The user station 102 acknowledges receipt of the CT-SET message by responding with a control traffic acknowledgment (CT-ACK) message. If the base station 104 does not receive the CT-ACK message, then the base station 104 disconnects the link from the base station controller 105 and attempts lost link recovery in a manner similar to that described with respect to Step 6 above.
10. The user station 102 responds to the CT-SET message by sending a Connect message to the user station application. The Connect message indicates to the user station application whether or not the control link has been established.
11. The user station 102 and base station 104 then enter a HOLD sequence by exchanging control traffic hold (CT-HLD) messages, a condition which is sustained as long as no IGCC Setup message traffic is being transported from or to the user station application (see Step 12). If the communication link is lost between the base station 104 and the user station 102 after the Connect message has been sent to the user station application, then the base station disconnects the link from the base station controller 105 using call clearing procedures. The user station 102 sends a Link Lost message to the user station application. Any message from the user station application that does not initiate a new operation will cause the user station 102 to respond with another Link Lost message.

12. The user station application sends an ISDN generic call control ("IGCC") Setup message through the user station 102 and base station 104 to the base station controller 105 via control traffic Transport (CT-TRA) messages and Transport NOTES. The user station 102 and base station 104 return to the hold sequence whenever no IGCC messages are available for transport.

13. The base station controller 105 sends a Service Request message to the mobile switching center 112 via a Complete L3 Info DTAP message.

14. The mobile switching center 112 responds to the base station controller 105 with a call management (CM) Service Accept DTAP message.

15. The user station application completes the call setup via end-to-end IGCC based call procedures.

16. Once the IGCC Call Control has the call established, the user station application sends a Begin Traffic request to the user station 102.

17. The system enters normal traffic mode, and the conversation (if voice) or other data path is stable.

Figure 10:
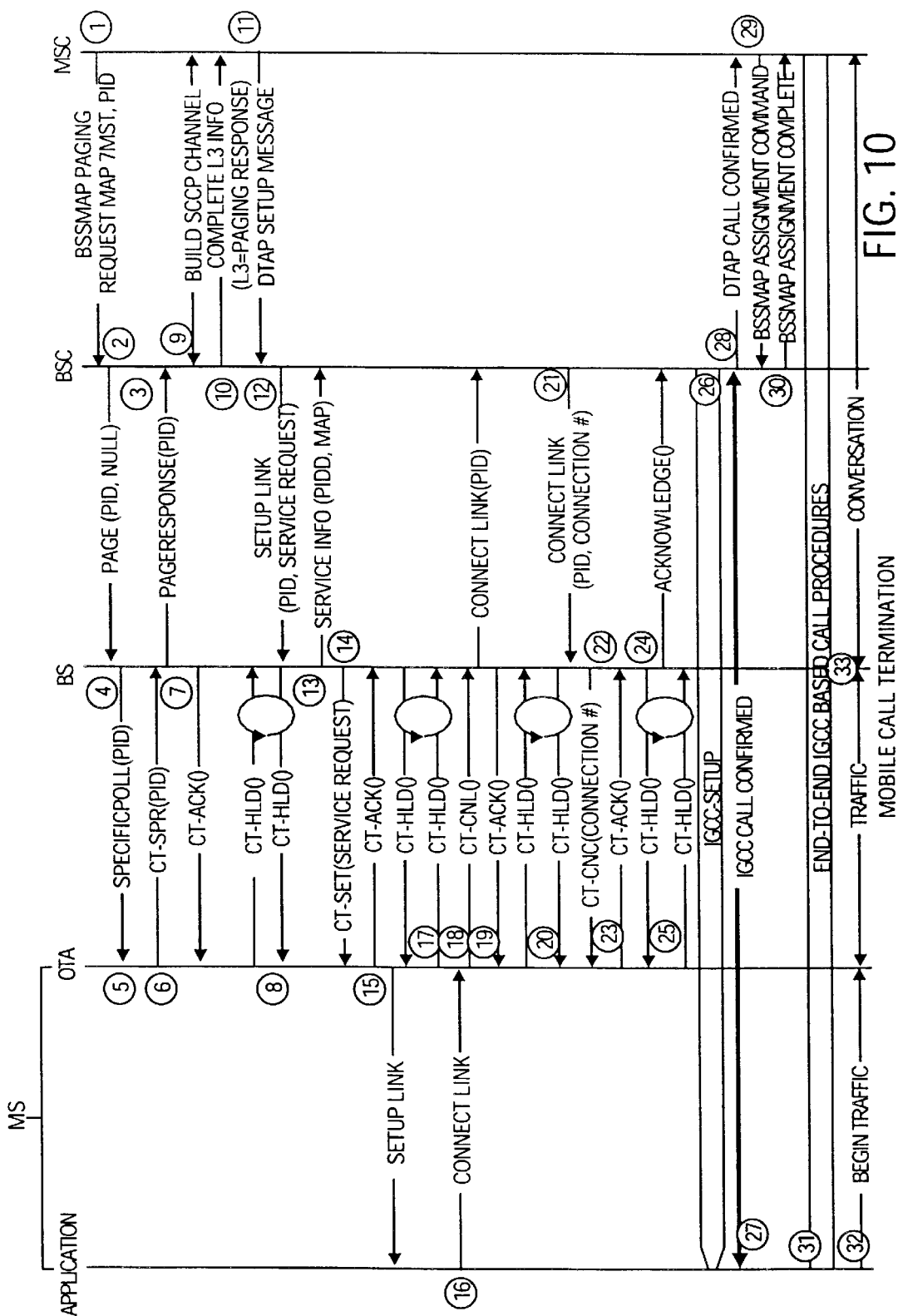
FIG. 10 is a message flow diagram illustrating call termination at the user station.

An exemplary message flow diagram for processing a call originating from the network and terminating at a user station 102 is shown in FIG. 10. In FIG. 10, messages are shown abstractly by arrows, similar to FIG. 9, between a user station 102 (abbreviated "MS") and a base station 104 (abbreviated "BS"), between the base station 104 and a base station controller 105 (abbreviated "BSC"), and between the base station controller 105 and a mobile switching center 112 (abbreviated "MSC"). Control traffic messages between the user station 102 and the base station 104 are typically preceded by the initials "CT" in FIG. 10. The steps numbered 1 through 33 associated with the arrows appearing in FIG. 10 are explained below:

1. The mobile switching center 112 originates a call by sending a BSSMAP PAGING message to the base station controller 105. The BSSMAP PAGING message is sent as a "connectionless" message to the base station controller 105, and includes the personal identifier (PID) of the user station 102 being paged.

2. The base station controller 105 searches its Location Register (LR) for the entry of an international mobile station identifier (IMSI) matching the PID sent in the BSSMAP PAGING message. If the matching user station PID is not found, then the base station controller 105 does not respond to the mobile switching center 112 and the call is dropped.

3. If the base station controller 105 identifies the appropriate entry, the base station controller 105 sends a Page NOTE to the base station 104 associated with the entry. The service request type in the Page NOTE is set to zero (indicating that a NULL service is being requested). The Page Note allows the base station 104 to page the user station 102 without having to set up a specific call.

4. When the base station 104 receives a Page NOTE with a NULL service request, the base station 104 sends a SPECIFIC POLL message (e.g., specific poll message 402 in FIG. 4) with service type set to zero (indicating a NULL request). The base station 104 queues the Page NOTES and sends SPECIFIC POLL messages corresponding to the Page NOTES on a cyclic basis. If there are more Page NOTES than there are available unused time slots (time slots), the base station 104 sends the SPECIFIC POLL messages sequentially on the available time slots. Consequently, the SPECIFIC POLL messages may be spread out over many time frames (polling loops). The base station 104 continues to issue the SPECIFIC POLL message until either the user station 102 responds, or until predetermined time period $T_{page}$ associated with the Page NOTE expires (as measured by an internal timer).

5. The user station 102 alternates between an inactive or sleep state and an active state with a predetermined duty cycle. When the user station 102 wakes up, it scans all SPECIFIC POLL messages from the base station 104 upon which it is registered. In one embodiment, the user station 102 scans until the same user station PID is seen twice. If an user station 102 does not see a SPECIFIC POLL containing its user station PID (or does not see the user station PID twice, if applicable), then after a predetermined monitoring time the user station 102 returns to sleep for a time period dictated by its duty cycle.

6. When user station 102 receives a SPECIFIC POLL control traffic message containing its user station PID, the user station 102 responds with a SPECIFIC POLL RESPONSE control traffic (CT-SPR) message (e.g., specific poll response 405 in FIG. 4). If no SPECIFIC POLL is seen by the user station 102 with its user station PID, then it goes back to sleep for a predetermined time period.

7. When the base station 104 receives the SPECIFIC POLL RESPONSE control traffic message from user station 102 having the matching user station PID, the base station 104 returns an acknowledgment control traffic (CT-ACK) message to the user station 102, and sends a Page Response NOTE to the base station controller 105. If the base station 104 does not receive a SPECIFIC POLL RESPONSE control traffic message from the user station 102, it does not send a Page Response NOTE, and the call is dropped.

8. The base station 104 and user station 102 then enter a slot maintenance mode in which they pass HOLD control traffic (CT-HLD) messages back and forth. If the base station 104 or user station 102 unexpectedly stops receiving CT-HLD control traffic messages, then the base station 104 and user station 102 attempt lost link recovery. If lost link recovery fails, then the call is dropped.

9. Upon receipt of the Page Response NOTE from the base station 104, the base station controller 105 builds an SCCP circuit to the mobile switching center 112 and associates the SCCP circuit with the user station PID. If the base station 104 does not receive a Page Response NOTE, the call is dropped. Further, if construction of the SCCP circuit fails, the Setup Link NOTE so indicates. The base station 104 responds by sending a control traffic Set Service (CT-SET) message to the user station 102 indicating the failure.

10. Once the base station controller 105 has built an SCCP circuit to the mobile switching center 112, the base station controller 105 sends a BSSMAP Paging Response message to the mobile switching center 112 over the SCCP circuit.

11. The mobile switching center 112 then sends a DTAP Setup message to the base station controller 105, using the SCCP circuit associated with the user station's PID.

12. When the base station controller 105 receives the DTAP Setup Message from the mobile switching center 112, the base station controller 105 sends a Setup Link NOTE to the base station 104 communicating with the particular user station 102.

13. When the base station 104 receives the Setup Link NOTE from the base station controller 105, the base station 104 assigns radio resources (e.g., time slots) to satisfy the service request data element. The base station 104 then sends the base station controller 105 a Service information NOTE detailing the bearer channels assigned to this call. If the base station 104 does not receive a Setup Link NOTE, then call clearing procedures are initiated. If the base station 104 cannot supply the resources requested by the base station controller 105, this fact is indicated in a "result" field of the Service Information NOTE.

14. The base station 104 communicates the service desired and the air resources necessary to support the service to the user station 102 using a Set Service (CT-SET) control traffic message.

15. The user station 102 responds to the CT-SET message by sending an acknowledge control traffic (CT-ACK) message back to the base station 104 and sending a Setup Link message to the user station application. If no CT-ACK message is received by the base station 104, call clearing procedures are initiated.

16. The user station application responds to the Setup Link message with a Connect Link message.

17. The base station 104 and user station 102 then enter a slot maintenance mode in which they pass HOLD control traffic (CT-HLD) messages back and forth. If the base station 104 or user station 102 unexpectedly stops receiving CT-HLD control traffic messages, the base station 104 and user station 102 attempt lost link recovery. If lost link recovery fails, call clearing procedures are initiated.

18. After the user station 102 configures itself to provide the requested service and receives the Connect Link message from the user station application, the user station 102 responds with a CONNECT LINK (CT-CNL) control traffic message with the "response" field set to indicate a successful connection. If the user station 102 cannot satisfy the service request, the user station 102 replies with the "response" field set to indicate failure. If the user station 102 does not receive a CT-ACK message, the user station 102 disconnects the link according to call clearing procedures, and the call is dropped.

19. When the base station 104 receives the CT-CNL control traffic message, it returns a control traffic acknowledgment (CT-ACK) message to the user station 102. Once the base station 104 has allocated all necessary channel resources, it sends a Connect Link NOTE to the base station controller 105.

20. The user station 102 and base station 104 enter a hold sequence in which they exchange CT-HLD messages to maintain the over-the-air channel. If the base station 104 or user station 102 unexpectedly stops receiving CT-HLD control traffic messages, the base station 104 and user station 102 attempt lost link recovery. If lost link recovery fails, call clearing procedures are initiated.

21. The base station controller 105 responds to the Connect Link NOTE by returning a Connect Link NOTE back to the base station 104. The Connect Link NOTE from the base station controller 105 contains a connection number for the call.

22. Upon receiving the Connect Link NOTE from the base station controller 105, the base station 104 sends a CONNECT COMPLETE (CT-CNC) control traffic message to the user station 102. The CT-CNC message communicates the connection number for the call to the user station 102. If the user station 102 does not receive the CT-CNC message, or the base station 104 does not receive a CT-ACK message in response, lost link recovery is attempted. If lost link recovery fails, call clearing procedures are initiated.

23. The user station 102, as suggested in step 22, acknowledges the CT-CNC control traffic message with a control traffic acknowledgment (CT-ACK) message.

24. Upon receiving the CT-ACK control traffic message, the base station 104 sends an Acknowledge NOTE to the base station controller 105, with the command argument set to "Connect Link," to indicate completion of the link.

25. The base station 104 and user station 102 then enter a slot maintenance mode in which the pass HOLD (CT-HLD) control traffic messages back and forth. This sequence is sustained as long as no other message traffic is being transported to or from the user station application. If the base station 104 or user station 102 unexpectedly stops receiving CT-HLD control traffic messages, the base station 104 and user station 102 attempt lost link recovery. if lost link recovery fails, call clearing procedures are initiated.

26. When the base station controller 105 receives the Acknowledge NOTE from the base station 104, the base station controller 105 initiates ISDN generic call control (IGCC) message traffic that sets up the link with the user station 102. The base station controller 105 uses the information from the DTAP Setup message (see Step 11) during the IGCC setup process.

27. Upon completion of the IGCC setup, an IGCC Call Confirmed message is sent from the user station application to the base station controller 105.

28. Once the call is confirmed between the user station application and the base station controller 105, the base station controller 105 sends a DTAP Call Confirmed message to the mobile switching center 112 on the SCCP circuit associated with the user station's PID.

29. In response to the DTAP Call Confirmed message, the mobile switching center 112 sends the base station controller 105 a BSSMAP Assignment Command message.

30. When the base station controller 105 receives the BSSMAP Assignment Command message from the mobile switching center 112, the base station controller 105 connects the circuit described by the Circuit ID code to the base-station-to-base-station-controller circuit described by the map in the Service Information NOTE. Once the Assignment Command message has been received from the mobile switching center 112 and the Connect Link NOTE has been received from the base station 104, the base station controller 105 sends the mobile switching center 112 a BSSMAP Assignment Complete message on the SCCP circuit associated with the user station's PID.

31. When the mobile switching center 112 receives the BSSMAP Assignment Complete message from the base station controller 105, the mobile switching center 112 initiates IGCC end-to-end call control traffic.

32. When the connection is complete and the user station application is ready to accept/send data, the user station application sends a Begin Traffic message to the user station 102.

33. The system then enters normal traffic mode, and the conversation is stable.

Figure 19:
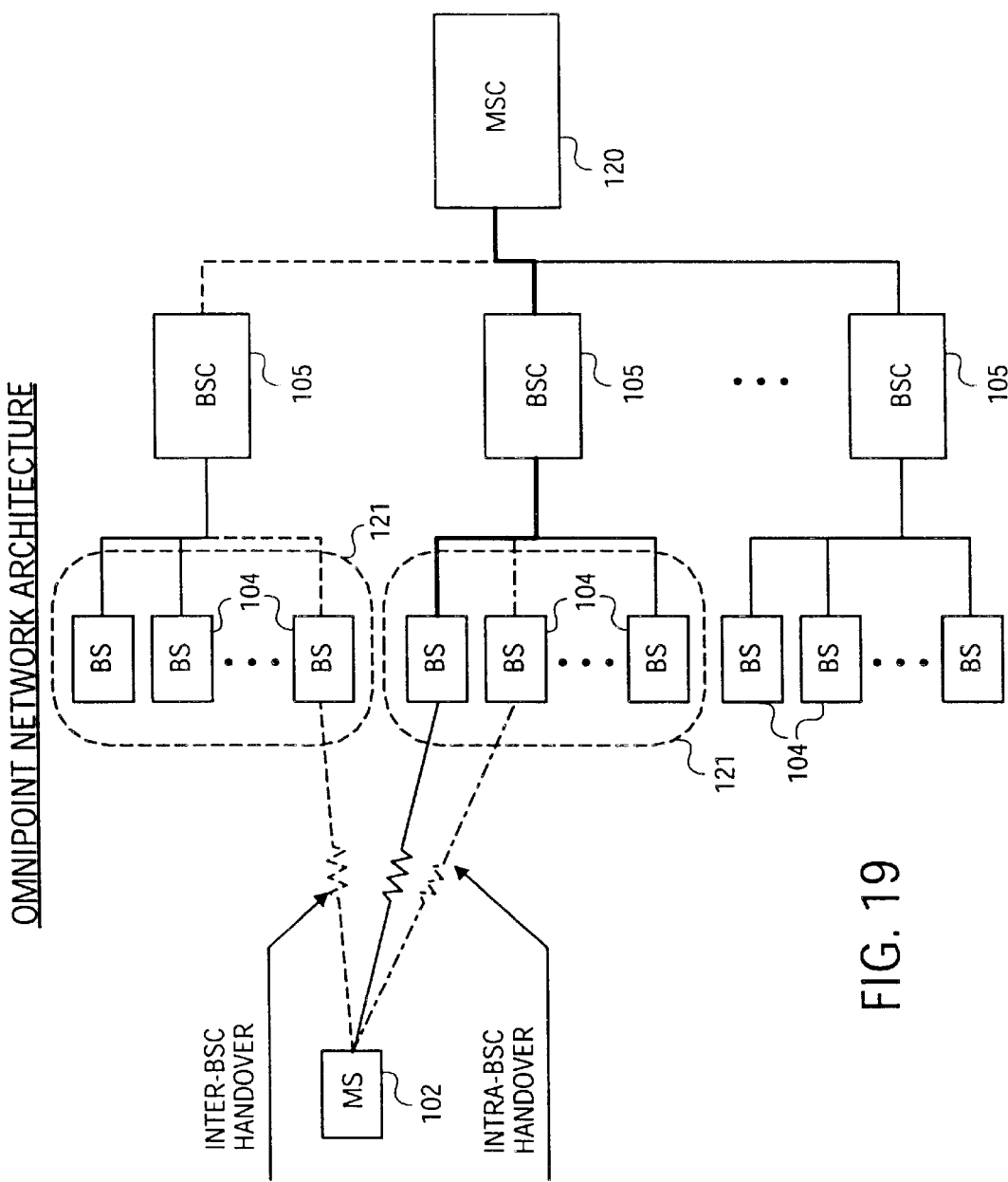
FIG. 19 is a block diagram of a communication system illustrating inter-cluster and intra-cluster handoffs.

FIGS. 11A–11C and 12A–12B are message flow diagrams for an intra-cluster handover and an inter-cluster handover, respectively. These message flow diagrams may be explained with reference to FIG. 19, which illustrates a particular deployment of base station clusters. In FIG. 19, a mobile switching center 120 is connected to a plurality of base station controllers 105 (also referred to as cluster controllers). Each base station controller 105 is in turn connected to a plurality of base stations 104. The base stations 104 are organized into logical groups of clusters 121, such that each cluster 121 of base stations 104 is connected to a single base station controller 105. A cluster 121 of base stations 104 need not be geographically adjacent; rather, the cluster 121 comprises a logical group of base stations 104 regardless of their geographical proximity.

As used herein, an intra-cluster handover is one in which a user station 102 transfers communication from the current base station 104 to a new base station 104 in the same cluster 121 (i.e., in a cluster 121 that is serviced by the same base station controller 105), and an inter-cluster handover is one in which the user station 102 transfers communication from the current base station 104 to a new base station 104 in a different cluster 121 (i.e., in a cluster 121 that is serviced by a different base station controller 105).

Figure 11A:
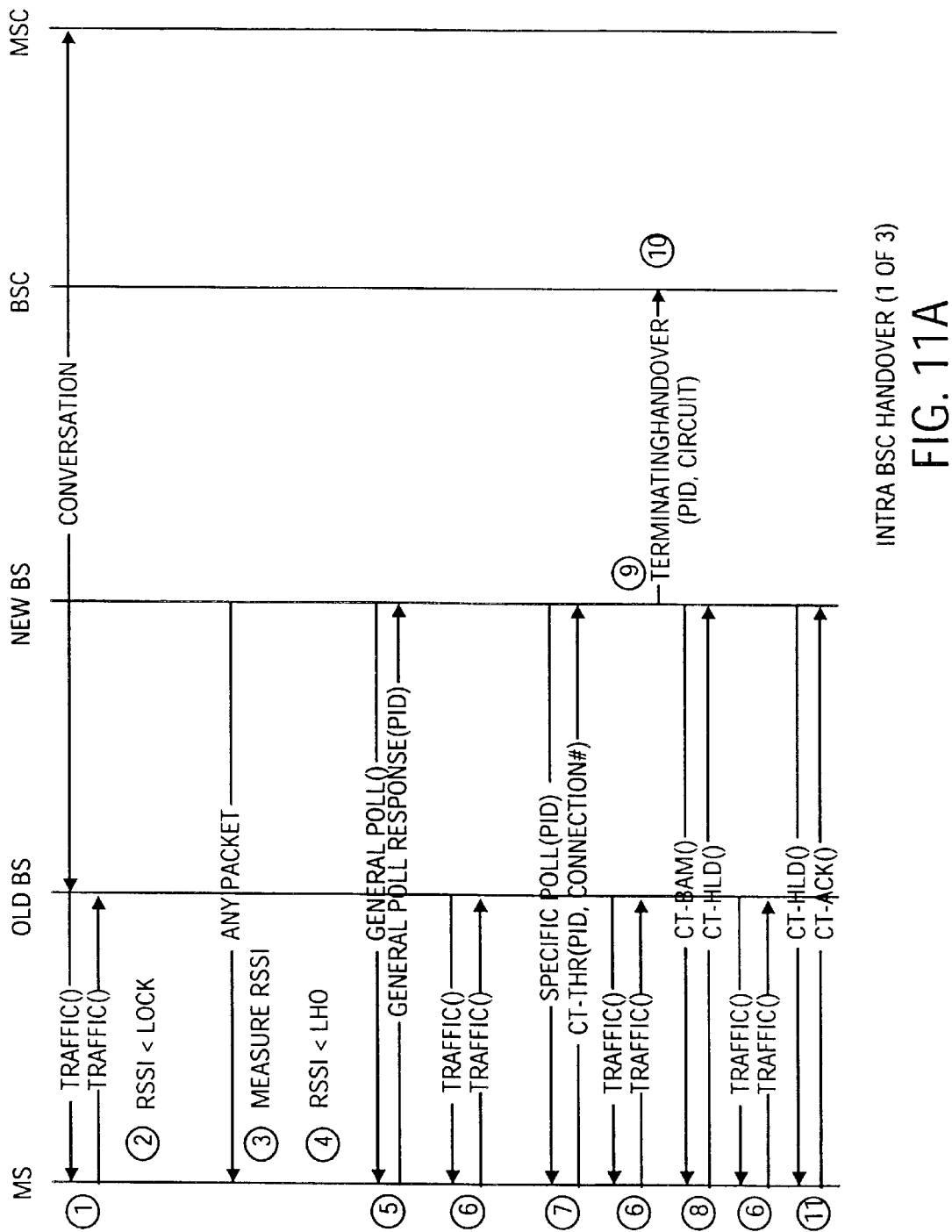
Figure 11C:
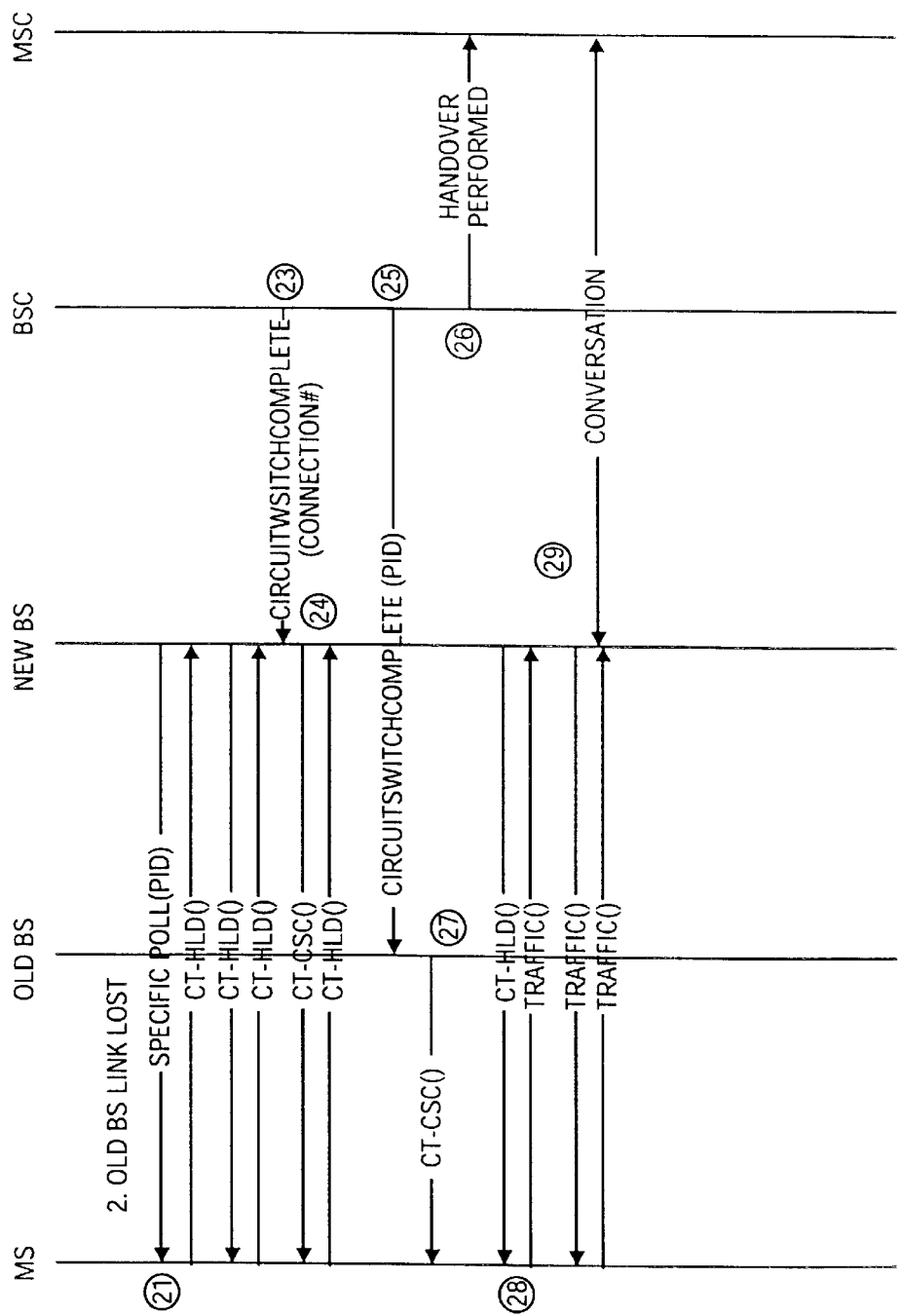

An exemplary message flow diagram for an intra-cluster handover is shown in FIGS. 11A–11C. As described in more detail below, FIG. 11B relates to the case in which the link with the old base station is maintained, while FIG. 11C relates to the case in which the link with the old base station is lost. In FIGS. 11A–11C, similar to FIGS. 9 and 10, transmitted messages are designated by arrows between a user station 102, a current base station 104 (denoted "Old BS" or "BS1"), a target base station 104 (denoted "New BS" or "BS2"), a base station controller 105, and a mobile switching center 112. Control traffic messages between the user station 102 and either base station 104 are typically preceded by the initials "CT". The steps numbered 1 through 22 associated with the arrows appearing in FIGS. 11A–11C are explained below:

1. The user station 102 starts in normal stable traffic with the current base station 104 (BS1).
2. The user station 102 monitors a received signal strength indication (RSSI). Eventually, the RSSI for the current link drops below a first threshold value $L_{look}$ (i.e., the threshold value below which the user station 102 begins to search for a new base station 104).
3. During a portion of the time frame 301 that the user station 102 does not need to maintain communication in its assigned time slots with the current base station BS1, the user station 102 switches to the frequency (e.g., F1, F2 or F3) and/or code (e.g., C1, C2, C3, C4, C5 or C6) of one of the surrounding base stations 104, as specified by a surrounding base station table, and measures the RSSI of that base station 104 by observing any traffic from the base station 104. The user station 102 also records the current utilization field from the header of the base station 104 traffic messages (e.g., CU field 809 of FIG. 8A). If the message observed is a GENERAL POLL message, then the user station 102 also records the slot quality, base ID, base station controller ID (BSC ID), service provider, zone and facility of the candidate base station 104. The user station 102 uses this information to calculate a preference value for the candidate base station 104 and sorts the entry into a table of preferred base stations.

4. When the RSSI of the link to the current base station BS1 drops below a second threshold level $L_{ho}$ (i.e., the threshold below which handover is appropriate), the user station 102 selects the highest preference base station 104 as the target base station 104 (BS2). If the observed time slot 302 at the target base station BS2 had contained a GENERAL POLL message, then the user station 102 examines the BSC ID of the target base station BS2. If the BSC ID is not the same as that of the current base station BS1 (i.e., the current and target base stations are connected to different base station controllers 105), then the user station 102 executes an inter-cluster handover (see FIGS. 12A–12B). Similarly, the user station 102 examines the zone of the target base station BS2, and if the zone is not the same as the zone of the old base station BS1, then the user station 102 will commence execution of an inter-cluster handover (see FIGS. 12A–12B). Otherwise, if the BSC ID is the same for the current and target base stations and the zone for both is also the same, then the user station 102 continues with an intra-cluster handover. If the observed time slot did not contain a GENERAL POLL message, then the user station 102 attempts to locate a time slot that has a GENERAL POLL message. The user station 102 can potentially look at all of the time slots in which it is not presently communicating and, if desired, can even skip a transmission on its current time slot to check the same location time slot on the target base station BS2 for a GENERAL POLL message.

5. The user station 102 acquires the observed time slot of the target base station BS2. The user station 102 does this by searching for a GENERAL POLL message from the target base station BS2, and responding with a GENERAL RESPONSE message to the GENERAL POLL message. If the user station 102 has not already examined the BSC ID of the target base station BS2, it does so at this point. If the BSC ID and the zone match those of the old base station BS1, then the user station can perform an intra-cluster handover utilizing the target base station BS2. Otherwise, if either the zone of the BSC ID of the target base station BS2 does not match that of the old base station BS1, then the user station 102 does not respond to the SPECIFIC POLL message, but instead executes an inter-cluster handover (see FIGS. 12A–12B).

6. Assuming an intra-cluster handover is to be performed, the user station 102 and old base station BS1 maintain traffic communication over the old link if possible. If not possible, the old link is dropped.

7. In response to the SPECIFIC POLL control traffic message from the target base station BS2, the user station 102 returns a TERMINATING HANDOFF REQUEST (CT-THR) control traffic message.

8. If the target base station BS2 will accept the handover, the target base station BS2 responds with a BASE ASSIST (CT-BAM) control traffic message. The CT-BAM message contains a list of surrounding base stations 104 which the user station 102 can monitor for future handovers. The user station 102 responds with a HOLD (CT-HLD) control traffic message and sets an internal user station handover timer. The handover is at this stage considered to be committed in the sense that the user station 102 cannot attempt a new handover until this attempt is completed. If the user station 102 does not receive a CT-BAM message from the target base station BS2, the user station 102 will attempt to hand off to the next most preferable base station 104 it found in Step 3 above. If there are no other suitable base stations 104, the user station 102 will proceed with call clearing.

9. If the target base station BS2 has accepted the handover, it sets a base station handover timer and sends a Terminating Handoff Note to the base station controller 105.

10. The base station controller 105 switches the user station 102 from the old base station BS1 to the new base station BS2. Specifically, the base station controller 105 switches the circuit represented by the Circuit ID code associated with the user station 102 as identified in the local registration (LR) of the base station controller 105 from the old circuit (described by the connection number) to a new circuit at the target base station BS2 as described by a Bearer Map in the Terminating Handoff Request NOTE. The base station controller 105 thereafter associates the user station 102 with its new location. The base station controller 105 updates the contents of the location register (LR) to reflect the new location of the user station 102.

11. In response to the CT-BAM message from the base station 104, the user station sends a control traffic acknowledge (CT-ACK) message to the base station 104 to acknowledge receipt of the surrounding base station list.

If the link between the user station 102 and the old base station BS1 can be maintained, the following steps are then carried out, in accordance with the call flow diagram of FIG. 11B:

12. After receiving a CT-ACK message from the user station 102, the target base station BS2 starts issuing SPECIFIC POLL messages targeted for the user station 102 (using the user station PID), so that the user station 102 can re-acquire the link on the target base station BS2.

13. When the base station controller 105 completes its circuit switch, the base station controller 105 sends the target base station BS2 a Circuit Switch Complete NOTE. In one embodiment, the Circuit Switch Complete NOTE contains no ciphering information.

14. The base station controller 105 also sends the old base station BS1 a Circuit Switch Complete NOTE. When the old base station BS1 receives the Circuit Switch Complete NOTE, the old base station BS1 sends a CIRCUIT SWITCH COMPLETE (CT-CSC) control traffic message to the user station 102. The old base station BS1 then clears all tables and circuits related to the call.

15. The base station controller 105 then sends a BSSMAP HANDOVER PERFORMED message to the mobile switching center 112.

16. When the user station 102 receives the CT-CSC control traffic message, the user station 102 responds by switching to the frequency and code of the new base station BS2. The user station 102 then searches for a SPECIFIC POLL message with the PID field matching the PID of the user station 102. When the user station 102 finds the appropriate SPECIFIC POLL message, it responds with a HOLD (CT-HLD) control traffic message. If the user station 102 loses the link to the old base station BS1 before receiving the CT-CSC message, the user station 102 will switch to the target base station BS2 and respond to the SPECIFIC POLL message. If the user station 102 is unable to find a SPECIFIC POLL message with the proper PID on the target base station BS2, then the call is lost, and the user station proceeds with call clearing 17. When the target base station BS2 sees a CT-HLD message from the user station 102 and has received the Circuit Switch Complete NOTE from the base station controller 105, the target base station BS2 sends a CIRCUIT SWITCH COMPLETE (CT-CSC) control traffic message to the user station 102.

18. When the user station 102 receives the CT-CSC message from the target base station BS2, the user station 102 cancels its internal user station handover timer, and responds with bearer traffic messages. If the user station's handover timer expires before bearer traffic is received, the connection is lost, and the user station 102 will proceed with call clearing.

19. When the target base station BS2 receives the bearer traffic messages from the user station 102, the target base station BS2 cancels its base station handover timer and switches into traffic mode. If the base station handover timer expires before bearer traffic is receives, then the connection is assumed lost, and the base station BS2 will proceed with call clearing.

20. A stable bearer channel has been established with the new base station BS2. Handover is complete.

Steps 12–19 above assume that the link between the user station 102 and the old base station BS1 is maintained during handover. If, however, the link between the user station 102 and the old base station BS1 is lost, then the following steps are carried out to complete the intra-cluster handover, in accordance with the call flow diagram of FIG. 11C:

21. If the user station 102 loses the link with the old base station BS1 before it receives the CT-CSC control traffic message, then the user station 102 switches to the frequency of the target base station BS2 and searches for a SPECIFIC POLL message having a PID field matching the PID of the user station 102. When the user station 102 finds the appropriate SPECIFIC POLL message, the user station 102 responds with a HOLD (CT-HLD) control traffic message. If the user station 102 is unable to find a SPECIFIC POLL on the target base station BS2, then the call is assumed lost, and the user station 102 proceeds with call clearing.

22. If the target base station BS2 receives a response to its SPECIFIC POLL message from the user station 102 before the target base station BS2 has received the Circuit Switch Complete NOTE from the base station controller 105, the target base station BS2 responds to the CT-HLD messages from the user station 102 with CT-HLD messages, in an alternating fashion.

23. When the base station controller 105 completes its switch, it sends the target base station BS2 a Circuit Switch Complete NOTE.

24. When the target base station BS2 receives the Circuit Switch Complete NOTE from the base station controller 105, the target base station BS2 sends a CIRCUIT SWITCH COMPLETE (CT-CSC) control traffic message to the user station 102.

25. The base station controller then sends the old base station BS1 a Circuit Switch Complete NOTE. In one embodiment, the Circuit Switch Complete NOTE contains no ciphering information.

26. The base station controller 105 then sends a BSSMAP HANDOVER PERFORMED message to the mobile switching center 112.

27. When the old base station BS1 receives the Circuit Switch Complete NOTE, the old base station BS1 sends a CT-CSC control traffic message to the user station 102. (The user station 102 will not see this message because it has lost the link to the old base station BS1.) The old base station BS1 then clears all tables and circuits related to the call.

28. When the user station 102 receives the CT-CSC message from the target base station BS2, the user station 102 responds with bearer traffic, and cancels its internal user station handover timer.

29. When the target base station BS2 receives a bearer traffic response from the user station 102, the target base station BS2 cancels its base station handover timer, and switches into a traffic mode. A stable bearer channel has been established at this point.

Figure 12A:
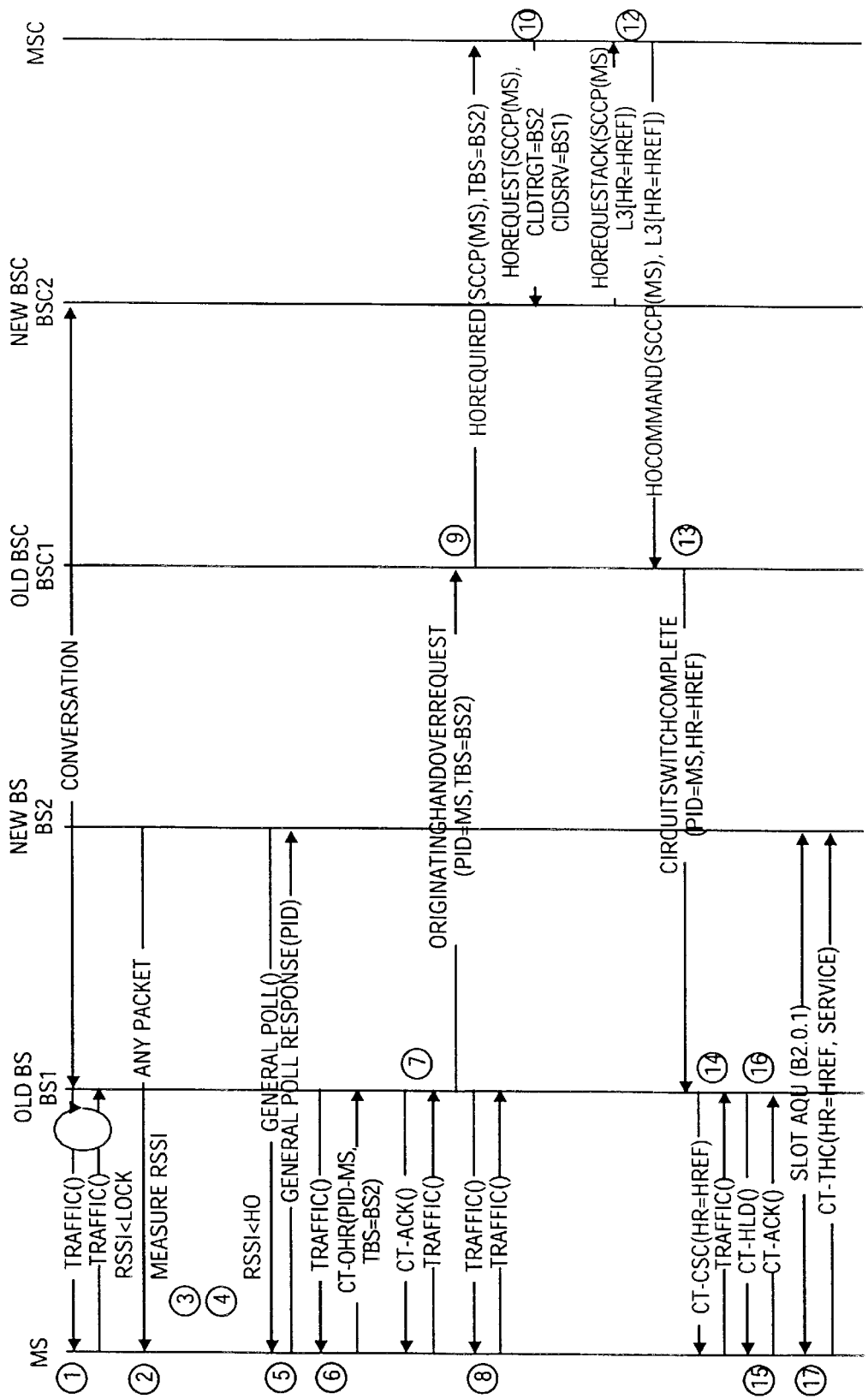
FIGS. 12A and 12B are message flow diagrams illustrating a handover of a mobile call between two base stations located in different clusters.
Figure 12B:
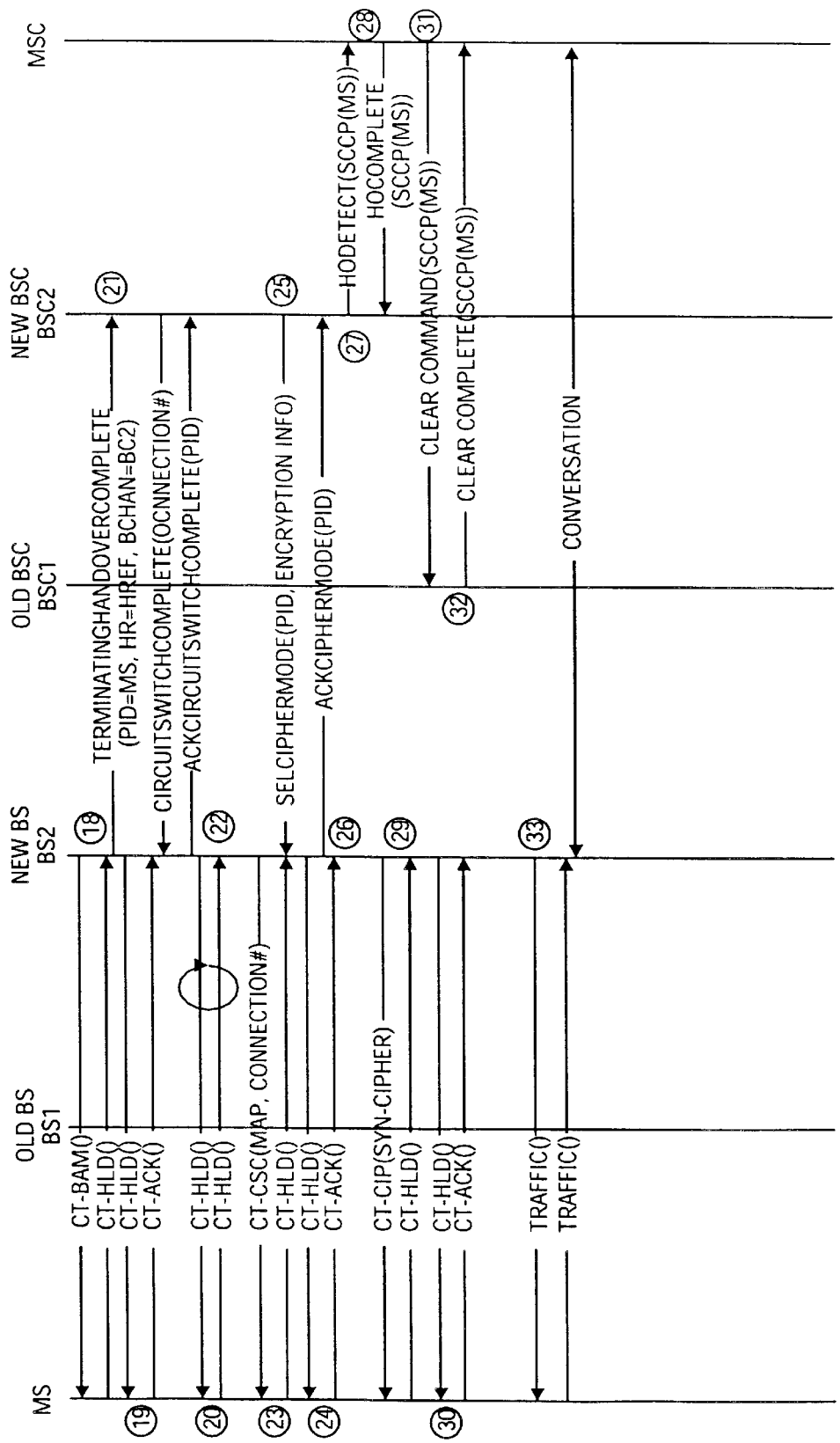
Figure 14A:
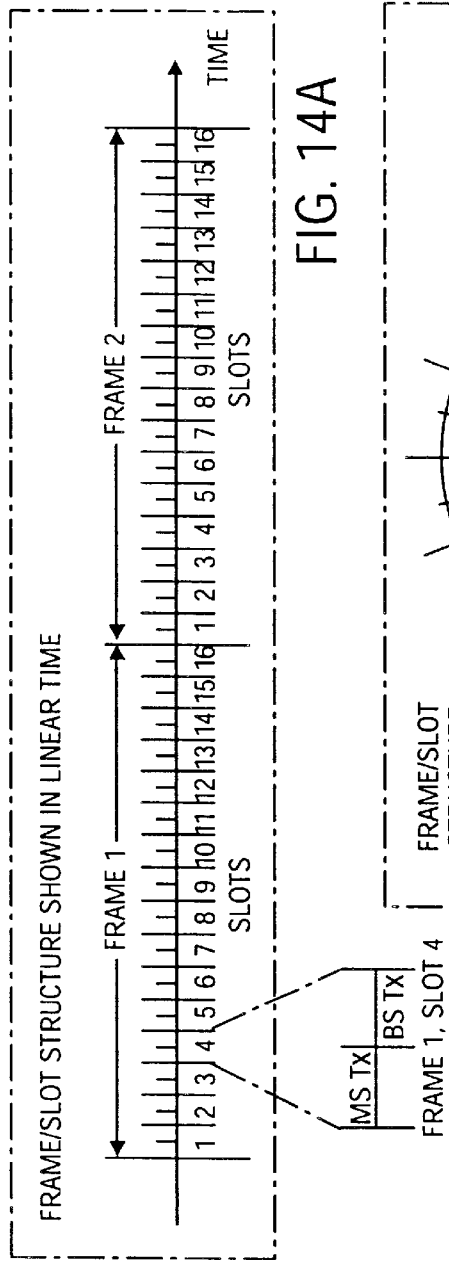
FIGS. 14A and 14B are timing diagrams showing a time frame and time slot structure in a linear representation and loop representation, respectively.
Figure 14B:
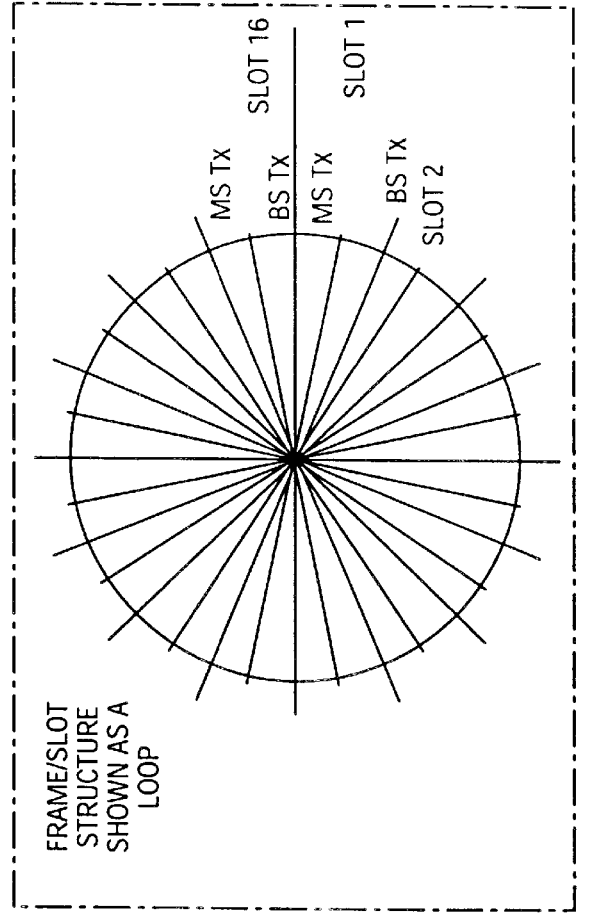
Figure 15:
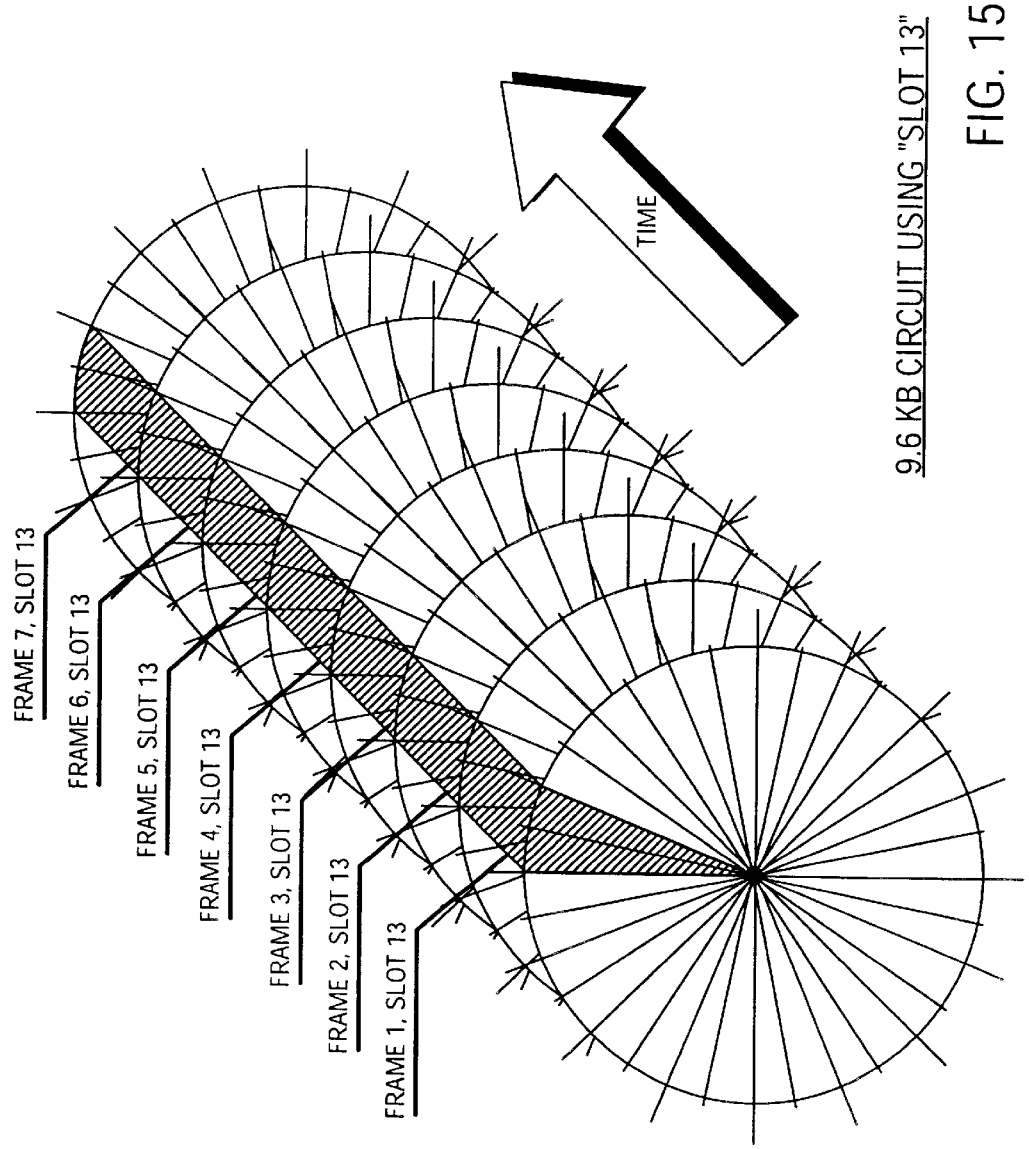
FIG. 15 is a diagram of a series of consecutive time frames showing utilization of a particular time slot over a sequence of time frames.
Figure 16A:
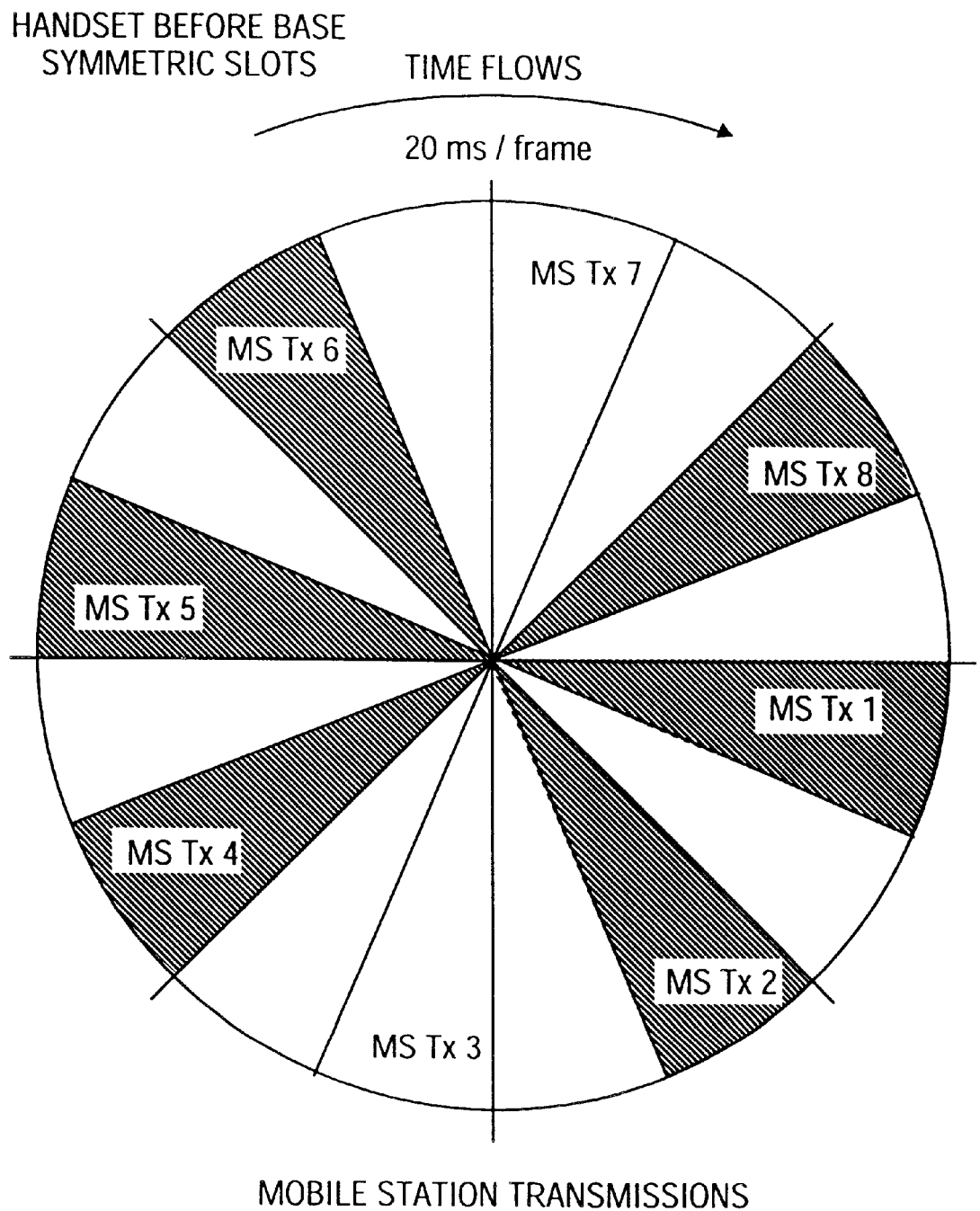
FIGS. 16A and 16B are timing diagrams of mobile station transmissions and base station transmissions, respectively, within a particular polling loop of the type shown in FIG. 14B, wherein symmetric time slots are used.
Figure 16B:
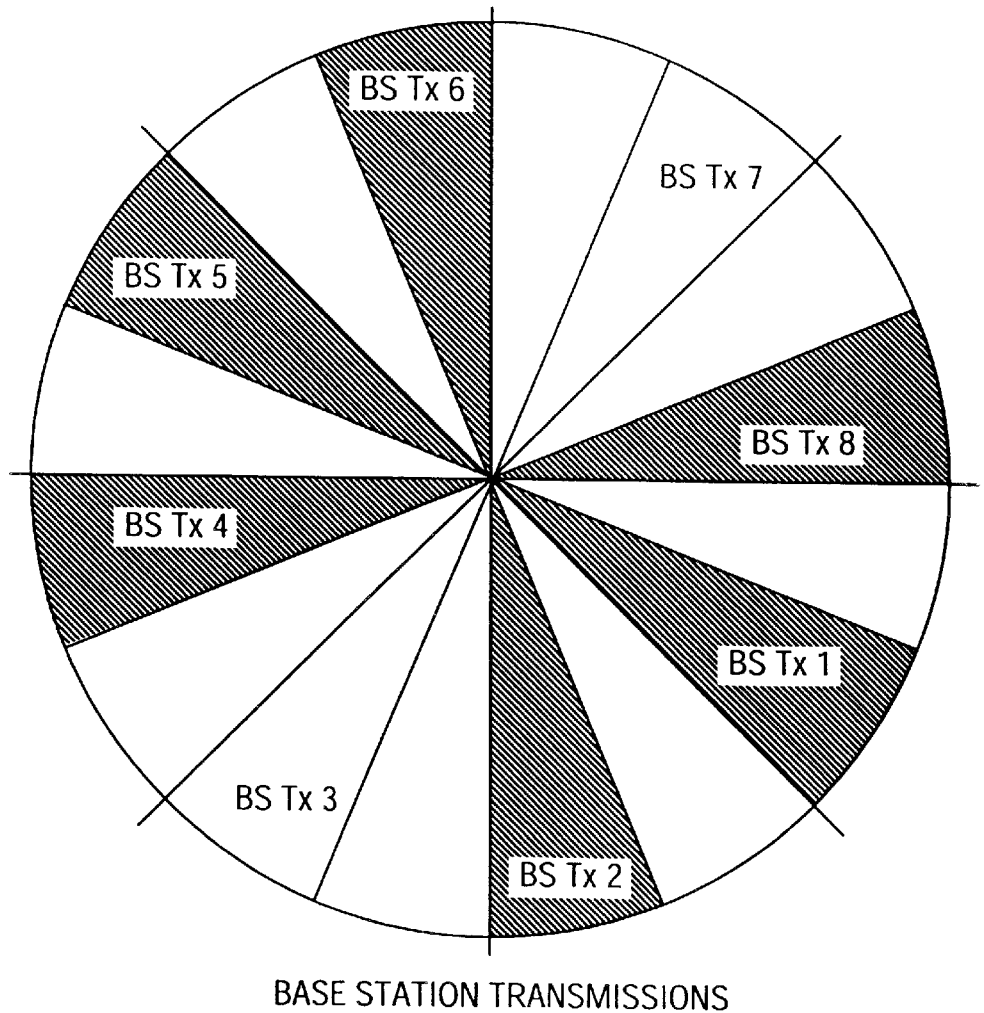
Figure 17A:
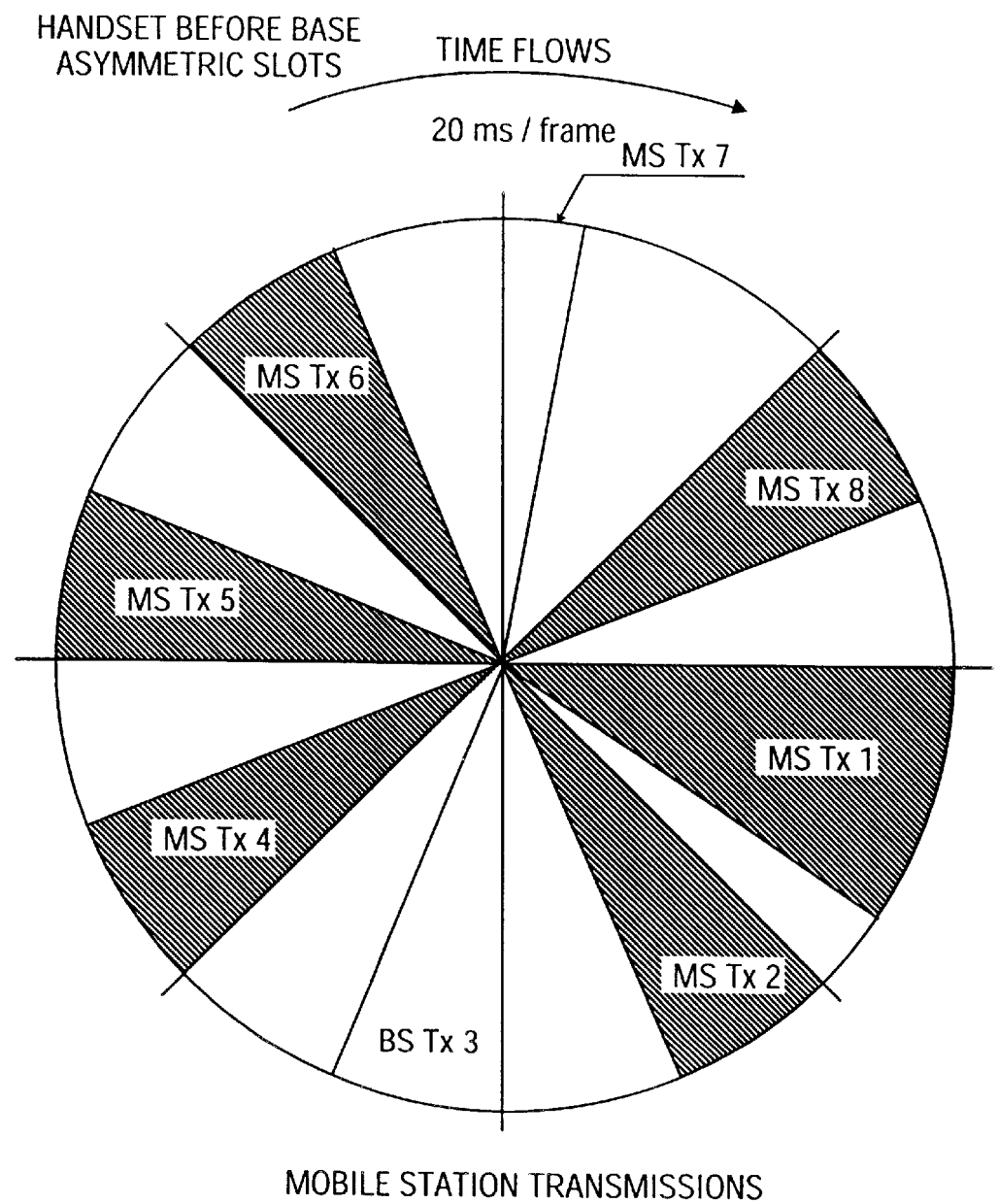
FIGS. 17A and 17B are timing diagrams of mobile station transmissions and base station transmissions, respectively, within a particular polling loop of the type shown in FIG. 14B, wherein asymmetric time slots are used.
Figure 17B:
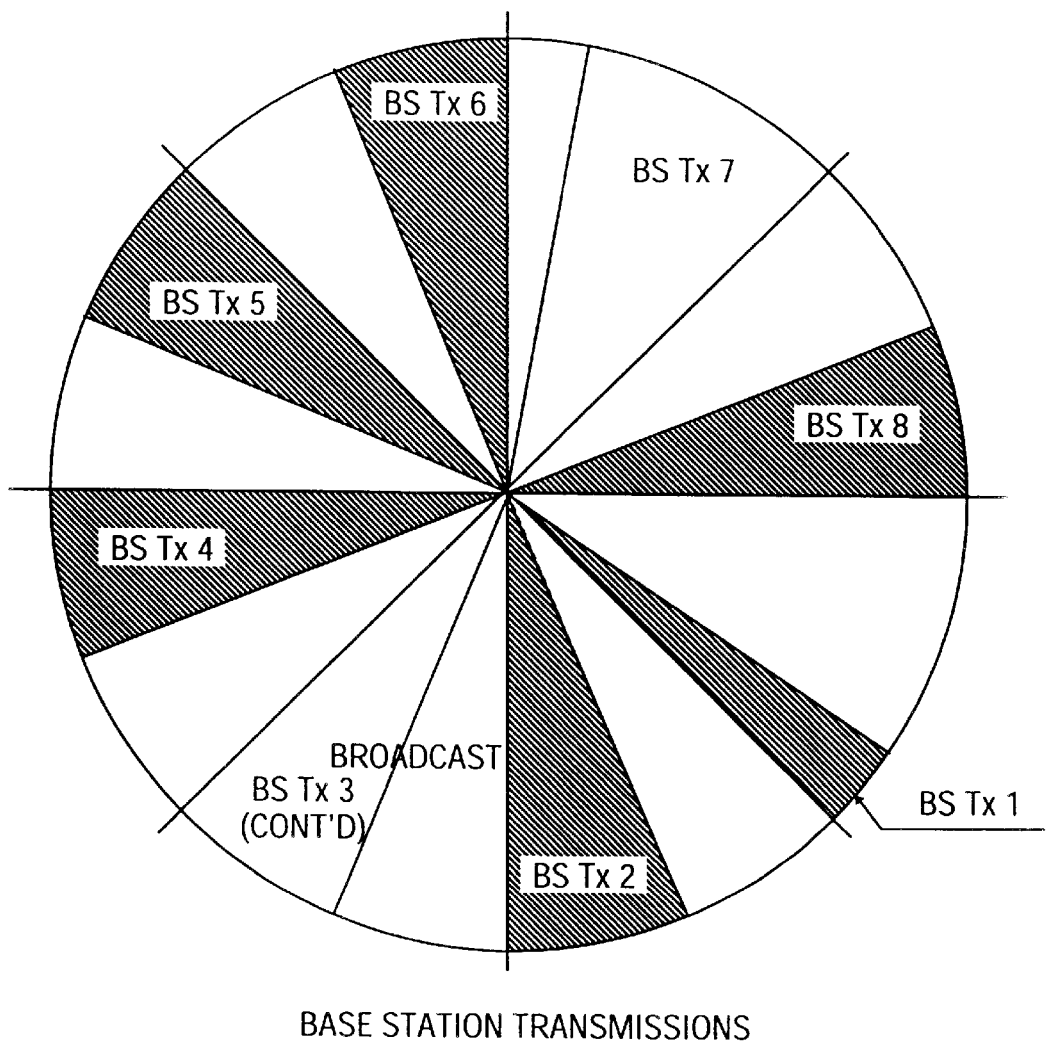

The foregoing description pertains to intra-cluster handovers. A system in accordance with a preferred embodiment is also capable of performing inter-cluster handovers. Exemplary message flow diagrams for an inter-cluster handover is shown in FIGS. 12A–12B. In FIGS. 12A–12B, similar to FIGS. 9–11, messages are designated by arrows between a user station 102, a current base station 104 (denoted "Old BS" or "BS1"), a target base station 104 (denoted "New BS" or "BS2"), a current base station controller 105 (denoted "Old BSC" or "BSC1"), a target base station controller 105 (denoted "New BSC" or "BSC2"), and a mobile switching center 112. Control traffic messages between the user station 102 and either base station 104 are typically preceded by the initials "CT". The steps numbered 1 through 33 associated with the arrows appearing in FIGS. 12A–12B are explained below (with steps 1 through 4 being identical to those for an intra-cluster handover):

1. The user station 102 starts in normal stable traffic with the current base station 104 (BS1).

2. The user station 102 monitors a received signal strength indication (RSSI). Eventually, the RSSI for the current link drops below a first threshold value $L_{look}$ (i.e., the threshold value below which the user station 102 begins to search for a new base station 104).

3. During a portion of the time frame 301 that the user station 102 does not need to maintain communication in its assigned time slots with the current base station BS1, the user station 102 switches to the frequency (e.g., F1, F2 or F3, as shown in the example of FIG. 1A) and/or code (e.g., C1, C2, C3, C4, C5, C6 or C7, as shown in the example of FIG. 1A) of one of the surrounding base stations 104, as specified by a surrounding base station table, and measures the RSSI of that base station 104 by observing any traffic from the base station 104. The user station 102 also records the current utilization field from the header of the base station 104 traffic messages (e.g., CU field 809 of FIG. 8A). If the message observed is a GENERAL POLL message, then the user station 102 also records the slot quality, base ID, base station controller ID (BSC ID), service provider, zone and facility of the candidate base station 104. The user station 102 uses this information to calculate a preference value for the candidate base station 104 and sorts the entry into a preferred base station table.

4. When the RSSI of the link to the current base station BS1 drops below a second threshold level $L_{ho}$ (i.e., the threshold below which handover is appropriate), the user station 102 selects the highest preference base station 104 as the target base station 104 (BS2). If the observed time slot 302 at the target base station BS2 had contained a GENERAL POLL message, then the user station 102 examines the BSC ID of the target base station BS2. If the BSC ID is not the same as that of the current base station BS1 (i.e., the current and target base stations are connected to different base station controllers 105), then the user station 102 executes an inter-cluster handover, as described in further detail in the steps below. Similarly, the user station 102 examines the zone of the target base station BS2, and if the zone is not the same as the zone of the old base station BS1, then the user station 102 will commence execution of an inter-cluster handover as described in more detail below. Otherwise, if the BSC ID is the same for the current and target base stations and the zone for both is also the same, then the user station 102 executes an intra-cluster handover (see FIGS. 11A–11C). If the observed time slot did not contain a GENERAL POLL message, then the user station 102 attempts to locate a time slot that has a GENERAL POLL message. The user station 102 can potentially look at all of the time slots in which it is not presently communicating and, if desired, can even skip a transmission on its current time slot to check the same location time slot on the target base station BS2 for a GENERAL POLL message.

5. If the user station 102 does not yet know the BSC ID of the target base station BS2, then the user station 102 responds to the GENERAL POLL message with a GENERAL RESPONSE message and examines the BSC ID of the GENERAL POLL message. The GENERAL RESPONSE message sent by the user station 102 includes the user station's PID.

6. After determining that an inter-cluster handover is to be performed (based upon the BSC ID and/or zone of the old base station BS1 and that of the target base station BS2), the user station 102 sends the old base station BS1 an ORIGINATING HANDOVER REQUEST (CT-OHR) control traffic message. The CT-OHR message contains the base ID of the preferred new base station BS2, as determined by the surrounding base station table, as well as its mobility country code (MCC) and mobility network code (MNC).

7. When the old base station BS1 receives the CT-OHR message, the old base station BS1 sends an ACKNOWLEDGE (CT-ACK) control traffic message to the user station 102 to acknowledge the correct receipt of the CT-OHR message. The old base station BS1 sends an Originating Handover Request NOTE to the old base station controller (BSC1). The Originating Handover Request NOTE contains the PID of the user station, the old base station ID, and the MCC and MNC of the target base station BS2. The old base station BS1 knows the PID of the user station 102 since it was supplied during the initial slot seizure.

8. When the user station 102 receives the CT-ACK message, the user station 102 and base station 104 resume normal traffic pending the completion of the circuit switch. If the user station 102 does not receive a CT-ACK message, the user station 102 assumes that its handover request has not been successful and it will restart the handover attempt (returning back to Step 4). If it did receive a CT-ACK message, the user station 102 sets an internal user station handover timer with a predetermined timeout value. The handover is now committed in the sense that the user station 102 cannot attempt a new handover until this attempt is completed.

9. The old base station controller BSC1 sends a BSSMAP Handover Required message to the mobile switching center 112 on the SCCP circuit for the user station 102 (i.e., the SCCP circuit described by the user station's PID). In a preferred embodiment, the BSSMAP Handover Required message identifies only a single cell—the cell serviced by the target base station BS2—in a preferred cell list.

10. The mobile switching center 112 interprets the Handover Required message and sends a BSSMAP Handover Request message to the SCCP circuit in the terminating base station controller (BSC2) that will subsequently be used by the user station 102 upon completion of the handover. The BSSMAP Handover Request message contains all of the information necessary to maintain the call in progress, including, e.g., the channel type, encryption information and priority. In addition, the BSSMAP Handover Request message contains the base ID of the target base station BS2.

11. The terminating base station controller BSC2 generates a "handover reference number" and stores the received information in a small association table for use at a later time. The information stored in the table is associated with a concatenation of the handover reference number and the target base station's base ID. The new base station controller BSC2 then sends a BSSMAP Handover Request ACK message back to the mobile switching center 112. The BSSMAP Handover Request ACK message contains the generated handover reference number in its "level three" information.

12. Upon receipt of the BSSMAP Handover Request ACK message, the mobile switching center 112 sends the old base station controller BSC1 a BSSMAP Handover Command message on the original SCCP circuit. The BSSMAP Handover Command message contains the level three information supplied by the terminating base station controller BSC2, including the handover reference number. The handover reference number and the implicit knowledge of the user station PID (from the SCCP circuit) are all the identification information needed by the old base station controller BSC1 to complete the handover.

13. After receiving the Circuit Switch Complete NOTE, the old base station controller BSC1 sends a Circuit Switch Complete NOTE to the old base station BS1. In place of the connection number field, this Circuit Switch Complete NOTE contains the handover reference number from the terminating base station controller BSC2. The Circuit Switch Complete NOTE also contains the user station PID that was associated with the SCCP circuit.

14. Upon receipt of the Circuit Switch Complete NOTE, the old base station BS1 sends the user station 102 a CIRCUIT SWITCH COMPLETE (CT-CSC) control traffic message which contains the handover reference number. Since the user station 102 has retained the base ID and frequency of the target base station BS2, the user station 102 now has all of the information required to complete the handover. If the old base station BS1 does not receive the Circuit Switch Complete NOTE, an error has occurred, and the call is torn down.

15. Upon receipt of the CT-CSC message, the user station 102 returns an ACKNOWLEDGE (CT-ACK) control traffic message to the old base station BS! to acknowledge the correct receipt of the CT-CSC control traffic message. If the user station 102 does not receive the CT-CSC message (which contains the handover reference number needed to complete the handover), the call cannot be continued on the target base station BS2, and the call is torn down.

16. Upon receipt of the CT-ACK message, the old base station BS1 clears all resources associated with the user station 102 and makes the channel available for new communication. If the old base station BS1 does not receive the CT-ACK message, it will nevertheless clear all resources associated with the user station 102 and make the channel available for new communication.

17. After sending the CT-ACK message, the user station 102 switches to the frequency of the target base station BS2 and seizes a channel (i.e., a time slot 302) using the slot seizure procedure described with respect to FIG. 4. Once the user station 102 has captured a time slot 302, the user station 102 sends the target base station BS2 a TERMINATING HANDOVER COMPLETE (CT-THC) control traffic message which contains the handover reference number and the service request of the user station 102. If the user station 102 fails to seize a channel on the target base station BS2, the call is lost. The user station 102 will, in such a case, send a Link Lost message to the user station application.

18. When the target base station BS2 receives the CT-THC message, it compares the BSC ID of the CT-THC message with the BSC ID of the base station controller 105 to which it is connected. This comparison allows the target base station BS2 to independently determine that an inter-cluster handover is required. The target base station BS2 responds to the user station 102 with a BASE ASSIST (BAM) control traffic message to acknowledge the correct receipt of the CT-THC message. The target base station BS2 then uses the service request information element of the CT-THC message to allocate bearer channels between itself and the terminating base station controller BSC2, and sends a Terminating Handover Complete NOTE to the terminating base station controller BSC2. The Terminating Handover Complete NOTE contains the PID of the user station 102 along with the handover reference number and a description of the bearer channels assigned to support the user station 102.

19. Upon receipt of the CT-BAM message, the user station 102 sends an ACKNOWLEDGE (CT-ACK) control traffic message to the target base station BS2 to signal correct receipt of the CT-BAM message.

20. The terminating base station BS2 and the user station 102 enter a hold pattern in which they exchange HOLD (CT-HLD) control traffic messages while awaiting an indication that the circuit has been switched.

21. The terminating base station controller BSC2 uses the handover reference number and the base ID of the target base station BS2 to find the associated connection information in the association table located at the mobile switching center 112. If the terminating base station controller BSC2 cannot find an association for the handover reference number and the base ID of the target base station BS2, then there has been an error and the call is torn down. Assuming that the proper association is found, the terminating base station controller BSC2 sends a Circuit Switch Complete NOTE to the target base station BS2.

22. The target base station BS2 responds to the Circuit Switch Complete NOTE by sending an ACK Circuit Switch Complete NOTE to the terminating base station controller BSC2.

23. When the target base station BS2 receives the Circuit Switch Complete NOTE, it also sends a CIRCUIT SWITCH COMPLETE (CT-CSC) control traffic message to the user station 102.

24. When the user station 102 receives the CT-CSC message, it sends an ACKNOWLEDGE (CT-ACK) control traffic message to the target base station BS2.

25. The terminating base station controller BSC2 connects the bearer channels specified by the target base station BS2 with the links set up by the mobile switching center 112. The terminating base station controller BSC2 then sends a Set Cipher Mode NOTE to the target base station BS2 which contains ciphering information, if applicable.

26. The target base station BS2 uses the ciphering information to set its ciphering equipment and returns an Acknowledge Cipher Mode NOTE to the terminating base station controller BSC2. If the target base station BS2 does not receive the Set Cipher Mode NOTE, then an error has occurred, and the call is torn down. (If the Set Cipher Mode NOTE is not received, then the target base station BS2 does not have the information required to formulate a CT-SET message to the user station 102, as described in the following step.)

27. The terminating base station controller BSC2 sends a Handover Detect message to the mobile switching center 112.

28. The mobile switching center 112 sends a Handover Complete message to the terminating base station controller BSC2.

29. After receiving the Set Cipher Mode NOTE, the target base station BS2 sends a SET CIPHER MODE (CT-CIP) control traffic message to the user station 102.

30. When the user station 102 receives the CT-CIP control traffic message, it sends an ACKNOWLEDGMENT (CT-ACK) control traffic message to the target base station BS2.

31. The mobile switching center 112 sends a Clear Command to the SCCP circuit of the user station 102 on the old base station controller BSC1.

32. The old base station controller BSC1 clears its resources that were allocated to the user station 102 and returns a Clear Complete message to the mobile switching center 112. There is no need to send any information to the old base station BS1 since the old base station BS1 cleared all of its resources allotted to the user station 102 earlier when the old base station controller BSC1 sent the CT-CSC control traffic message to the user station 102 in step 14.

33. The target base station BS2 clears its base station handover attempt timer, and the user station 102 likewise clears its user station handover attempt timer. They enter traffic mode, and the handover is complete.

Aspects of the invention are directed to facilitating rapid control traffic within the timing structure of the communication system. Handover, establishing communication, or time slot interchange may be carried out in a rapid manner by utilizing multiple time slots spaced less than one time frame apart. In such a manner, the control traffic takes advantage of unused time slots to avoid having to wait an entire time frame for each opportunity to exchange messages between the base station 104 and the user station 102 desiring a transaction. Spare resources are thereby used for the purpose of speeding up control traffic transactions.

In the preferred embodiment wherein the user station 102 transmits prior to the base station 104 in a time slot 302 (or virtual time slot 618), the slot pointer allows the user station 102 to have knowledge of the next available time slot 302. Otherwise, the user station 102 may not necessarily know until a general poll message 401 is received whether or not a particular time slot is available for communication, and then would typically have to wait an entire polling loop before responding to the general poll message 401.

Knowledge of available time slots 302 is also passed to the user station 102 in a specific poll message 402 by use of the OTA map field 726. As noted previously, the OTA map field 726 describes the mapping of time slots relative to a particular user station 102. Thus, for a time frame 301 with sixteen time slots 302, the OTA map field 726 in one embodiment comprises sixteen bits. Each bit may be set to a first value (e.g., "1") to indicate that the time slot 302 associated with that bit is unavailable, and to a second value (e.g., "0") to indicate that the time slot 302 associated with that bit is available for communication. Preferably, the time slot usage is indicated from a standpoint relative to the current time slot 302 of the user station 302—that is, the first bit is associated with the immediately following time slot, the second bit with the next time slot thereafter, the third bit with the next time slot thereafter, and so on. Alternatively, the time slot usage may be indicated from a standpoint with respect to a fixed reference, such as the start of the time frame 301, in which case the user station 102 needs to have available as information the relative starting point of the time frame 301.

Figure 18A:
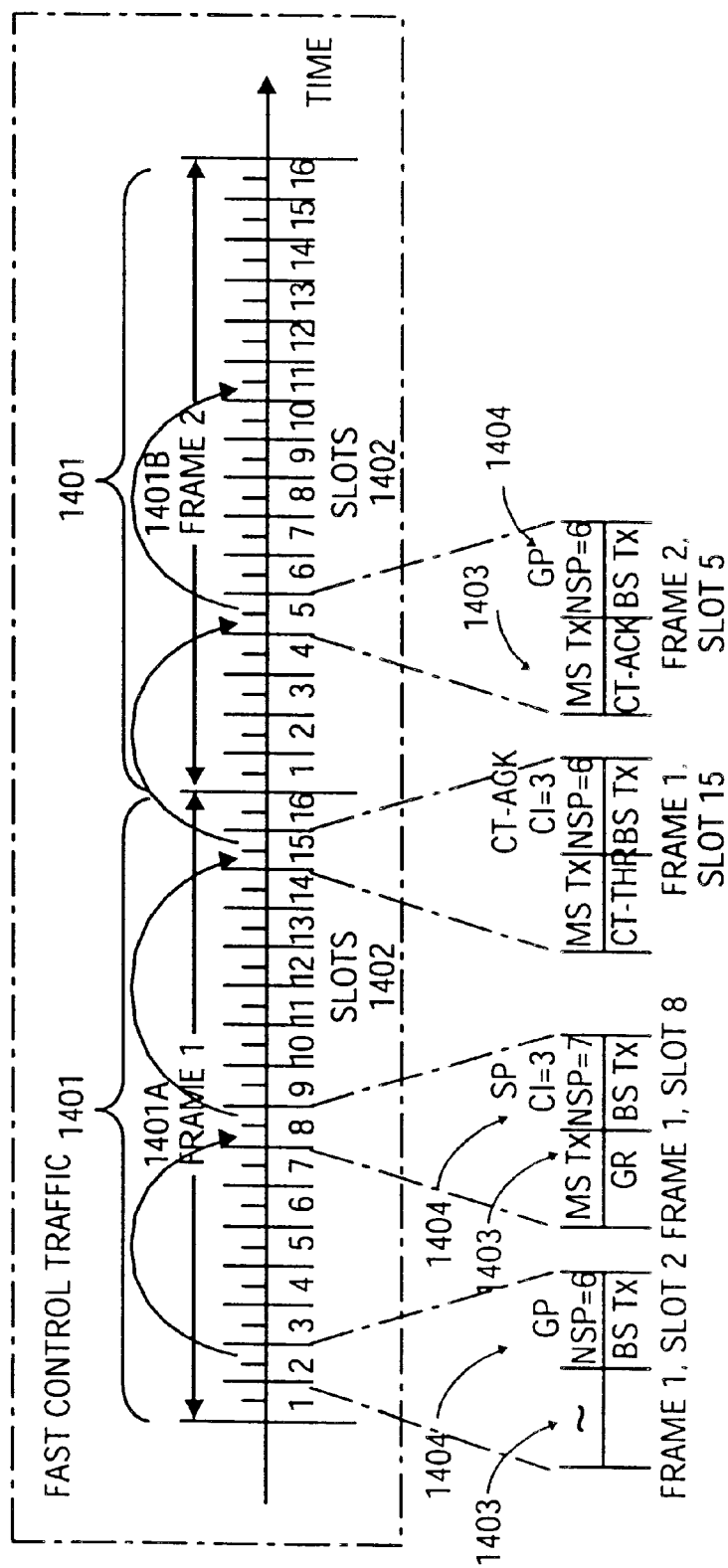
FIGS. 18A and 18B are timing diagrams showing multiple time slots utilized for carrying out control traffic operations.

FIG. 18A is a timing diagram illustrating rapid control traffic by utilizing multiple time slots within the span of a single time frame. In FIG. 18A, a timing diagram including a plurality of time frames 1401 is shown. A first time frame 1401a precedes a second time frame 1401b. In each time frame 1401 are a plurality of time slots 1402, numbered consecutively. Each time frame 1401 has sixteen time slots 1402. Each time slot has a user transmission interval 1403 and a base transmission interval 1404.

In the first time frame 1401a, it is assumed that at least three time slots 1402 (time slots "2", "8" and "15") are available. In the second time frame 1401b, it is assumed that at least two time slots 1402 (time slots "5" and "11") are available. In time slot "2" of the first time frame 1401a, no user station 102 transmission is sent during the user transmission interval 1403; only a general poll message (e.g., such as general poll message 401 of FIG. 4) is sent by the base station 104 during the base transmission interval 1404. The general poll message 401 includes a next slot pointer ("NSP") set to "6", which indicates that the next available slot is six slot positions ahead relative to the current slot; in other words, time slot "8".

Accordingly, in time slot "8" of the first time frame 1401a, a user station 102 desiring to establish communication (either initial communication or handover) with the base station 104 transmits a GENERAL RESPONSE message (e.g., such as general response message 404 of FIG. 4) during the user transmission interval 1403 of time slot "8".

The base station 104 receives the GENERAL RESPONSE message, and responds during the base transmission interval 1404 of time slot "8" with a SPECIFIC POLL message (e.g., such as specific poll message 402 of FIG. 4). As part of the SPECIFIC POLL message, the user station is assigned a correlative ID (in the present example, the correlative ID is "3"). The next slot pointer in the present example is "7", which means that the next available slot is seven slot positions ahead relative to the current slot; in other words, time slot "15".

Accordingly, in time slot "15" of the first time frame 1401a, the user station 102 in the present example transmits a control traffic message "THR" (as defined in Table 9-1 above), indicating a "Target Handover Request." In this case, the user station 102 seeks to handover to the base station 104 from another base station 104. The base station 104 responds in the base transmission interval 1404 of time slot "15" with a control traffic "ACK" or acknowledge message. The correlative ID of the user station 102 is sent as part of the acknowledge message, as well as a next slot pointer indicating that the next available slot is six slot positions ahead relative to the current slot; in other words, time slot "5" of the next time frame 1401b.

Accordingly, in time slot "5" of the second time frame 1401b, the user station 102 in the present example transmits a control traffic acknowledge (CT-ACK) message or, alternatively, a control traffic HOLD (CT-HLD) message, as shown in the message flow diagram of FIG. 11. The base station 104 then has several options in response. In one embodiment, the base station 104 may respond with a traffic message in the base transmission interval 1404 of time slot "5", provided that the call has been connected from the base station controller 105. Alternatively, the user station 102 can monitor each time slot 1402 until it sees its correlative ID, and then respond thereafter in accordance with the message directed to it. As another alternative, the base station 104 may respond in the base transmission interval 1404 with a control traffic message assigning a new time slot 1402 to the user station 102.

In a preferred embodiment, the user station 102 continues to communicate in the assigned time slot 1402 (i.e., time slot "5") of each time frame until the call is connected and completed, or is otherwise dropped. Until communication is fully established, the base station 104 may transmit a GENERAL POLL message in the base transmission interval 1404 of time slot "5" indicating the next available time slot 1402 for other user stations 102 desiring to establish communication.

In one aspect, FIG. 18A illustrates a method of establishing communication between a user station 102 and a particular base station 104 by exchanging control traffic messages separated by a time duration less than a time frame 1401. In the example shown in FIG. 18A, messages are exchanged between the user station 102 and the base station 104 in three time slots 1402 of a first time frame 1401a, and in two time slots 1402 of a second time frame 1401b. This technique can provide substantial reductions in the amount of time needed to establish communication between a user station 102 and a particular base station 104, or to handoff communication to a new base station.

Besides being useful for establishing communication (either initial communication or handover), the same method may be used to rapidly exchange control messages between a user station 102 and a base station 104, where such rapid exchange is necessary. The rapidity of conducting the control traffic may be particularly useful, for example, in the support of "911" emergency calls or other time-critical situations.

In a particular embodiment, one or more time slots 1402 are reserved for "911" emergency calls, and are not used for non-emergency bearer traffic. For example, four time slots 1402 may be held in reserve. These reserved time slots 1402 may also be used to conduct the rapid control traffic operations described in the FIG. 18A example. Preferably, at least one time slot 1402 is not used for anything other than receiving a possible "911" emergency call. When a "911" emergency call is received, it may pre-empt other control traffic, and the reserved time slots 1402 may be used to conduct a rapid establishment of communication for the "911" call.

Figure 18B:
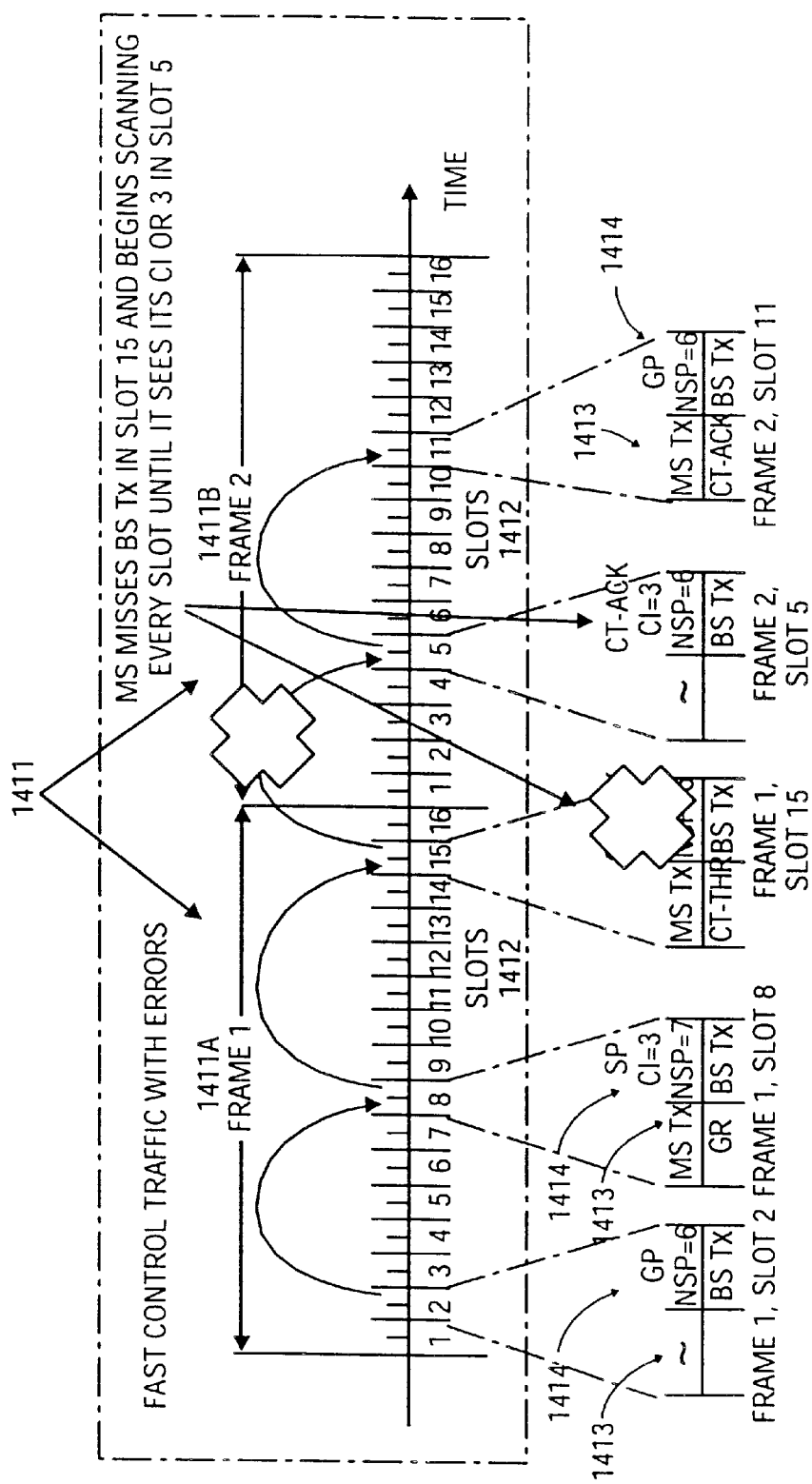

The correlative ID assigned to the user station 102 as part of the SPECIFIC POLL message may be used to recover from situations in which subsequent messages are received in error due to interference or correlation errors. FIG. 18B is a diagram illustrating the rapid control traffic techniques of FIG. 18A, but wherein one of the messages to the user station is received in error. In FIG. 18B, similar to FIG. 18A, a timing diagram including a plurality of time frames 1411 is shown. A first time frame 1411a precedes a second time frame 1411b. Each time frame 1411 has a plurality (e.g., sixteen) of time slots 1412, numbered consecutively. As in FIG. 18A, each time slot has a user transmission interval 1413 and a base transmission interval 1414.

In FIG. 18B, the same control traffic transactions are carried out in time slots "2" and "8" of the first time frame 1411a as in FIG. 18A. However, in time slot "15" of the first time frame 1411a, the base message sent in the base transmission interval 1414 is received in error. As a result, the user station 102 may not know when to expect the next communication from the base station 104, as the next slot pointer has been lost. Accordingly, the user station 102 monitors the base transmission interval 1414 of each time slot 1412 until it recognizes its correlative ID (which was assigned to it as part of the specific poll message). In the present example, the user station 102 recognizes its correlative ID in time slot "5" of the second time frame 1411b, and therefore identifies the message as one intended for it. The user station 102 also reads the next slot pointer (in this case having a value of "6"), and therefore responds six time slots 1412 later with an appropriate user message. After recovering from the erroneous reception in this manner, the exchange between the user station 102 and the base station 104 may proceed as described with respect to the remaining steps shown in FIG. 18B.

Thus, loss of the slot pointer does not necessarily prevent the establishment of communication (or the conducting of other fast control traffic operations). Recovery from errors is possible by searching for the correlative ID once communication has been temporarily disrupted by an error in receiving a message from the base station 104.

While the principles of rapid traffic control have been described in certain aspects of FIGS. 18A and 18B with respect to the FIG. 3 timing structure, the same principles are applicable to the FIG. 6 timing structure utilizing virtual time slots. The principles are also applicable to hybrid systems using frequency duplex techniques (such as FDD or FDMA) in addition to TDMA/TDD.

Figure 20:
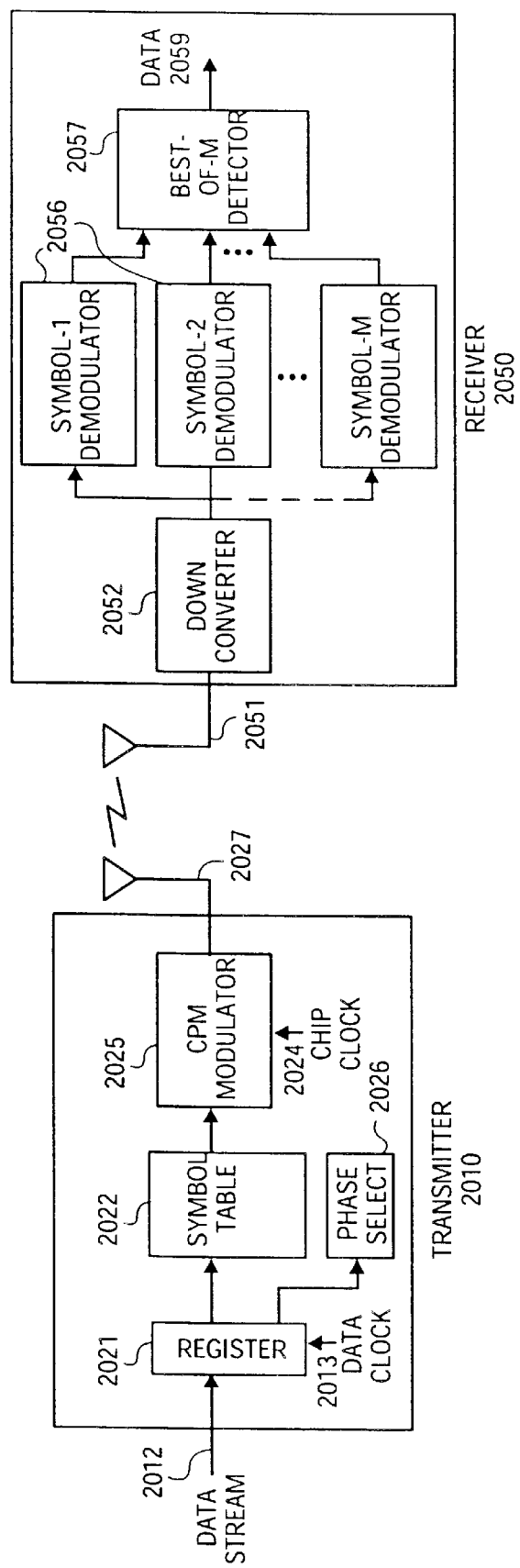
FIG. 20 is a block diagram of a transmitter and a receiver in a spread spectrum communication system.

FIG. 20 is a block diagram of an exemplary transmitter and receiver in a spread spectrum communication system as may be employed for spreading and despreading signals in a communication system in accordance with one or more embodiments of the present invention. In FIG. 20, a spread-spectrum transmitter 2010 a serial input register 2021, a symbol table 2022, a modulator 2025, a phase selector 2026 and a transmitting antenna 2027 for transmitting a spread-spectrum signal. A spread-spectrum receiver 2050 comprises a receiver antenna 2051, a down converter 2052, a bank of spread spectrum demodulators 2056, a best-of-M detector 2057, and an output data signal 2059.

In operation, a serial data stream 2012 is received by the transmitter 2010 and clocked by a data clock 2013 into the serial input register 2021. When N bits have been clocked into the serial input register 2021, one of M spread spectrum codes (or "symbol codes") is selected from the symbol table 2022. For example, five bits of the serial data stream 2012 clocked into the serial input register 2021 may be used to select one of 32 possible symbol codes stored in the symbol table 2022. The selected symbol code is output from the symbol table 2022 and used by the modulator 2025 to generate a spread spectrum signal. Another data bit (or possibly multiple data bits, if desired) of the data stream 2012, exclusive from those used to select the symbol code, is input to the phase selector 2026, which determines the phase of the symbol code selected from the symbol table 2022. For example, the phase selector may use a single bit (called a "phase control bit" of the data stream 2012 to determine the phase of the symbol code; if this phase control bit has a first value (e.g., a "0"), then the symbol code is transmitted with no phase inversion, while if the phase control bit has a second value (e.g., a "1"), then the symbol code is transmitted with a phase inversion of 180 degrees. If two phase control bits are used, then four possible phases could be selected, and so on for additional phase control bits.

The modulator 2025 transmits the selected symbol code using the phase indicated by the phase selector 2026. The modulator 2025 may transmit using continuous phase modulation, or a similar technique, so as to minimize spectral splatter. In the transmission process, the modulator 2025 preferably modulates the selected symbol code with a carrier signal at a predetermined carrier frequency. Exemplary spread spectrum modulators are described in, for example, U.S. Pat. Nos. 5,548,253 and 5,659,574, both of which is assigned to the assignee of the present invention, and both of which are hereby incorporated by reference as if set forth fully herein.

At the spread-spectrum receiver 2050, the transmitted spread spectrum signal is received at the receiver antenna 2051 and down-converted to baseband by the down converter 2052. The baseband signal is then fed to a bank of spread spectrum demodulators 2056, each of which is configured to recognize one of the M possible symbol codes, and each of which outputs a correlation signal indicating a degree of match with its respective symbol code. The best-of-M detector 2057 receives the correlation signal from each of the spread spectrum demodulators 2056, and determines which of the M symbol codes has been received based on the relative strengths of the correlation signals. The best-of-M detector 2057 generates an output data signal 2059 based upon the received symbol codes. The phase of the received symbol code can also be detected, and further information received by differential phase decoding.

Exemplary correlators suitable for use with certain embodiments of the present invention are described in, among other places, U.S. Pat. Nos. 5,022,047 and 5,016,255, both of which are assigned to the assignee of the present invention, and both of which are incorporated by reference as if fully set forth herein. A preferred method of correlation is described in U.S. Pat. No. 5,659,574 issued Aug. 5, 1997, assigned to the assignee of the present invention, and hereby incorporated by reference as if set forth fully herein. In particular, a multi-bit correlation technique as described in U.S. Pat. No. 5,659,574 represents a presently preferred manner of correlating a spread spectrum signal. U.S. Pat. No. 5,659,574 also sets forth a presently preferred technique of differential phase encoding and decoding usable in conjunction with the present invention.

Spread spectrum communication techniques are further described in, e.g., Robert C. Dixon, Spread Spectrum Systems with Commercial Applications (John Wiley & Sons, 3d ed. 1994), hereby incorporated by reference as if set forth fully herein. A large variety of spread spectrum systems have been proposed in the industry, and the particular details of the spread spectrum system set forth above are in no way meant to be limiting to the scope of the invention. Moreover, while spread spectrum communication techniques are utilized in a preferred embodiment of the invention, many embodiments of the invention are operable without using spread spectrum.

Several further variations, modifications and enhancements of the invention will now be described. User stations 102 in one embodiment may comprise mobile handsets capable of multi-band and/or multi-mode operation. The user stations 102 may be multi-mode in that they may be capable of both spread spectrum (i.e., wideband) communication and also narrowband communication. The user stations 102 may be multi-band in the sense that they may be set to operate on a plurality of different frequencies, such as frequencies in either the licensed or unlicensed PCS bands. The user stations 102 may operate in one mode (e.g., wideband) over a first frequency band, and another mode (e.g., narrowband) over a second frequency band.

As an example, a user station 102 may be set to operate on a plurality of frequencies between 1850 and 1990 MHz, with the frequencies separated in 625 kHz steps. Each user station 102 may be equipped with a frequency synthesizer that may be programmed to allow reception and/or transmission on any one of the plurality of frequencies. If the user station 102 operates solely in a licensed PCS band (e.g., 1850 MHz to 1990 MHz), the programmable frequency steps may be in 5 MHz increments, in which case the first channel may be centered at 1852.5 MHz, the next at 1857.5 MHz, and so on. If operating in the isochronous band between 1920 and 1930 MHz, the first channel may be centered at 1920.625 MHz, and the channel spacing may be 1.25 MHz across the remainder of the isochronous band. The user stations 102 may or may not be configured to operate in the 1910 to 1920 MHz band, which at present is set apart in the United States for asynchronous unlicensed devices.

Further information regarding dual-mode and/or dual-band communication is set forth in U.S. patent application Ser. No. 08/483,514 filed on Jun. 7, 1995, hereby incorporated by reference as if set forth fully herein.

In one embodiment, a communication protocol provides channel information to a base station to select an antenna for communication with a user station 102. Further, the protocol provides for output power adjustment in a user station 102 and a base station 104. A preferred power adjustment command from the base station 104 to the user station 102 may be encoded according to Table 8-2 appearing earlier herein. Although preferred values are provided in Table 8-2, the number of power control command steps and the differential in power adjustment between steps may vary depending upon the particular application and the system specifications. Further information regarding antenna diversity and power adjustment technique may be found in copending U.S. patent application Ser. No. 08/826,773 filed on Apr. 7, 1997, hereby incorporated by reference as if set forth fully herein.

The present invention has been set forth in the form of its preferred embodiments. It is nevertheless understood that modifications and variations of the disclosed techniques for carrying out fast control traffic, and for establishing and maintaining spread spectrum communication, may be apparent to those skilled in the art without departing from the scope and spirit of the present invention. Moreover, such modifications are considered to be within the purview of the appended claims.

What is claimed is:

1. In a time division multiple access communication system having a series of time frames each divided into a plurality of time slots with each time slot having a user transmission interval and a base transmission interval, a method of communication comprising the steps of:

transmitting, in a base transmission interval of a first time slot in a first time frame, a general poll message from a base station;

transmitting in response to said general poll message, in a user transmission interval of a second time slot in said first time frame, a general response message from a user station to said base station; and transmitting in response to said general response message, in a base transmission interval of said second time slot in said first time frame, a specific poll message from said base station to said user station.

2. The method of claim 1, wherein each time slot is duplex and comprises a single user transmission interval followed by a single base transmission interval.

3. The method of claim 1, wherein said steps of transmitting a general poll message, transmitting a general response message, and transmitting a specific poll message include transmitting said general poll, general response, and specific poll messages over a designated frequency band.

4. The method of claim 1, further comprising the steps of:

transmitting, in a user transmission interval of a third time slot In said first time frame, a user control traffic message from said user station to said base station; and transmitting, in a base transmission interval of said third time slot in said first time frame, a base control traffic message from said base station to said user station.

5. The method of claim 1, wherein said general poll message comprises a next slot pointer identifying to the user station a slot position of said second time slot in said first time frame.

6. The method of claim 4, wherein said specific poll message comprises a next slot pointer identifying to the user stat on a slot position of said third time slot in said first time frame.

7. The method of claim 1, wherein said steps of transmitting said general poll message, transmitting said general response message, and transmitting said specific poll message each comprises transmitting a spread spectrum signal.

8. The method of claim 1, further comprising the steps of:

connecting a call from a network to said base station;
completing said call from said network to said user station, and
thereafter exchanging bearer traffic messages between said user station and said base station during said call.

9. A time division multiple access communication system, comprising:

a base station, said base station generating a series of time frames each divided into a plurality of time slots, said time slots collectively comprising a plurality of user transmission intervals and a plurality of base transmission intervals; and a plurality of user stations capable of communicating with said base station;

wherein:

said base station transmits, in a base transmission interval of a first tile slot in a first time frame, a general poll message;

a user station of said plurality of user stations transmits in response to said general poll message, in a user transmission interval of a second time slot in said first time frame, a general response message to said base station; and said base station transmits in response to said general response message, in a base transmission interval of said second time slot in said first time frame, a specific poll message to said user station.

10. The time division multiple access communication system of claim 9, wherein each of said time slots is duplex and comprises a single user transmission interval followed by a single base transmission interval.

11. The time division multiple access communication system of claim 9, wherein said base station transmits said general poll message and said specific poll message in the same frequency band as said user station transmits said general response message.

12. The time division multiple access communication system of claim 9, wherein:

said user station transmits, in a user transmission interval of a third time slot in said first time frame, a user control traffic message to said base station; and said base station transmits in response to said user control traffic message, in a base transmission interval of said third time slot in said first time frame, a base control traffic message to said user station.

13. The time division multiple access communication system of claim 9, wherein said general poll message comprises a next slot pointer identifying a slot position of said second time slot in said first time frame.

14. The time division multiple access communication system of claim 12, wherein said specific poll message comprises a next slot pointer identifying a slot position of said third time slot in said first time frame.

15. The time division multiple access communication system of claim 9, wherein each of said general poll message, said general response message, and said specific poll message is transmitted in a spread spectrum format.

16. The time division multiple access communication system of claim 9, wherein:

said base station connects to a network for completing a call between said network and said user station; and said base station and said user station exchange bearer traffic messages during said call.

* * * * *